United States Patent
Chiba

(10) Patent No.: US 11,836,856 B2
(45) Date of Patent: Dec. 5, 2023

(54) SUPER-RESOLUTION STEREOSCOPIC VISUALIZATION PROCESSING SYSTEM AND PROGRAM

(71) Applicant: ASIA AIR SURVEY CO., LTD., Tokyo (JP)

(72) Inventor: Tatsuro Chiba, Tokyo (JP)

(73) Assignee: ASIA AIR SURVEY CO., LTD., Tokyo (JP)

( * ) Notice: Subject to any disclaimer, the term of this patent is extended or adjusted under 35 U.S.C. 154(b) by 37 days.

(21) Appl. No.: 17/697,464

(22) Filed: Mar. 17, 2022

(65) Prior Publication Data

US 2022/0237868 A1 Jul. 28, 2022

Related U.S. Application Data

(63) Continuation of application No. PCT/JP2020/024589, filed on Jun. 23, 2020.

(30) Foreign Application Priority Data

Sep. 20, 2019 (JP) .................................. 2019-171601
Dec. 20, 2019 (JP) .................................. 2019-230313

(51) Int. Cl.
*G06T 17/05* (2011.01)
*H04N 13/257* (2018.01)
(Continued)

(52) U.S. Cl.
CPC ............ *G06T 17/05* (2013.01); *G06T 17/205* (2013.01); *H04N 13/257* (2018.05); *H04N 13/275* (2018.05); *G06T 2210/36* (2013.01)

(58) Field of Classification Search
CPC ... G06T 17/05; G06T 17/205; G06T 2210/36; G06T 3/40; H04N 13/257; H04N 13/275;
(Continued)

(56) References Cited

U.S. PATENT DOCUMENTS 7,764,282 B2* 7/2010 Chiba .................... G09B 29/12
348/42
2008/0285885 A1* 11/2008 Rahmes .................. G06T 5/005
382/284
(Continued)

FOREIGN PATENT DOCUMENTS

JP 2001-142393 A 5/2001
JP 2001142393 A * 5/2001
(Continued)

OTHER PUBLICATIONS

JP 2019-091393A (with English abstract and unedited computer-generated English translation onDec. 13, 2021) (Year: 2019).*
(Continued)

*Primary Examiner* — Michael Le
(74) *Attorney, Agent, or Firm* — Oblon, McClelland, Maier & Neustadt, L.L.P.

(57) ABSTRACT

A super-resolution stereoscopic visualization processing system encompasses a base map database storing the 5 m-DEM base map, the 5 m-DEM mesh reading unit, a geographic-coordinates XYZ-point file, a plane-rectangular coordinate converter, a plane-rectangular XYZ-point file, a rasterization processor, a fine grid-cell memory, a smoothing processor, a smoothing image memory, a consideration-distance grid-number calculator, a red stereoscopic-visualization image generator, a red stereoscopic-visualization image memory, wherein a super-resolution red stereoscopic-visualization image of 5 m-DEM is obtained on a screen of a display.

14 Claims, 46 Drawing Sheets
(22 of 46 Drawing Sheet(s) Filed in Color)

INTERPOLATED PLANE-RECTANGULAR SUPER-RESOLUTION MESH EXAMPLE

Pbi

COORDINATE EXAMPLE OF ONE TRIANGLE AFTER DIVIDING

Idx,X,Y,Elevation(m),Length,Total Length,Heading

1,-10835.893,-32871.056,41.274,0.559m,----,269° 55' 48.4"

2,-10836.452,-32871.056,41.412,0.79m,0.559m,134° 52' 44.3"

3,-10835.893,-32871.614,41.214,----,1.349m,----

(51) Int. Cl.
*H04N 13/275* (2018.01)
*G06T 17/20* (2006.01)

(58) Field of Classification Search
CPC .. H04N 13/128; H04N 13/139; H04N 13/254; H04N 13/271; G09B 29/00
See application file for complete search history.

(56) References Cited

U.S. PATENT DOCUMENTS

| | | | |
|---|---|---|---|
| 2009/0083291 A1* | 3/2009 | Allen | G06T 5/005 |
| 2016/0238405 A1* | 8/2016 | Korzunov | G01C 21/3667 |
| 2019/0156566 A1* | 5/2019 | Chen | G06T 19/20 |

FOREIGN PATENT DOCUMENTS

| | | | | |
|---|---|---|---|---|
| JP | 3670274 | B2 | | 4/2005 |
| JP | 2010-198544 | A | | 9/2010 |
| JP | 2010198544 | A | * | 9/2010 |
| JP | 2019-091393 | A | | 6/2019 |
| JP | 2019-096316 | A | | 6/2019 |
| JP | 2019091393 | A | * | 6/2019 |

OTHER PUBLICATIONS

JP 2001142393A (with English abstract and unedited computer-generated English translation onDec. 13, 2021) (Year: 2001).*
JP 2010198544A (with English abstract and unedited computer-generated English translation onDec. 13, 2021) (Year: 2010).*
International Search Report dated Jul. 21, 2020, issued in PCT/JP2020/024589 (with English translation).
Tatsuro Chiba, Yusuke Suzuki and Takanori Hiramatsu "Digital Terrain Representation Methods and Red Relief Image Map, A New Visualization Approach" (Map, Journal of the Japan Cartographers Association, Mar. 31, 2007) pp. 27-36.
Heitaro Kaneda and Tatsuro Chiba "Stereopaired Morphometric Protection Index Red Relief Image Maps(Stereo MPI-RRIMs):Effective Visualization of High-Resolution Digital Elevation Models for Interpreting and Mapping Small Tectonic Geomorphic Features" (Bulletin of the Seismological Society of America, Jan. 8, 2019) pp. 99-109.

* cited by examiner

Pai

- (View Proj),Y (View Proj)
- 139° 42' 48.7426" E,35° 42' 13.4805" N
- 139° 42' 48.7426" E,35° 42' 13.2805" N
- 139° 42' 48.9426" E,35° 42' 13.2805" N

Fig.6

| AREA Ei | 5m PLANE-RECTANGULAR MESH Mbi | FOUR POINTS PLANE-RECTANGULAR POINT DATA Pbi | COORDINATES (Xbi,Ybi,(Zbi)) |
|---|---|---|---|
| | | Pb1 | Xb1,Yb1,(Zb1) |
| | | Pb2 | Xb2,Yb2,(Zb2) |
| | | Pb3 | Xb3,Yb3,(Zb3) |
| | | Pb4 | Xb4,Yb4,(Zb4) |
| | ⋮ | | |

Fig.11

INTERPOLATED PLANE-RECTANGULAR SUPER-RESOLUTION MESH EXAMPLE

Pbi

COORDINATE EXAMPLE OF ONE TRIANGLE AFTER DIVIDING
Idx,X,Y,Elevation(m),Length,Total Length,Heading
1,-10835.893,-32871.056,41.274,0.559m,----,269° 55' 48.4"
2,-10836.452,-32871.056,41.412,0.79m,0.559m,134° 52' 44.3"
3,-10835.893,-32871.614,41.214,----,1.349m,----

Fig.17
(a)
(b)
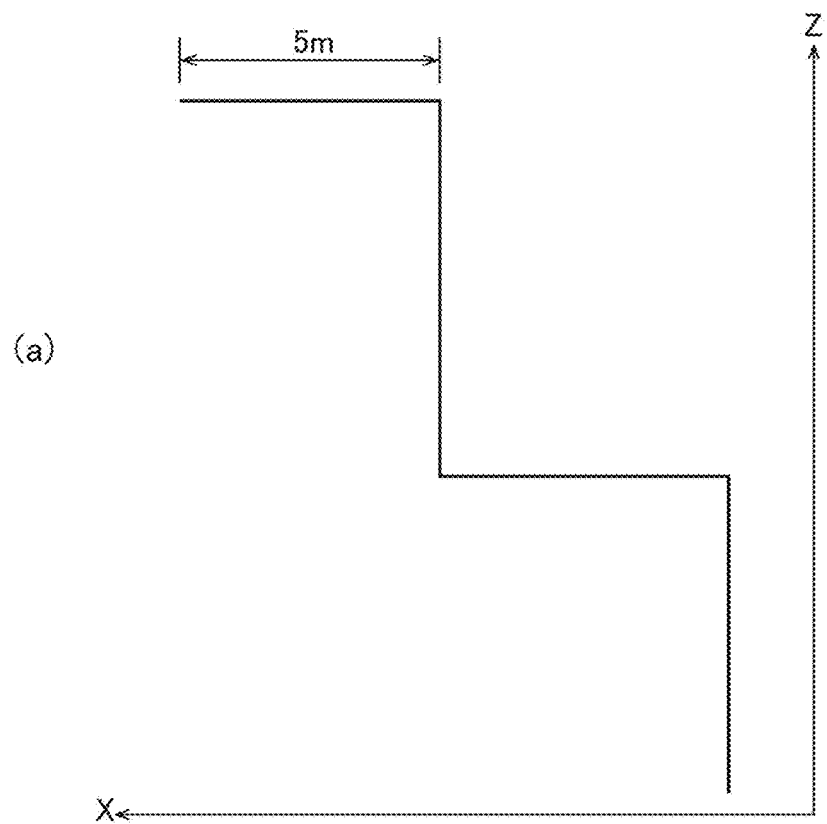
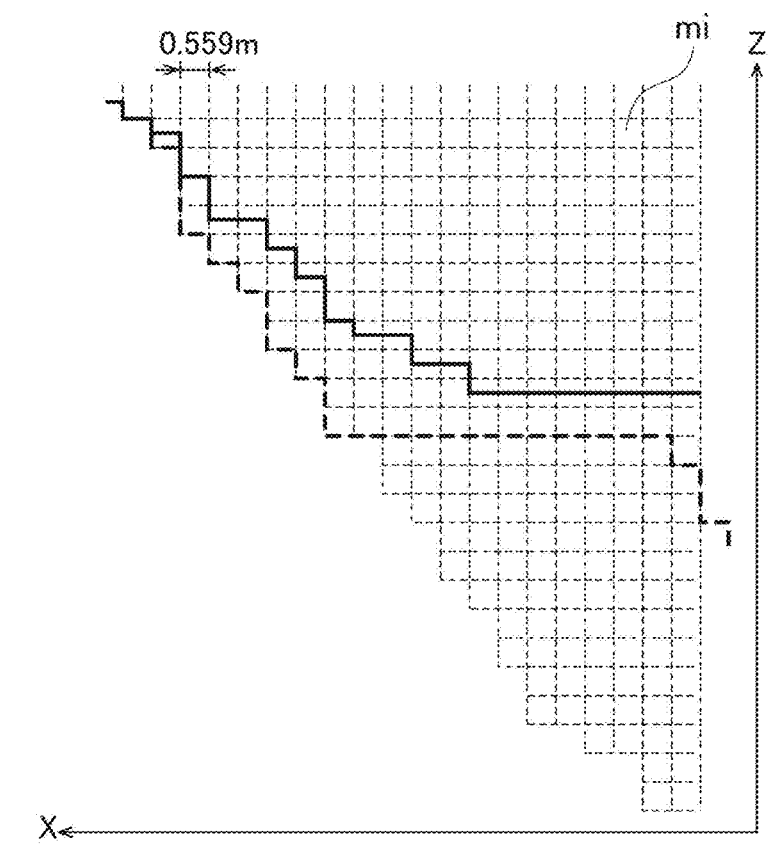

Fig.21

| AREA Ei | 5m PLANE-RECTANGULAR MESH Mbi | Mbi FOUR CORNERS COORDINATES | FINE GRID-CELL mi (ABOUT 0.5m) | da | TIN BILINEAR INTERPOLATION VALUE (ELEVATION) | SMOOTHING ELEVATION-VALUE zfi (FIRST TIME) | SMOOTHING ELEVATION-VALUE zfi' (SECOND TIME) |
|---|---|---|---|---|---|---|---|
| E1 | Mb1 | Pb1,Pb1, Pb2,Pb2 | m1 | 0.559m | zr1 | zf1 | zf1' |
| | | | m2 | 0.559m | zr2 | zf2 | zf2' |
| | | | m3 | 0.559m | zr3 | zf3 | zf3' |
| | | | ... | ... | ... | ... | ... |
| | Mb2 | Pb22,Pb23, Pb24,Pb25 | m100 | 0.559m | zr100 | zf100 | zf100' |
| | | | m101 | 0.559m | zr101 | zf101 | zf101' |
| | | | m102 | 0.559m | zr102 | zf102 | zf102' |
| | | | m103 | 0.559m | zr103 | zf103 | zf103' |
| | | | ... | ... | ... | ... | ... |
| ... | | | | | | | |

RGi

Fig.22
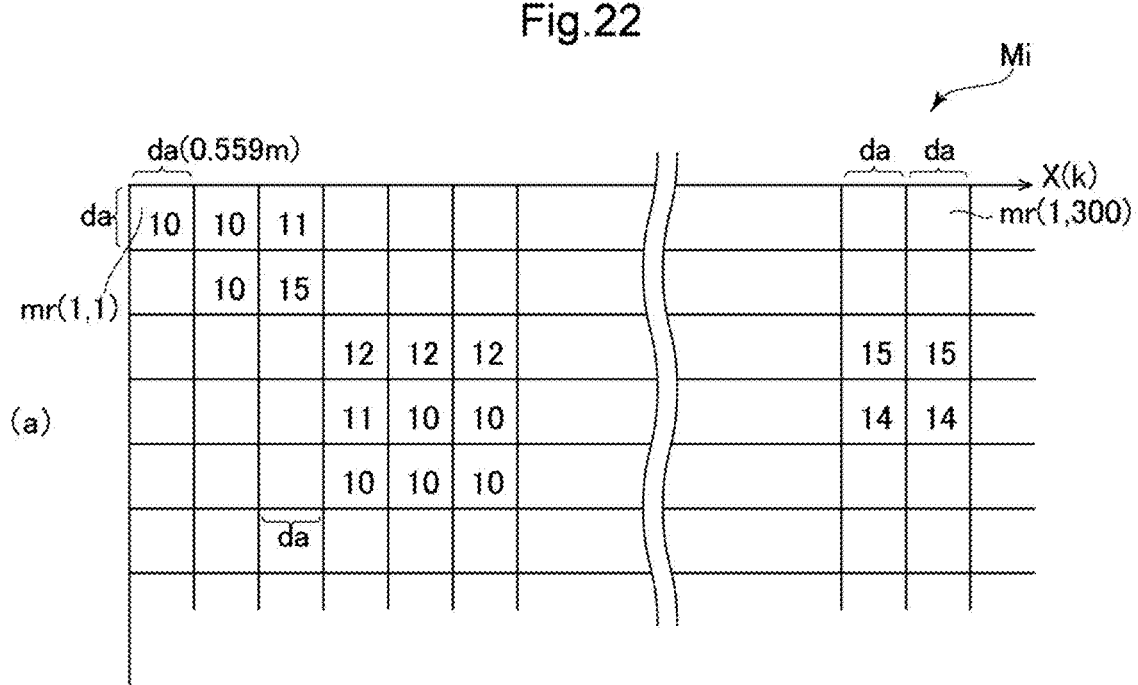
(a)
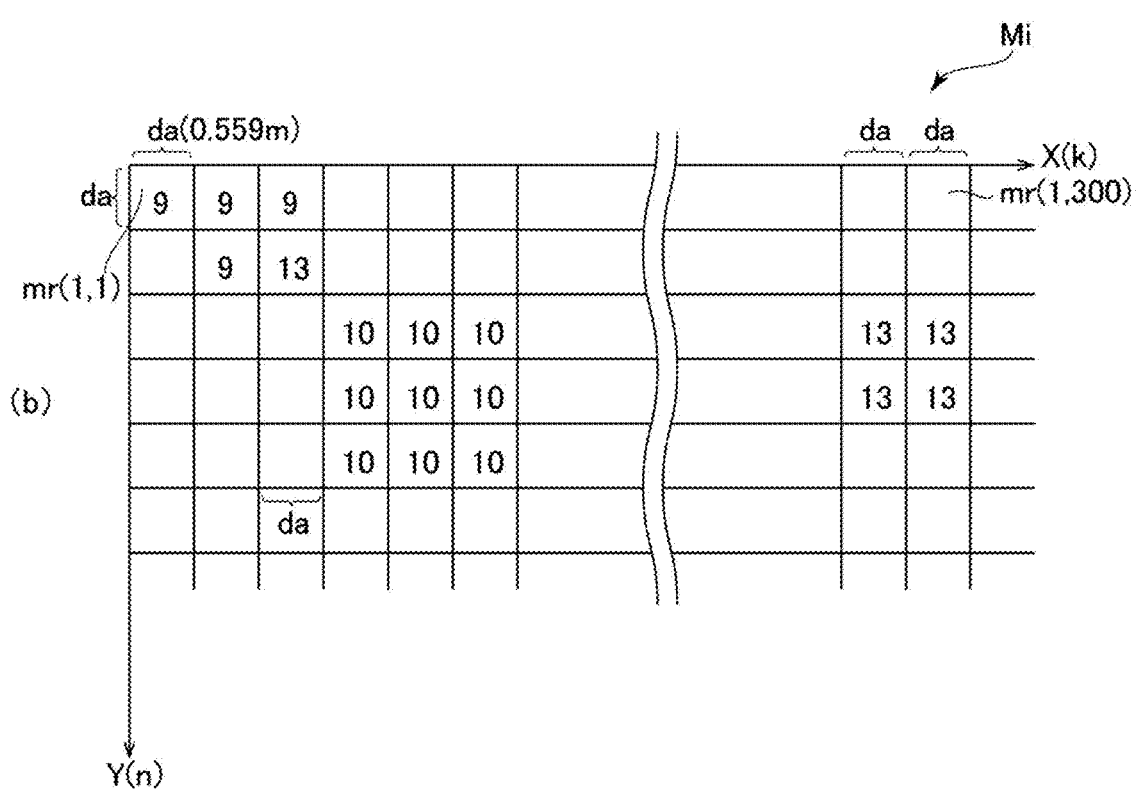
(b)

: ELEVATION ANGLE $\theta$ OF SAMPLE POINT A TO SAMPLE POINT B

Fig.42
(a) 
(b) 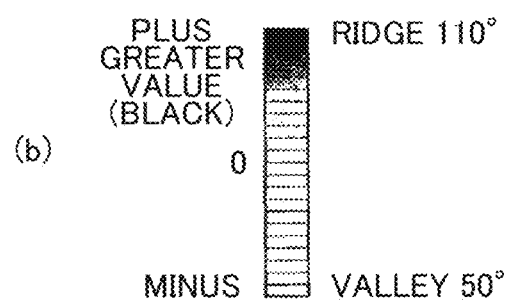
(c) 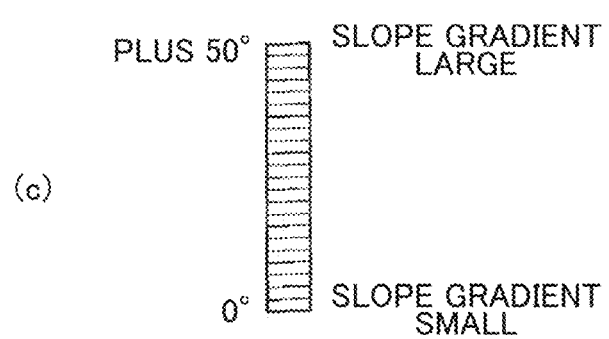

SUPER-RESOLUTION STEREOSCOPIC VISUALIZATION PROCESSING SYSTEM AND PROGRAM

CROSS REFERENCE TO RELATED APPLICATIONS AND INCORPORATION BY REFERENCE

This application is a continuation of International Application PCT/JP2020/024589, with an international filing date of Jun. 23, 2020, which claims benefit of priority under 35 USC 119 based on Japanese Patent Application No. 2019-171601 filed Sep. 20, 2019 and Japanese Patent Application No. 2019-230313 filed Dec. 20, 2019, the entire contents of each application are incorporated by reference herein.

BACKGROUND OF THE INVENTION

1. Field of the Invention

The present invention relates to a processing system for a super-resolution stereoscopic visualization.

2. Description of the Related Art

In recent years, Geospatial Information Authority of Japan (hereinafter referred to as "Geospatial Information Authority" or "GSI") has released Digital Elevation Model (DEM) scheme on the internet network.

In the DEM scheme, each of laser-measurement points obtained by irradiating the ground with laser beams from an aircraft are connected by the triangulated irregular network (TIN), and then covered with a frame divided by meshes, each having longitude and latitude differences of 0.2 second (about five meters) interval or 0.4 second (about ten meters) interval. Then, the height of each of center points of the meshes is obtained by interpolation from the height of the top of the TIN including the center points of the meshes.

Using the DEM scheme, the Geospatial Information Authority has recently has published a red relief image map based on the art disclosed in JP 3670274 B. The outline of the red relief image map encompasses a step of obtaining a slope gradient, an over-ground openness and an under-ground openness using the 5 m-DEM (five-meters interval Digital Elevation Model), and a step of obtaining a ridge-valley value (also called "an elevation-depression degree") from the slope gradient, the over-ground openness and the under-ground openness, and a step of creating the red relief image map using chroma saturations of red colors assigned to each slope gradient and brightness of red colors assigned to the ridge-valley values.

In addition, recently, the red relief image maps are required to be able to visualize fine stereoscopic images even in a narrow range (also referred to as "an area") of several hundred meters from the viewpoint of disaster prevention, real estate valuation and the like.

SUMMARY OF THE INVENTION

An aspect of the present invention inheres in a 1. A super-resolution stereoscopic visualization processing system encompassing (A) a logic circuit configured to define a cluster of meshes in a plane-rectangular coordinate to store in a plane-rectangular coordinate memory, after reading out the meshes, which are represented by latitude and longitude of a predetermined area in a digital elevation model, stored in a digital elevation model memory, (B) a logic circuit configured to calculate a divide-distance, to evenly divide a side along an X direction of each of the cluster of the meshes defined in the plane-rectangular coordinate, which is stored in the plane-rectangular coordinate memory, into an odd number other than one, (C) a logic circuit configured to define a two-dimensional plane (X-Y) of an area corresponding to the predetermined area to store in a memory, to define a plurality of fine grid-cells, each having a cell size of the divide-distance in the two-dimensional plane (X-Y), by dividing the two-dimensional plane (X-Y) with the divide-distance, (D) a logic circuit configured to determine interpolated elevation-values obtained by interpolating elevation-values of the fine grid-cells, by defining the cluster of the meshes in the plane-rectangular coordinate on the two-dimensional plane (X-Y), (E1) a logic circuit configured to generate smoothing meshes implemented by a cluster of smoothing grid-cells, which are two-dimensionally arranged by the odd number, by defining grid-cells each having a cell size of the divide-distance as the smoothing grid-cells, (E2) a logic circuit configured to sequentially designate the fine grid-cells defined in the two-dimensional plane (X-Y), defining the smoothing mesh in the two-dimensional plane (X-Y) by allocating a central smoothing grid-cell in the smoothing mesh to each of the designated fine grid-cells, and to assign smoothing elevation-values to the designated fine grid-cells, each of the smoothing elevation-values is obtained by smoothing based on interpolated elevation-values of each of the fine grid-cells in the smoothing mesh, and (F) a logic circuit configured to specify one of the fine grid-cells as a subject point, for each time the smoothing elevation-values are assigned to the respective fine grid-cells in the two-dimensional plane (X-Y), and to display elevation-depression degrees in gradation, after defining consideration distances from the subject point by a cell number of the fine grid-cells divided by the divide-distance to determine the elevation-depression degrees assigned to each of the subject point.

BRIEF DESCRIPTION OF THE DRAWINGS

The patent or application file contains at least one drawing executed in color. Copies of this patent or patent application publication with color drawing(s) will be provided by the office upon request and payment of the necessary fee.

FIG. 6 is a diagram illustrating a specific example of plane-rectangular-coordinate 5 m-DEM point data Pbi (xbi, ybi, zbi . . . );

FIG. 11 is a diagram illustrating an example of triangular-coordinates of the divided fine grid-cell mi (m1, m2, m3, . . . );

FIG. 17 is a diagram illustrating an effectiveness of the moving-average processing according to the first embodiment;

FIG. 21 is a diagram illustrating smooth fine-elevation-value raster-image data RGi;

FIG. 22 is a diagram illustrating specific examples of data on the X-Y plane in the fine grid-cell memory 142 before smoothing and data on the X-Y plane in the smoothed image memory 147 after smoothing;

FIG. 42 is a diagram illustrating for assigning gray scales;

DETAILED DESCRIPTION OF THE INVENTION

In first to third embodiments of the present invention, procedures of obtaining a super-resolution stereoscopic image Gi will be given using a base map (hereinafter referred to as "5 m-DEM base map Fa") of a 5 m-DEM (A: A denotes "laser") of the Geospatial Information Authority as an example.

Although different colors, such as blue, green, yellow-green, and the like, may be used for the super-resolution stereoscopic-visualization image Gi depending on target areas, seasons, and the like, a reddish color, such as red, purple, vermilion, orange, yellow, and the like, will be used in the description of the following embodiments.

The super-resolution stereoscopic-visualization-image Gi of the reddish color generated by using the 5 m-DEM base map Fa according to the following embodiments described later is referred to as "a super-resolution red stereoscopic-visualization-image Gai'".

First Embodiment

Figure 1:
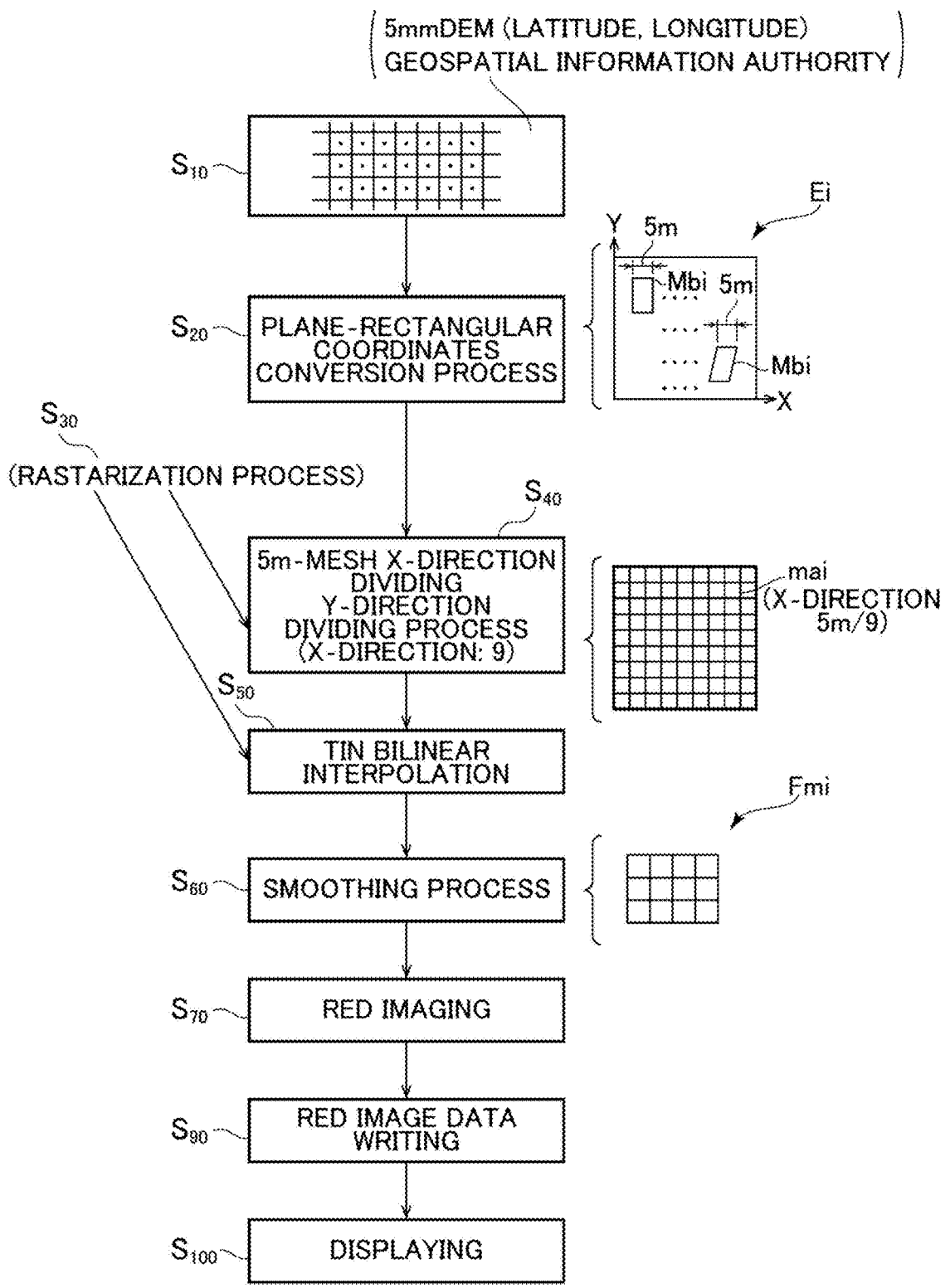
FIG. 1 is a flowchart illustrating an outline of a processing system of super-resolution stereoscopic visualization according to a first embodiment.
Figure 5:
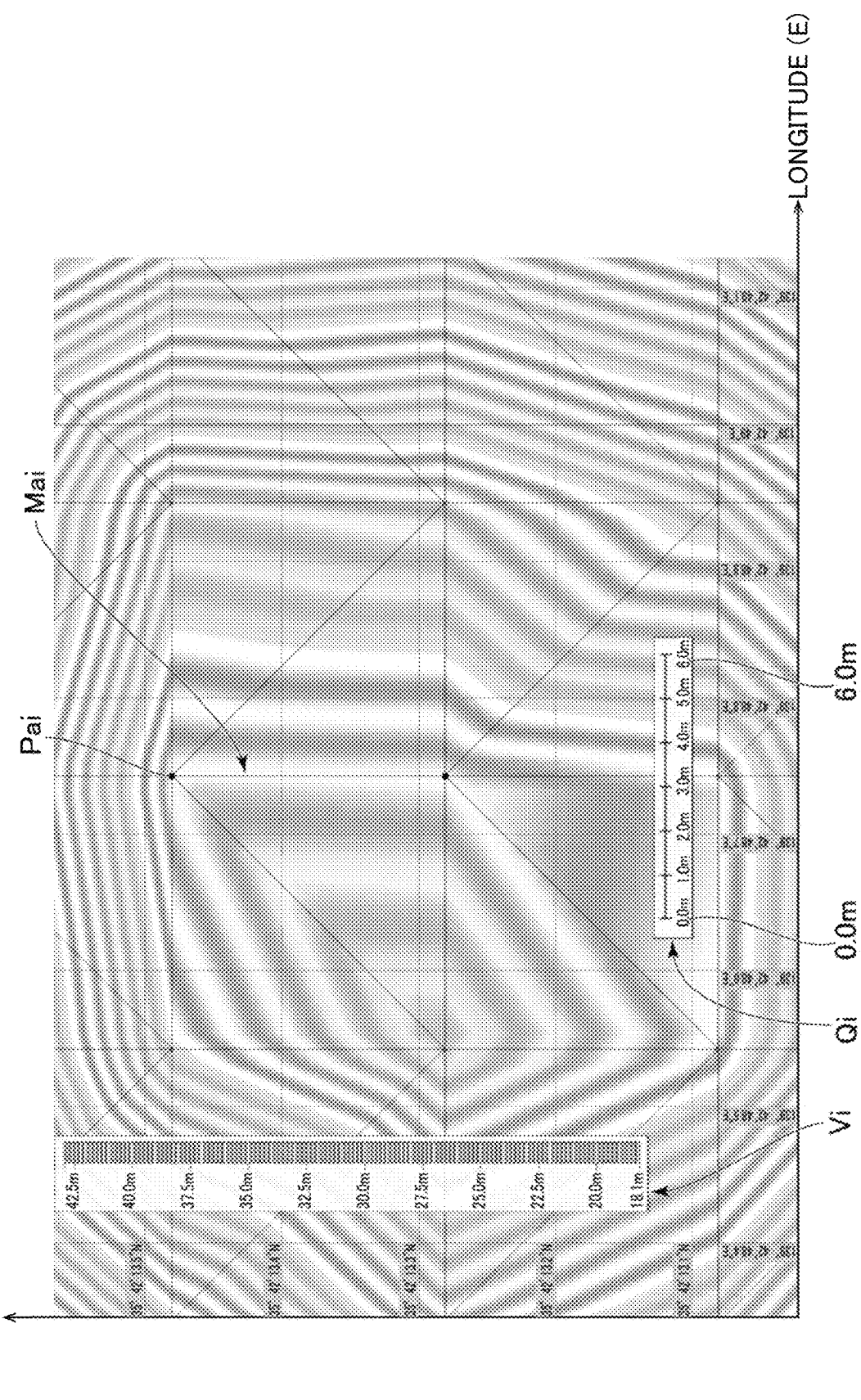
FIG. 5 is a diagram illustrating a specific example of a latitude/longitude 5 m-mesh Mai based on the 5 m-DEM latitude/longitude point data Pai.

FIG. 1 is a flowchart illustrating an outline of a processing system of super-resolution stereoscopic visualization according to a first embodiment, executed by a computer. As illustrated in FIG. 1, a mesh by the 5 m-DEM defined using latitude and longitude (hereinafter referred to as "a latitude/longitude 5 m-DEM", and "a latitude/longitude 5 m-mesh Mai": see FIG. 5) of any area Ei, is read (S10). And the latitude/longitude 5 m-mesh Mai is converted into plane-rectangular coordinate to be as a plane-rectangular 5 m-mesh Mbi illustrated in FIG. 7, and the plane-rectangular 5 m-mesh Mbi is stored in a memory (not illustrated) (S20). In FIG. 5, a frame in which the latitude axis N and the longitude axis E are divided by 0.1 second interval is shown, and oblique lines for TIN interpolation are illustrated. Also, a size-scale Qi (0.0 meter to 6.0 meters) and a color-bar Vi representing the elevation of a contour are illustrated.

That is, the plane-rectangular 5 m-meshes Mbi (Mb1, Mb2, Mb100, . . . ) in the area Ei is defined, or determined, in the X-Y plane, that is two-dimensional plane.

Rasterization processing is then executed (S30). The rasterization processing includes processes of division in 5 m-mesh x-direction/y-direction (S40) and TIN bilinear interpolation (S50), and the like.

In the process of dividing in the 5 m-mesh x-direction/y-direction (S40), the plane-rectangular 5 m-meshes Mbi (Mb1, Mb2, Mb100, . . . ) are designated, and for each designation, 5 m-mesh X-direction divide-distances di (d1, d2, . . . ) are obtained by dividing an X-axis side (hereinafter referred to simply as "the x-direction") of the plane-rectangular 5 m-mesh Mbi by nine.

Figure 10:
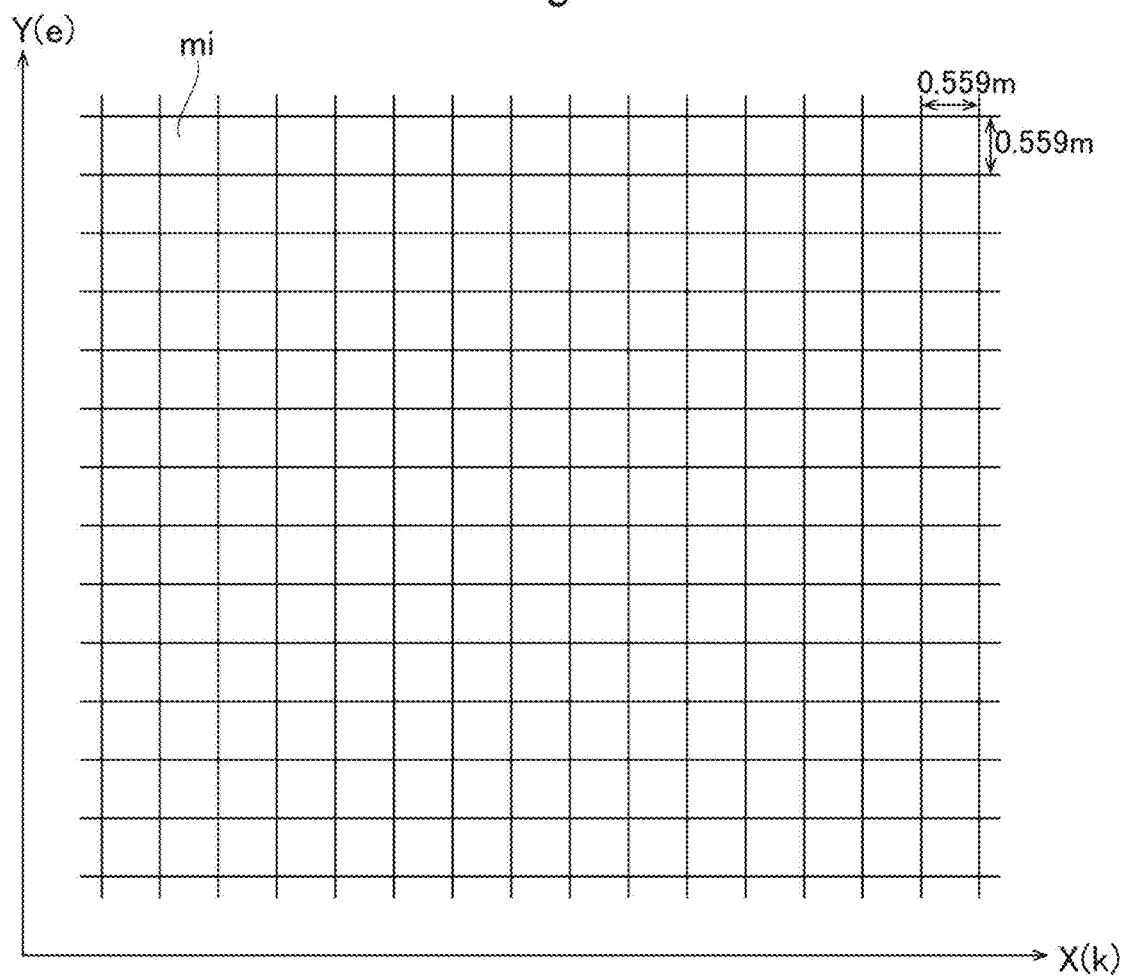
FIG. 10 is a diagram illustrating a fine grid-cell mi each having a cell size of 0.559 meter on the X-Y plane in the fine grid-cell memory 142.

Then, the 5 m-mesh X-direction divide-distances di are averaged, and the X-Y plane corresponding to the area Ei is divided by an average distance of the 5 m-mesh X-direction divide-distances di (Hereinafter, referred to as "a 5 m-mesh X-direction dividing average-distance da": for example, 0.559 meter) (S40). Each of divided grid-cells is referred to as "a fine grid-cell mi" (also referred to as "a fine original grid-cell") (see FIG. 10).

It is noted that the dividing processing is executed by using 5 m-mesh X-direction dividing average-distance da (0.5844 meter or 0.559 meter). The dividing processing of the 5 m-mesh x-direction/y-direction will be described later.

Then, in TIN bilinear interpolation processing (S50), the plane-rectangular 5 m-meshes Mbi are sequentially defined (layer) to the X-Y plane corresponding to the area Ei, and for each of the plane-rectangular 5 m-meshes Mbi, the TIN bilinear interpolation (see FIG. 13) is executed for each of the fine grid-cells mi (m1, m2, . . . ) in each of the plane-rectangular 5 m-meshes Mbi (S50).

Each elevation value of the fine grid-cells mi in the respective plane-rectangular 5 m-meshes Mbi is referred to as a bilinear interpolated elevation-value zri.

In the first embodiment, a cluster (a set) of meshes (the plane-rectangular 5 m-meshes Mbi) defined in the X-Y plane corresponding to the area Ei is referred to as a rasterized fine-mesh large-frame Mi.

Figure 14:
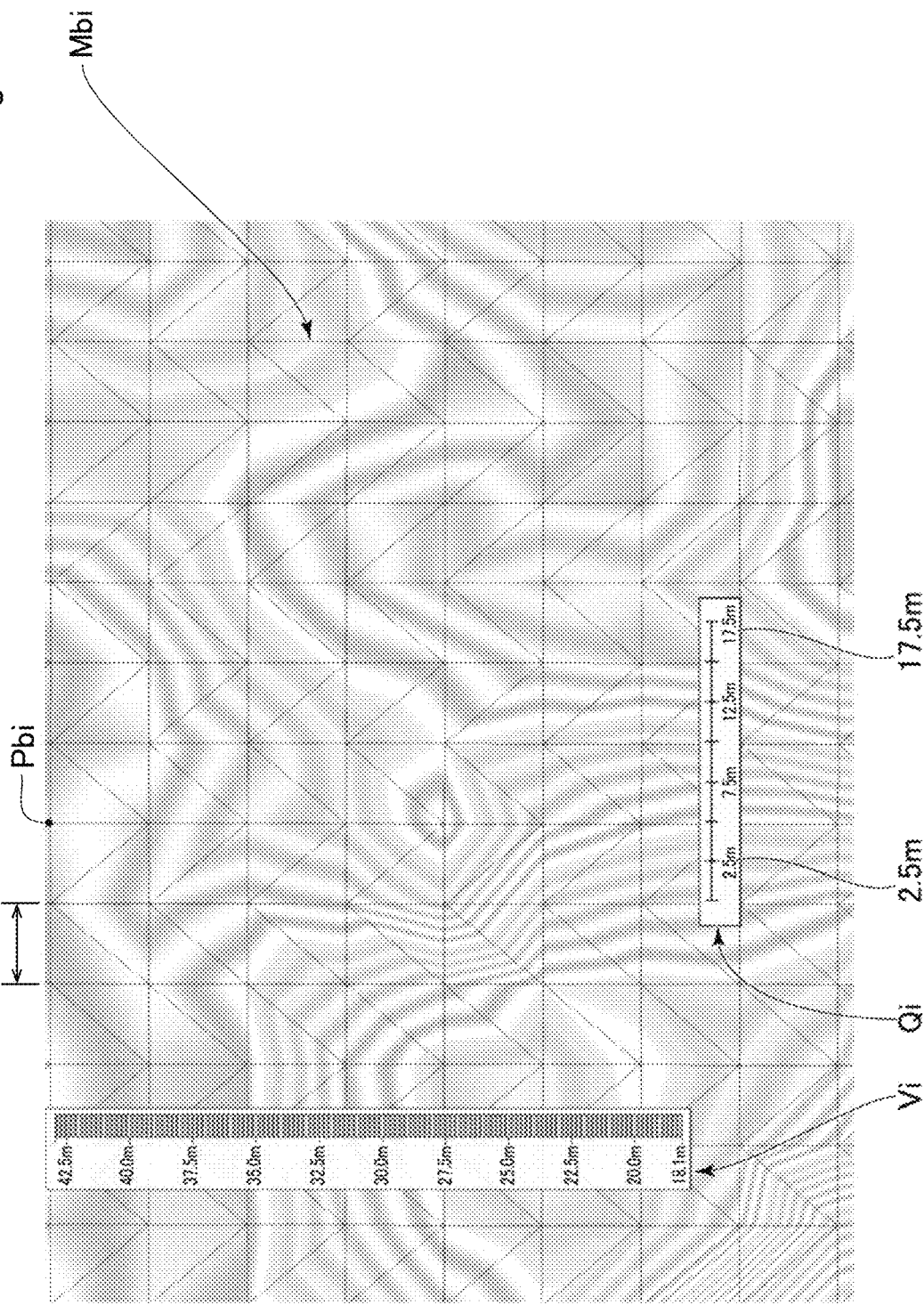
FIG. 14 is a diagram illustrating the plane-rectangular 5 m-mesh Mbi after the TIN biliner-interpolation.

Then, in the TIN bilinear interpolation processing (S50), each time the bilinear interpolated elevation-value zri is obtained, the bilinear interpolated elevation-value zri is allocated to the fine grid-cell mi (also called rasterization: see FIG. 14).

Next, a smoothing process (S60) is executed.

In the smoothing process (S60), the fine grid-cell mi is designated, and a moving-average mesh Fmi (arithmetic mean, moving average or the like) of a 9×9 grid-cells (a cell size is 0.5844 meter or 0.559 meter) is multiplied for the designated fine grid-cell mi (also referred to as smoothing processing). Values given to the grid-cells (fmi) of the moving-average mesh Fmi (see FIG. 16) are referred to as smoothing elevation-values zfi (zf1, zf2, . . . ). Each image of the smoothing elevation-values zfi (zf1, zf2, . . . ) is referred to as a smoothing image Gfi (see FIGS. 18, 19 and 20).

Next, in a red imaging process (S70), the fine grid-cells mi are sequentially designated, and for each of the designated fine grid-cell mi, the fine grid-cell mi is taken as a subject sampling-point to obtain a slope gradient, an over-ground openness and an under-ground openness by using the smooth fine elevation-values (also called the smoothing elevation-values) existing within a considering distance L (For example, 50 meters) from the subject sampling-point, and a ridge-valley value (also referred to as an elevation-depression degree) is determined by the over-ground openness and the under-ground openness. Then, the slope gradient is assigned to the red chroma saturation, or saturation, and the ridge-valley value is assigned to the brightness, and red image data gmi (gm1, gm2, . . . ) for each of the fine grid-cells mi (0.559 meter) are generated by combining the red chroma saturation and the brightness (S70).

The consideration distance L is converted into a cell number of each fine grid-cell. The cell number corresponds to L/da.

Figure 2:
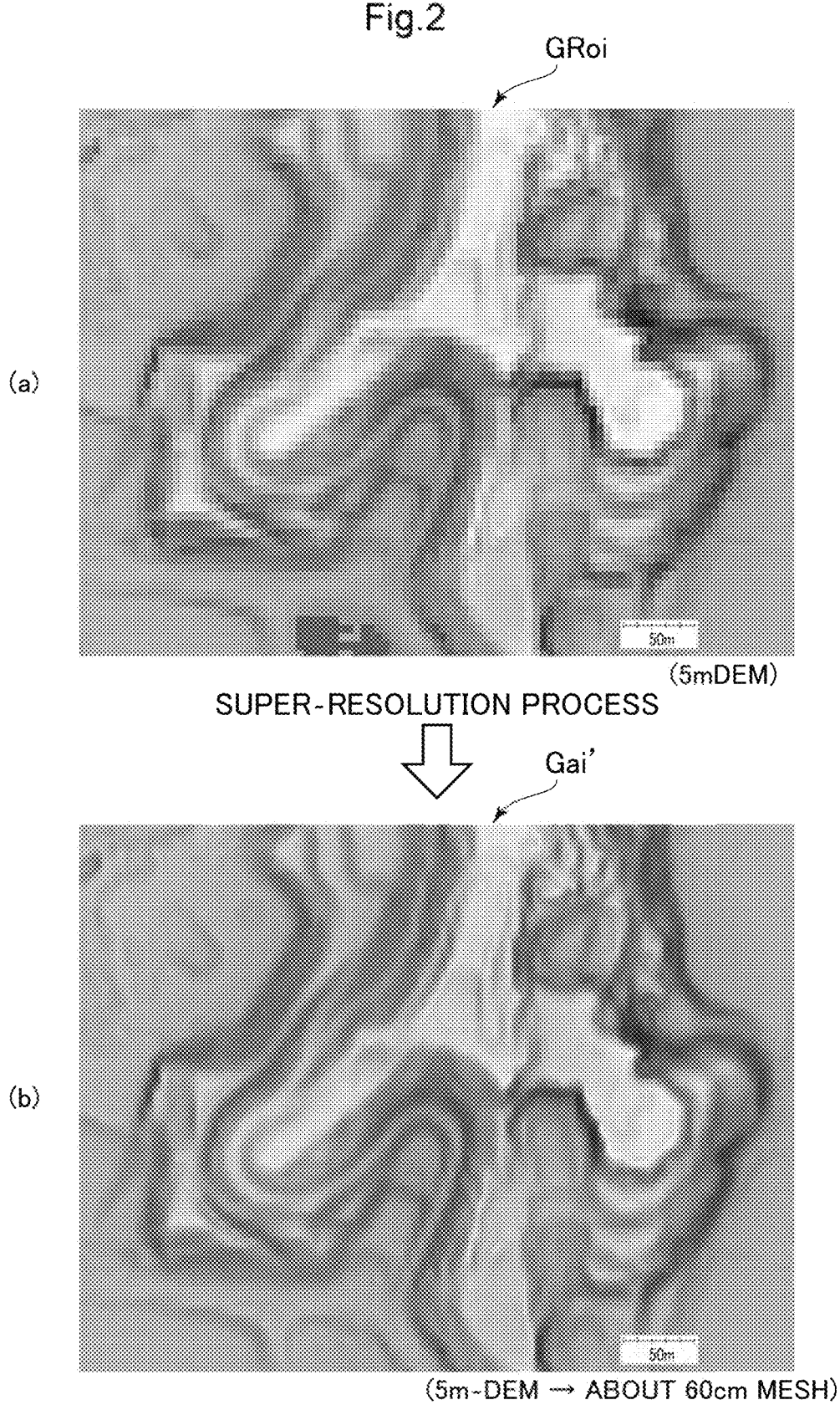
FIG. 2 is a diagram for comparison between a conventional 5 m-DEM red image GRoi generated using a 5 m-DEM and a super-resolution red stereoscopic-visualization image Gai'.

Then, the red image data gmi (gm1, gm2, . . . ) is written in a display memory (S90), and displayed on a screen as the super-resolution red-color stereoscopic-visualization image Gai' illustrated in FIG. 2(b) (S100).

Before the red stereoscopic-visualization image generation process, the smoothing process may be preferably executed. The smoothing process and the red stereoscopic-visualization image generation process will be described in detail in the second embodiment. FIG. 2(a) illustrates a red relief image map (in the first embodiment, referred to as "the 5 m-DEM red image GRoi") generated using the 5 m-DEM of the 5 m-DEM base map Fa, and FIG. 2(b) illustrates the super-resolution red stereoscopic-visualization image Gai' of the first embodiment.

The 5 m-DEM red image GRoi in FIG. 2(a) is an image obtained by subjecting the 5 m-DEM based on a cluster of laser points acquired by an aircraft to red stereoscopic imaging process and enlarging by several times an area of about 450 meters to 500 meters in width and about 500 meters to 550 meters in length on the display screen. And a cell of the display screen corresponds to about five meters. The 5 m-DEM red image GRoi is jagged as illustrated in FIG. 2(a).

On the other hand, the super-resolution red stereoscopic-visualization-image Gai' in FIG. 2(b) is not jagged.

Figure 3:
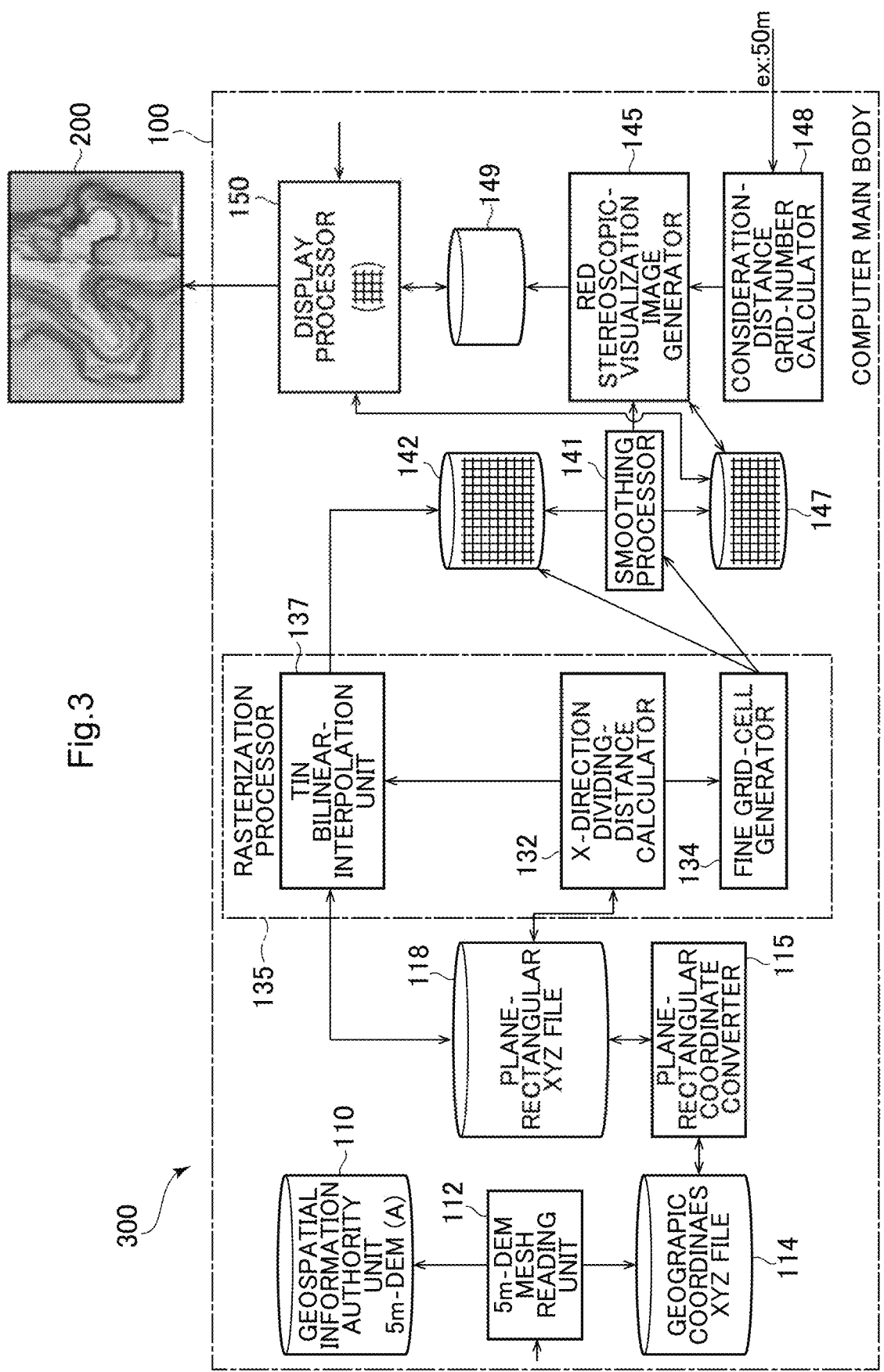
FIG. 3 is a schematic diagram of the processing system for super-resolution stereoscopic-visualization according to the first embodiment.

Next, a specific configuration will be given with reference to FIG. 3. FIG. 3 is a schematic block diagram of a super-resolution stereoscopic visualization system according to the first embodiment. As illustrated in FIG. 3, the super-resolution stereoscopic visualization system 300 according to the first embodiment includes a computer main body 100 and a display 200.

The computer main body 100 includes a base map database 110 storing the 5 m-DEM base map Fa, a 5 m-DEM mesh reading unit 112, a geographic-coordinates XYZ-point file 114, a plane-rectangular-coordinate converter 115, a plane-rectangular XYZ-point file 118, a rasterization processor 135, a fine grid-cell memory (layer file) 142, a smoothing processor 141, a smoothing image memory (layer file) 147, a consideration-distance cell-number calculator 148, a red stereoscopic-visualization image generator 145, and a red stereoscopic-visualization image memory (layer file) 149.

The rasterization processor 135 includes an X-direction divide-distance calculator 132, a fine grid-cell generation unit 134, and a TIN bilinear-interpolation unit 137. A display processor 150 is included to display the super-resolution red-color stereoscopic visualization image Gai' of 5 m-DEM illustrated in FIG. 2(b) on a screen of the display unit 200.

(Description of System Components)

The base map database 110 stores the 5 m-DEM base map Fa (topography). The 5 m-DEM of the 5 m-DEM base map Fa is provided with the cluster of measure points (interval with tens of centimeters) acquired by airborne laser measurements, and the area of the measure points covers the whole of Japan (tens to hundreds of kilometers). Each of the measure points includes a latitude Ii, a longitude Ii, an elevation value zi, an intensity, and the like, and are referred to as 5 m-DEM latitude/longitude-point data Pai in the first embodiment.

Figure 4:
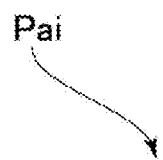
FIG. 4 is a diagram illustrating a specific example of the 5 m-DEM latitude/longitude point data Pai.

The 5 m-DEM mesh reading unit 112 exports 5 m-DEM latitude/longitude point data Pai corresponding to the area Ei (E.G., 50 meters to 1500 meters in length and width) entered (designated) by an operator from the base map database 110 of the 5 m-DEM to the geographic-coordinate XYZ point file (memory) 114. FIG. 4 illustrates a specific example of the 5 m-DEM latitude/longitude point data Pai of the geographic-coordinate XYZ point file 114.

FIG. 5 illustrates a specific example of the latitude/longitude 5 m-mesh Mai based on the 5 m-DEM latitude/longitude point data Pai. In FIG. 5, the elevation values are represented in a color gradient map. The color gradient map is displayed in color by converting contour data based on the elevation values assigned to the fine grid-cells mi, generated in the fine grid-cell memory (layer file) 142 according to the first embodiment, into the latitude/longitude coordinates. It is preferable to superimpose the latitude/longitude 5 m-mesh Mai on the color gradient map.

The plane-rectangular-coordinate converter 116 projects and converts the 5 m-DEM latitude/longitude point data Pai, including the latitude Ii, the longitude Ii and the elevation value zi, of the geographic-coordinate XYZ-point file (memory) 114 to the plane-rectangular coordinate (it is preferable to use the height as it is), and exports the converted data to the plane-rectangular XYZ-point file (memory) 118 as the 5 m-DEM plane-rectangular point data Pbi.

Figure 7:
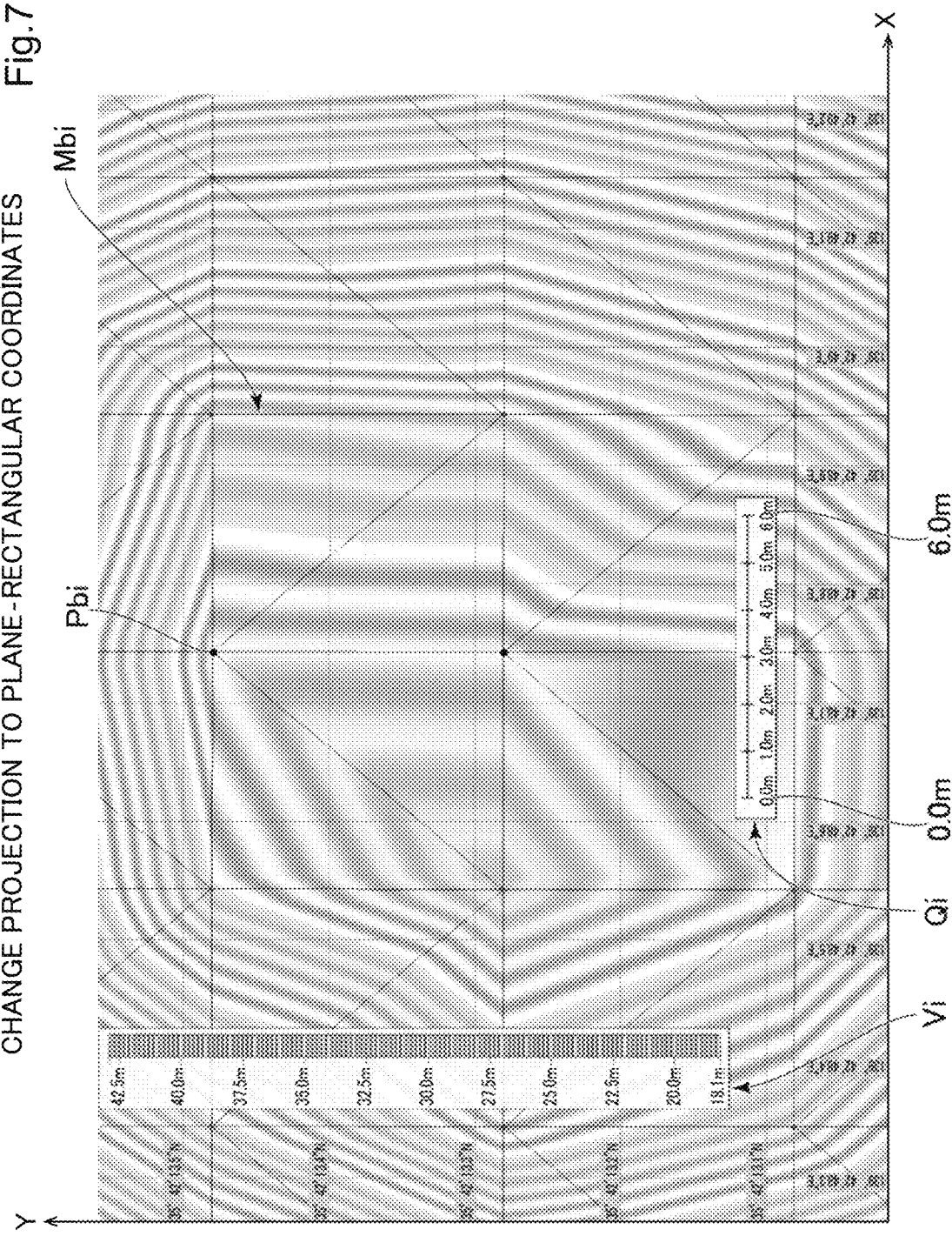
FIG. 7 is a diagram illustrating a specific example of a plane-rectangular 5 m-mesh Mbi based on the plane-rectangular-coordinate 5 m-DEM point data Pbi.

FIG. 6 is a specific example illustrating the 5 m-DEM plane-rectangular point data Pbi (xbi, ybi, zbi, . . . ) on the XYZ-point file. FIG. 7 is a specific example of the plane-rectangular 5 m-mesh Mbi based on the plane-rectangular-coordinate 5 m-DEM point data Pbi. In FIG. 7, the elevation value is represented in the color gradient map. As illustrated in FIG. 7, the latitude/longitude 5 m-mesh Mai having a square-shape in FIG. 5 is changed to a rectangular-shape (distorted, in detail).

In FIG. 7, the elevation values are represented in the color gradient map. The color gradient map is displayed in color by converting contour data based on the elevation values assigned to the fine grid-cells mi, generated in the fine grid-cell memory (layer file) 142 according to the first embodiment, into the latitude/longitude coordinates. The plane-rectangular 5 m-mesh Mbi is superimposed on the color gradient graphic of the contours.

As illustrated in FIG. 6, the 5 m-DEM plane-rectangular point data Pbi is provided with the area Ei, a mesh number of the plane-rectangular 5 m-mesh Mbi (simply refer to "the plane-rectangular 5 m-mesh Mbi"), quadruple points of the 5 m-DEM plane-rectangular point data Pbi, and the like (a reflection intensity may be included).

In the first embodiment, such data are referred to as "5-m plane-rectangular point data Pbi". Because zbi is attribute information, zbi is represented in parentheses in FIG. 6. When intended 5 m-DEM plane-rectangular point data Pbi is not stored in the plane-rectangular XYZ-point file 118 as actual data (data including practical items such as the reflection intensity, the elevation value, and the like) at 5-meter interval, it is preferable to determine such items of the intended 5 m-DEM plane-rectangular point data Pbi by interpolation (TIN interpolation) using surrounding 5 m-DEM plane-rectangular point data Pbi.

Figure 8:
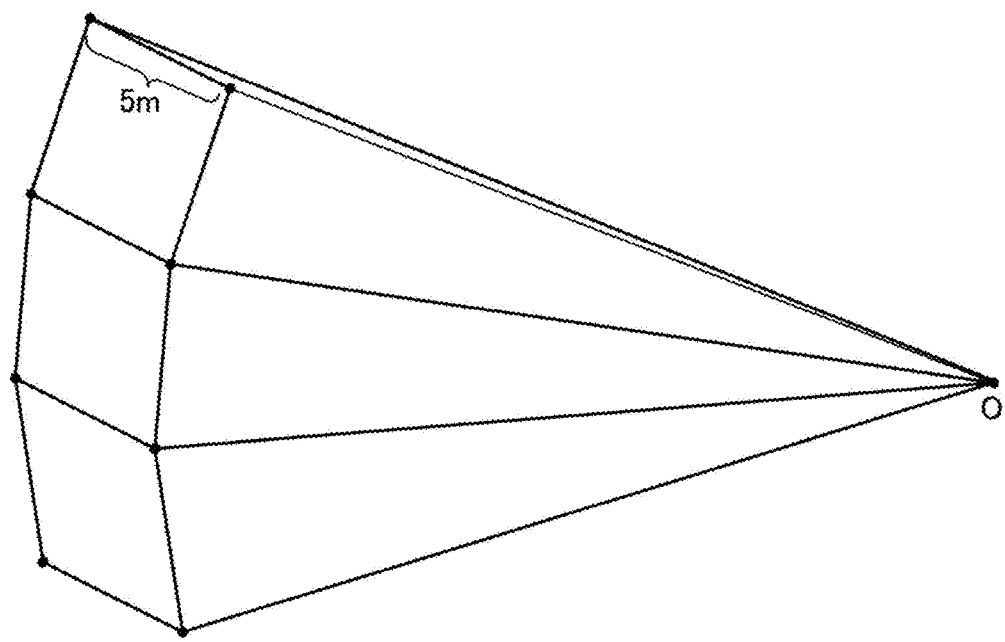
FIG. 8 is a diagram illustrating a conformal cylindrical projection.

The plane-rectangular-coordinate conversion is a "conformal cylindrical projection" generating a map by placing the Earth in a cylinder being in contact only with the Earth's equator, projecting the longitude and latitude lines onto the cylinder, and then opening the cylinder. As illustrated in FIG. 8, the closer to the pole, the wider the interval between the latitude lines. In FIG. 8, "0" indicates the center of the Earth.

Figure 9:
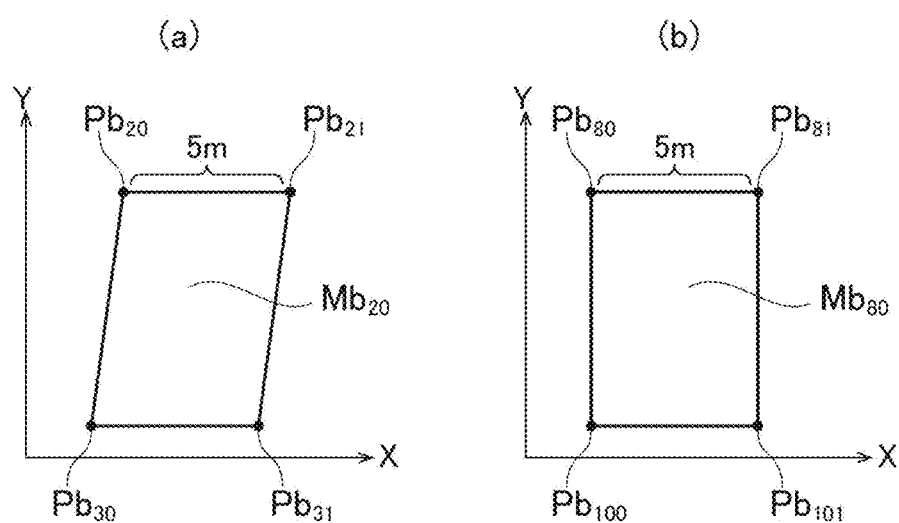
FIG. 9 is a diagram illustrating the plane-rectangular 5 m-mesh Mbi.

Therefore, when converted to the plane-rectangular coordinate, distortion may occur, so that, in the mesh implemented by connecting quadruple points of the 5 m-DEM plane-rectangular point data Pbi, the plane-rectangular 5 m-mesh Mbi (Mb20) may have a diagonal rectangle due to distortion depending on the area Ei, as illustrated in FIG. 9(*a*), or the plane-rectangular 5 m-mesh Mbi (Mb80) may have a rectangle, or a square, without distortion, as illustrated in FIG. 9(*b*). In the first embodiment, for the purpose of explanation, such mesh is referred to as "the plane-rectangular 5 m-mesh Mbi" regardless of the presence or absence of distortion.

FIG. 9(*a*) illustrates an example of the plane-rectangular 5 m-mesh Mb20 in which the 5 m-DEM plane-rectangular point data Pb20, Pb21, Pb30 and Pb31 are connected.

FIG. 9(*b*) illustrates an example of the plane-rectangular 5 m-mesh Mb80 in which the 5 m-DEM plane-rectangular point data Pb80, Pb81, Pb100 and Pb101 are connected.

In the first embodiment, a cluster (set) of plane-rectangular 5 m-mesh Mbi (Mb1, Mb2, . . . ) is referred to as "a plane-rectangular 5 m-mesh large-frame Mai".

The X-direction divide-distance calculator 132 in the rasterization processor 135 designates quadruple points of the 5 m-DEM plane-rectangular point data Pbi in the plane-rectangular XYZ-point file 118.

Specifically, a designated 5 m-DEM plane-rectangular point data Pbi is assigned, the other 5 m-DEM plane-rectangular point data Pbi having the same Y-coordinate yai and having the X-coordinate next to the designated 5 m-DEM plane-rectangular point data Pbi is retrieved. Then, the plane rectangular 5 m-mesh Mbi is provided with quadruple points of the designated 5 m-DEM plane-rectangular point data Pbi, a diagonal 5 m-DEM plane-rectangular point data Pbi at a diagonal position to the designated 5 m-DEM plane-rectangular point data Pbi, the other 5 m-DEM plane-rectangular point data Pbi, and the other diagonal 5 m-DEM plane-rectangular point data Pbi at a diagonal position to the other 5 m-DEM plane-rectangular point data Pbi.

Then, for each plane-rectangular 5 m-mesh Mbi, the X-direction divide-distance calculator 132 sequentially determines a 5 m-mesh X-direction distance in the X-direction between the 5 m-DEM plane-rectangular point data Pbi and the adjacent 5 m-DEM plane-rectangular point data Pbi.

Then, for each 5 m-mesh X-direction distance, the 5 m-mesh X-direction divide-distance di (for example, 0.559 meter or 0.5844-meter, 0.592 meter, . . . ) for evenly dividing the 5 m-mesh X-direction distance by nine (for example, 0.559 meter) is sequentially determined. Then, the 5 m-mesh X-direction divide-distances di for the respective plane-rectangular 5 m-meshes Mbi are added, and a 5 m-mesh X-direction dividing average-distance da (for example, 0.5844 meter or 0.559 meter) is obtained by averaging the added value by nonuple number of the plane-rectangular 5 m-mesh Mb.

Generally, improper interval of the grid-cell results in grid-shaped artifacts due to the projection conversion of latitude and longitude relative to the planar-rectangular coordinates and interference of the interpolation. The 5 m-mesh X-direction divide-distance di is a divide-distance that results in the fine grid-cell mi having a shape of square or rectangle as much as possible.

As a result of the experiment, in the case of dividing the 5 m-mesh by the 5 m-mesh X-direction dividing average-distance da of, for example, 0.5844 meter or 0.559 meter (about 60 centimeters), it has been found that no grid-shaped artifact has occurred when the image has been displayed on the screen.

The fine grid-cell generation unit 134 (also called as "fine grid-cell generation processing") defines the X-Y plane corresponding to the area Ei into the fine grid-cell memory 142. Then, the 5 m-mesh X-direction dividing average-distance da (for example, 0.559 meter) determined by the X-direction divide-distance calculator 132 is read, and the X-axis and the Y-axis are divided by the 5 m-mesh X-direction dividing average-distance da (for example, 0.559 m or 0.5844 m) from the origin coordinates of the X-Y plane in the fine grid-cell memory 142. And, straight lines parallel to the X-axis and the Y-axis are defined from each dividing point, and the fine grid-cell mi having, for example, a size of 0.559 meter square is generated in the X-Y plane in the fine grid-cell memory 142 (see FIG. 10). The column may be represented by "e" and the row may be represented by "k".

FIG. 11 is an example of coordinates of the interpolated elevation values after triangular interpolation of the divided fine grid-cells mi (m1, m2, m3, . . . ).

The example of the coordinates is shown as below.

Idx, X, Y, Elevation (m), Length, Total Length, Heading
1, −10835.893, −32871.056, 41.274, 0.559 m, . . . , 269° 55'48.4"
2, −10836.452, −32871.056, 41.412, 0.79 m, 0.559 m, 134° 52'44.3"
3, −10835.893, −32871.614, 41.214, . . . , 1.349 m, . . . .

Figure 12:
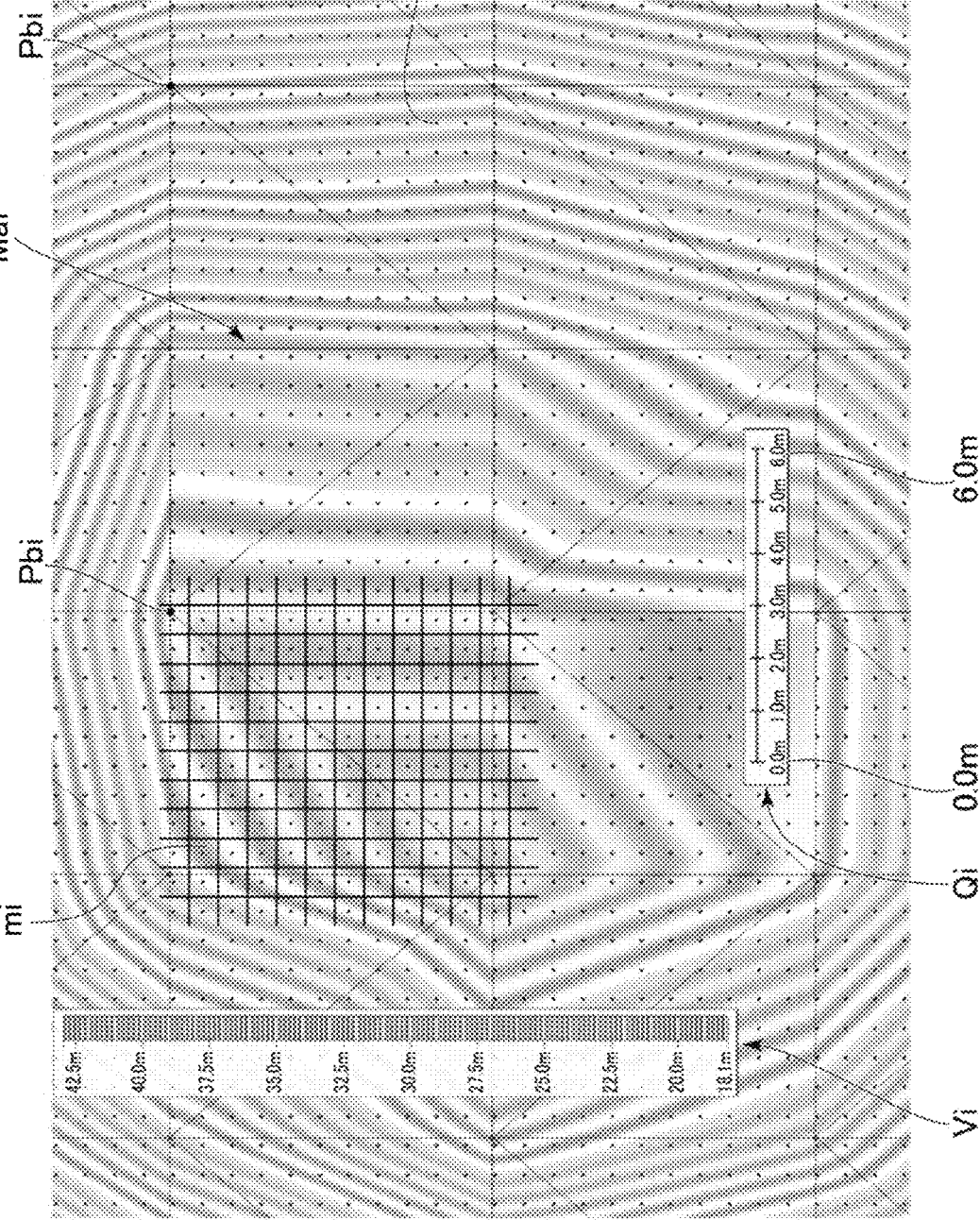
FIG. 12 is a diagram illustrating an example of the plane-rectangular 5 m-mesh Mbi superimposed on a color gradient map in which contour data is displayed in color (plane-rectangular coordinate)

The plane-rectangular 5 m-mesh MN is defined on the X-Y plane of the fine grid-cell memory 142, the contour data based on the fine grid-cell mi generated in the fine grid-cell memory (layer file) 142 obtained according to the first embodiment is displayed in color (plane-rectangular coordinate). FIG. 12 illustrates an example in which the plane-rectangular 5 m-mesh Mbi is superimposed on the color gradient map.

However, FIG. 12 illustrates an example in which the fine grid-cell mi (m1, m2, m3, . . . ) in the plane-rectangular 5 m-mesh Mbi is divided by approximately 9×11.

The TIN bilinear interpolation unit 137 (also simply referred to as "the elevation-value interpolation unit") interpolates and allocates the elevation values of each fine grid-cell mi in the fine grid-cell memory (layer file) 142.

Figure 13:
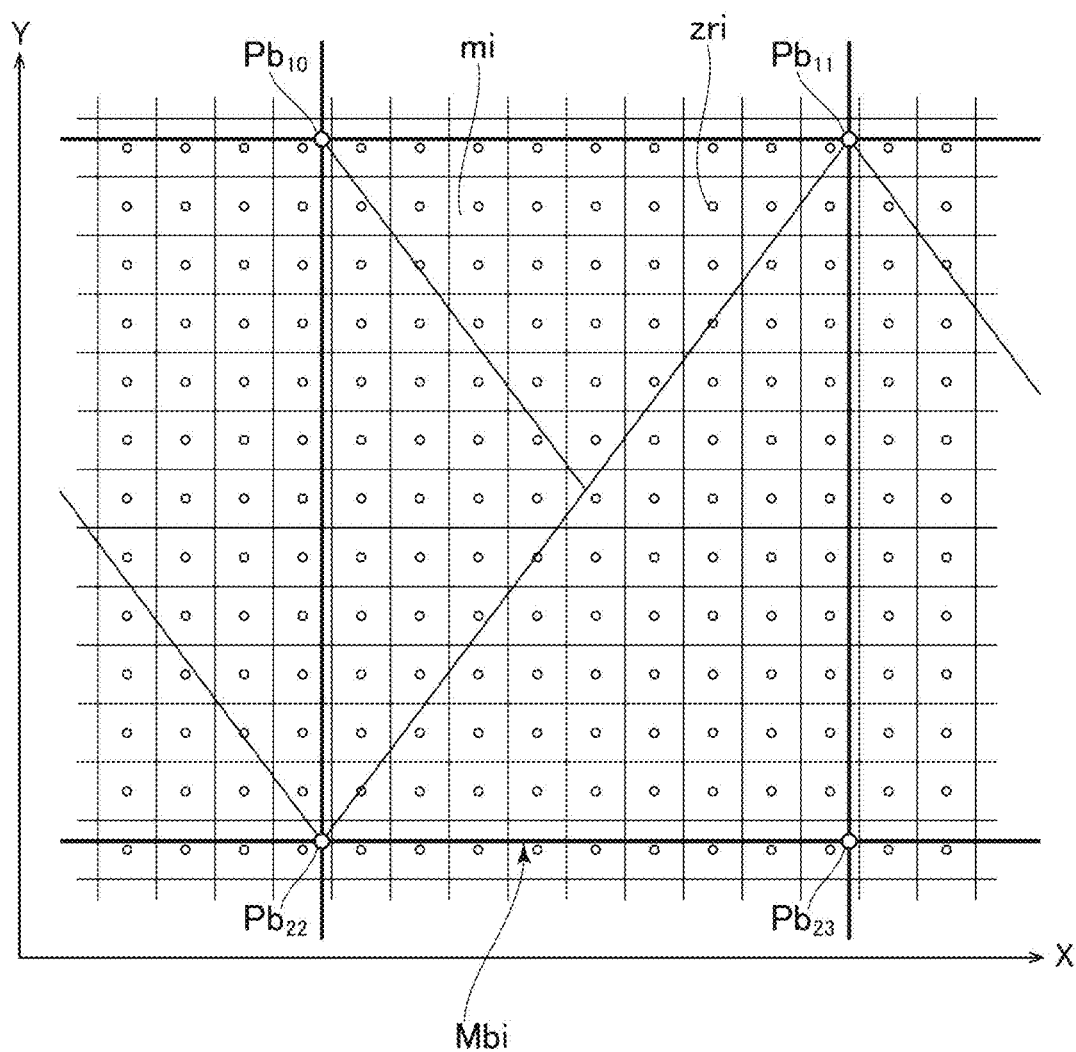
FIG. 13 is a diagram illustrating a TIN biliner-interpolation.

Then, as illustrated in FIG. 13, the TIN bilinear interpolation unit 137 defines the plane-rectangular 5 m-mesh Mbi to the X-Y plane in the fine grid-cell memory (layer file) 142 and executes the TIN biliner-interpolation. FIG. 13 illustrates the plane-rectangular 5 m-mesh Mbi provided with the 5 m-DEM plane-rectangular point data Pb10, Pb11, Pb22 and Pb23.

Then, the TIN is defined for each plane-rectangular 5 m-mesh Mbi and the fine grid-cell mi (m1, m2, m3, . . . ) is interpolated (see FIG. 13). The interpolated elevation-values are called "bilinear-interpolated elevation-values zri (zr1, zr2, . . . )". Then, the smoothing processor 141 (also referred to as smoothing processing) is started.

Since the given plane-rectangular 5 m-mesh Mbi is distorted, the X-direction and the Y-direction are shifted as illustrated in FIG. 13. In order to determine an interpolation value by the TIN biliner-interpolation, it is preferable to adopt the elevation value of the plane-rectangular 5 m-mesh Mbi having the larger area of the fine grid-cell mi (m1, m2, m3, . . . ) among the adjacent plane-rectangular 5 m-meshes Mbi, which are conterminous to the given plane-rectangular 5 m-mesh Mbi.

FIG. 14 illustrates an example of the color gradient map of the contours based on the bilinear-interpolated elevation-values zri (zr1, zr2, . . . ) after TIN biliner-interpolation, that is, the bilinear-interpolated elevation-values zri in the fine grid-cell memory (layer file) 142 is represented by color. Also, the plane-rectangular 5 m-mesh Mbi is superimposed.

Figure 15:
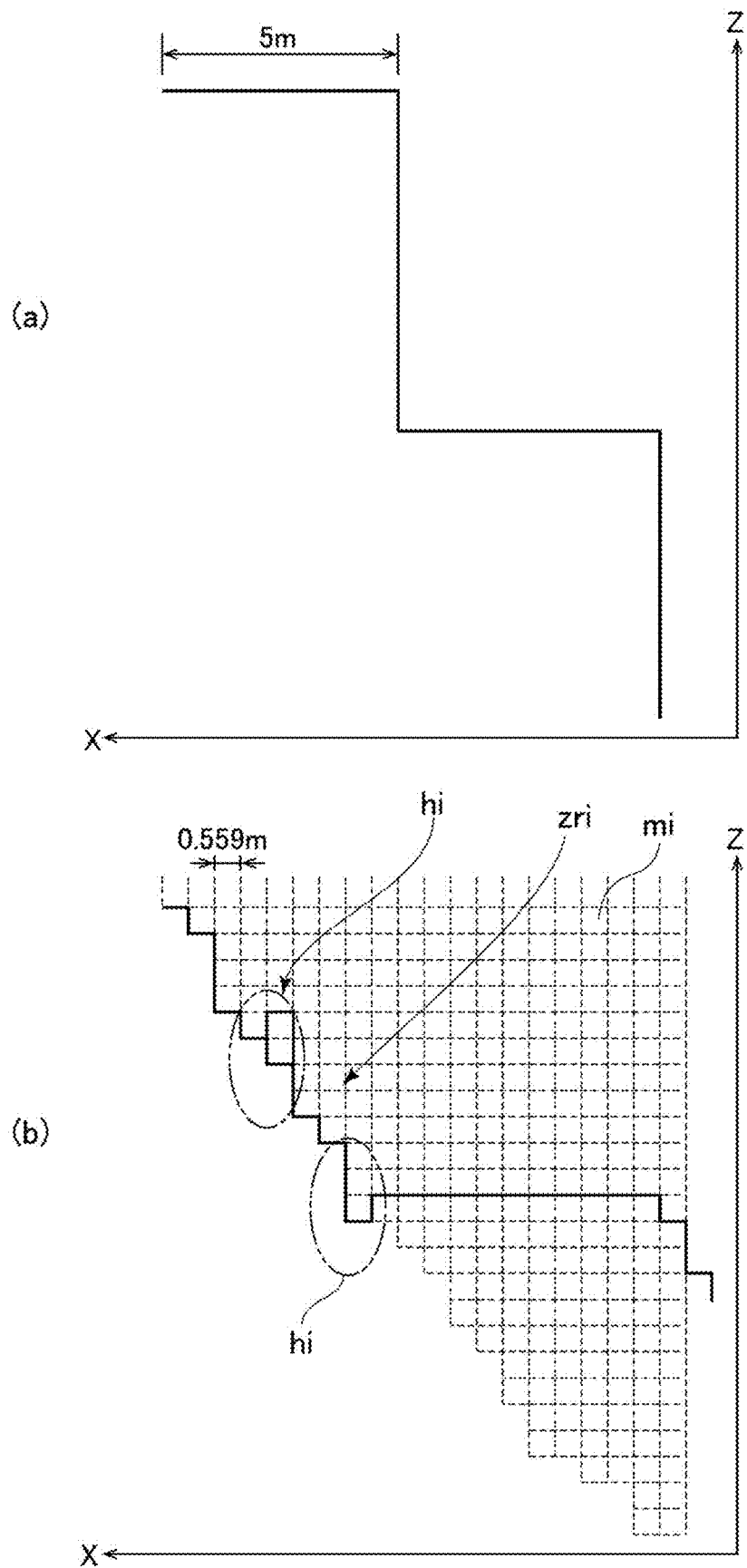
FIG. 15 a diagram illustrating problems with the TIN biliner-interpolation.

FIG. 15(a) illustrates the elevation value (zb) of the plane-rectangular 5 m-mesh Mbi, and FIG. 15(b) illustrates the bilinear-interpolated elevation-values zri (zr1, zr2, . . . : for example, interval of 0.559 meter—four decimal places or less are omitted) assigned to the fine grid-cell mi generated in the fine grid-cell memory (layer file) 142.

However, in the biliner-interpolation, as illustrated in FIG. 15(b), the edge is abruptly protruded (hi), or the valley is abruptly lowered (hi). Therefore, in the first embodiment, the smoothing processor 141 is included.

In the fine grid-cell mi, the bilinear-interpolated elevation-values zri (zr1, zr2, . . . ), quadruple point-coordinates implementing the fine grid-cell mi, the plane-rectangular 5 m-mesh Mbi, name of the area Ei and the like are stored as a fine raster data RaMi (not shown).

The smoothing processor 141 carries out moving-average processing. In the moving-average processing, every time an operator feeds instructions for the smoothing processing, the 5 m-mesh X-direction dividing average-distance da (for example, 0.559 meter) is read. Then, a moving-average mesh Fmi illustrated in FIG. 16 is generated by arranging nonuple grid-cells (also referred to as smoothing grid-cells), which has horizontal and vertical sizes of the 5 m-mesh X-direction dividing average-distance da (for example, 0.559 meter), in both row and column.

Figure 16:
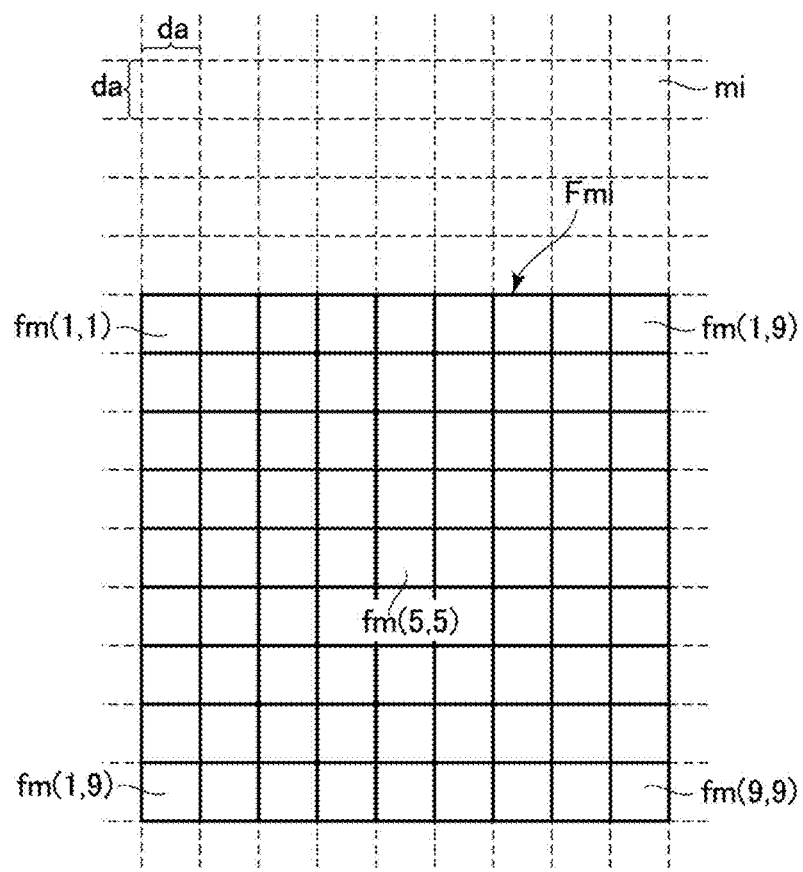
FIG. 16 is a diagram illustrating a moving-average mesh Fmi.

FIG. 16 illustrates a cell number fm (i, j) of the moving-average mesh Fmi, where "i" denotes a column and "j" denotes a row.

Then, the X-Y plane corresponding to the same area Ei defined in the fine grid-cell memory 142 (also referred to as "the first rasterization memory") is defined in the smoothing image memory (layer file) 147, and the above-mentioned fine grid-cell generation processing in which the respective X-direction and Y-direction of the X-Y plane are divided by the 5 m-mesh X-direction dividing average-distance da (For example, 0.559 meter) is executed to define the fine grid-cells mi (m1, m2, . . . ).

Then, as illustrated in FIG. 16, the smoothing processor 141 sequentially defines a center grid-cell (fm (5, 5)) of the moving-average mesh Fmi. A moving-average value (a weighted average value) in the center grid-cell is referred to as "a smoothing-processing elevation-value zfi"—also referred to as "a smoothing elevation-value zfi"—.

The smoothing elevation-value zfi (not illustrated) is assigned to the fine grid-cell mi defined in the smoothing image memory (layer file) 147.

Figure 18:
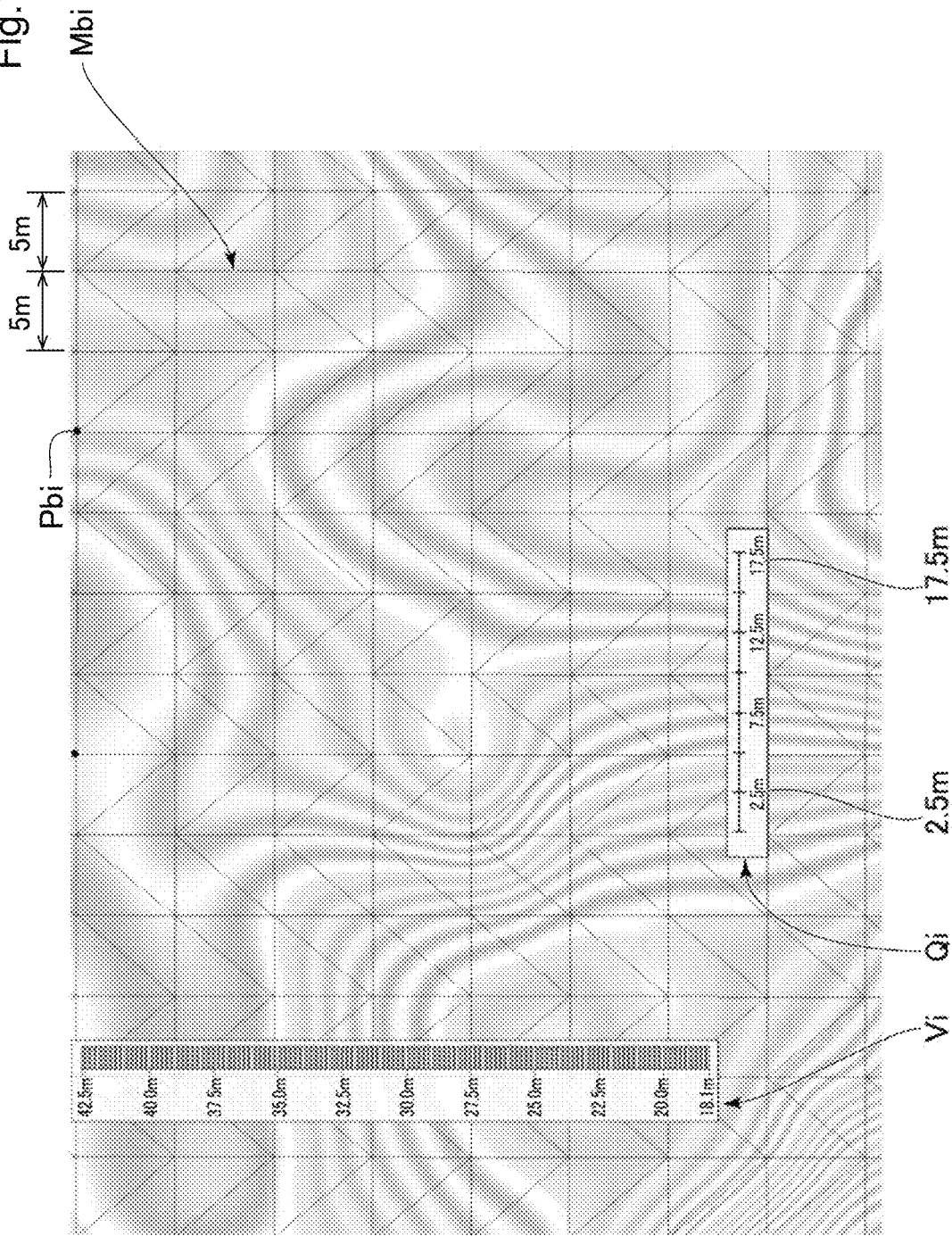
FIG. 18 is a diagram illustrating an example of the first moving-average processing.
Figure 19:
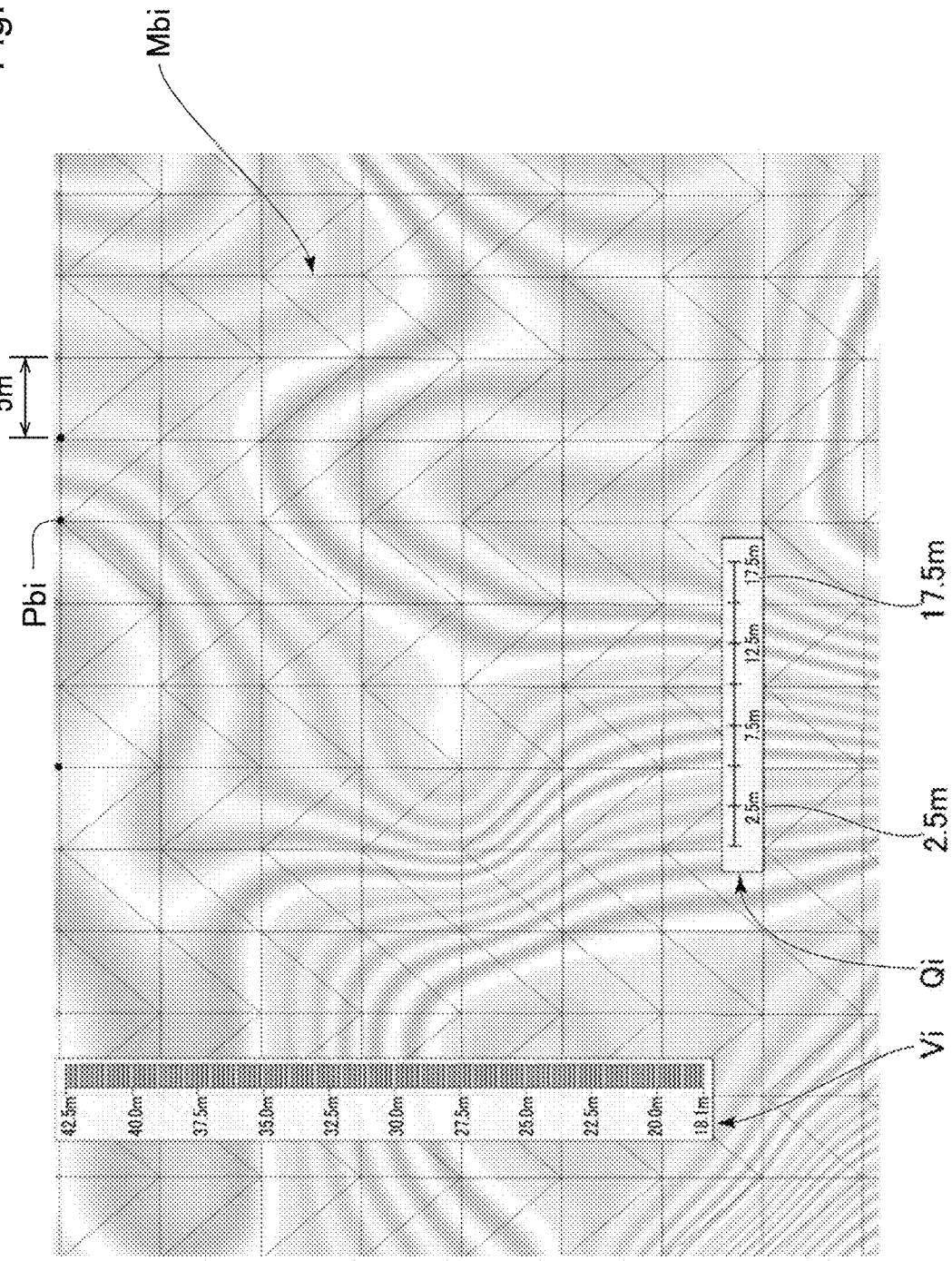
FIG. 19 is a diagram illustrating the second moving-average processing.
Figure 20:
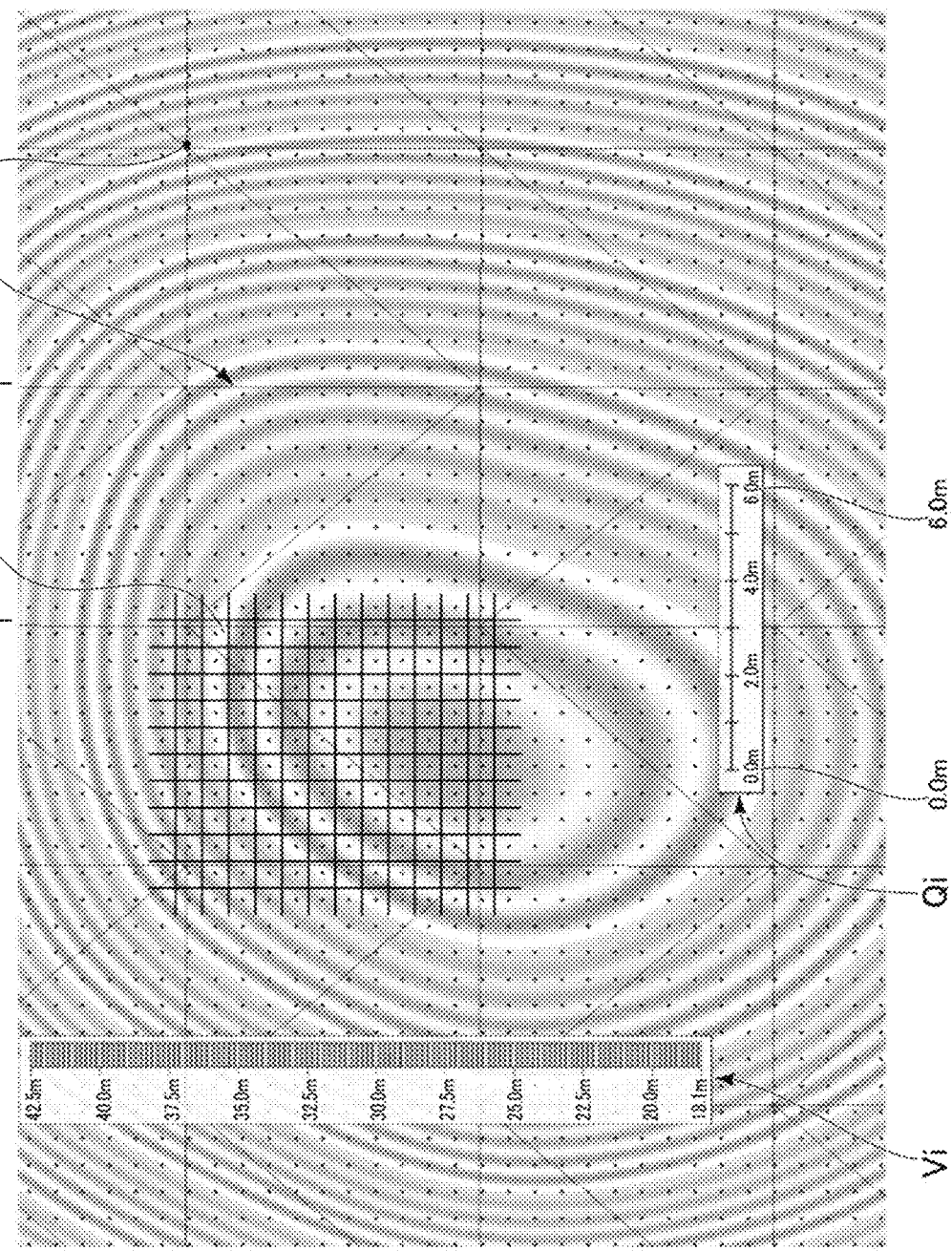
FIG. 20 is an enlarged diagram illustrating an example of the second moving-average processing.

Various kinds of data (hereinafter, referred to as "a smoothing fine elevation-value raster-image data RGi", see FIG. 21) are associated with the smoothing elevation-values zfi (zf1, zf2, . . . ). FIG. 18 illustrates an example of an image by first moving average, and FIG. 19 illustrates an example of an image by second moving average. FIG. 20 illustrates an enlarged example of the image by the second moving average.

It should be noted that FIGS. 18 to 20 are examples of the gradient maps of the contours based on the smoothing elevation-values zfi (zf1, zf2, . . . ), on which the plane-rectangular 5 m-mesh Mbi is superimposed. Further, the fine grid-cells mi (m1, m2, m3, . . . ) in the plane-rectangular 5 m-mesh Mbi are an example in the case where each of the fine grid-cells mi is divided approximately by 9×11.

As illustrated in FIGS. 18 to 20, sharp portions of the contours in FIG. 12 are rounded and smoothed. In FIG. 20, the fine grid-cells mi (m1, m2, ... ) each having a cell size of 0.559 meter is illustrated, and the smoothing elevation-values zfi (zf1, zf2, ... ) representing the fine grid-cells mi (m1, m2, ... ) are illustrated by dots, respectively.

In other words, portions indicated by "hi" in FIG. 15(b) are smoothed (see FIG. 17). The operator checks the smoothness of the contours in the smoothing image Gfi displayed on the screen and instructs the moving average processing (also called smoothing) as necessary. The instruction is transmitted from the display processor 150 to the smoothing processor 141.

As illustrated in FIG. 21, the smoothing fine elevation-value raster-image data RGi includes the area Ei, the plane-rectangular 5 m-mesh Mbi, the coordinates of quadruple corners (for example, Pb1, Pb2, Pb3, Pb4) of the plane-rectangular 5 m-mesh Mbi, the fine grid-cell mi (number), the 5 m-mesh X-direction dividing average-distance da (for example, 0.559 meter), the bilinear-interpolated elevation-value zri of the fine grid-cell mi, the first smoothing elevation-value zfi, the second smoothing elevation-value zfi', and the like. Note that, for example, a line connecting PL1 to PL2 is adopted as an entrance, and a line connecting PL3 to PL4 is adopted as an exit.

In the first embodiment, the first smoothing elevation-value zfi will be described (hereinafter simply referred to as "the smoothing elevation-value zfi"). In other words, as illustrated in FIG. 17(a), the mesh-size of the 5 m-DEM is given by a unit of five meters in the plane of the Z-axis and the X-axis. However, in the first embodiment, since the X-Y plane defined in the smoothing image memory 147 is divided by 0.559 meter or 0.5844 meter, when the elevation values are represented in the Z-axis and the X-axis, as illustrated in FIG. 17(b), the protrusion, shown with "hi", of FIG. 15(b) is suppressed by the moving average processing according to the first embodiment, and each elevation value is smoothed.

FIG. 22(a) illustrates a specific example of the data in the X-Y plane of the fine grid-cell memory 142 before smoothing, and FIG. 22(b) illustrates a specific example of the data in the X-Y plane of the image memory 147 after smoothing.

The red stereoscopic-visualization image generator 145 carries out the red stereoscopic image generation processing using the smoothing fine elevation-value raster-image data RGi in the smoothing image memory (layer file) 147. In the red stereoscopic image generation processing, the fine grid-cells mi (size of 0.559 meter) included in the smoothing fine elevation-value raster-image data RGi in the smoothing image memory (layer file) 147 are sequentially designated as the subject sampling-points, and the slope gradient, the over-ground openness and the under-ground openness are obtained based on the smoothing elevation-value zfi found in the local area having the consideration distance L as the radius from the subject sampling-point. Then, the ridge-valley value is obtained from the over-ground openness and the under-ground openness. The slope gradients are assigned to the chroma saturations of the red-colors, the ridge-valley values (also called "the elevation-depression degrees") are assigned to each brightness. Thus, the red image data gmi (gm1, gm2, ... ) for each of the fine grid-cells mi obtained by synthesizing the above-mentioned chroma saturation and brightness are generated in the red stereoscopic-visualization image memory (layer file) 149. Such image is generically referred to as "a super-resolution red stereoscopic-visualization image Gai".

Figure 23:
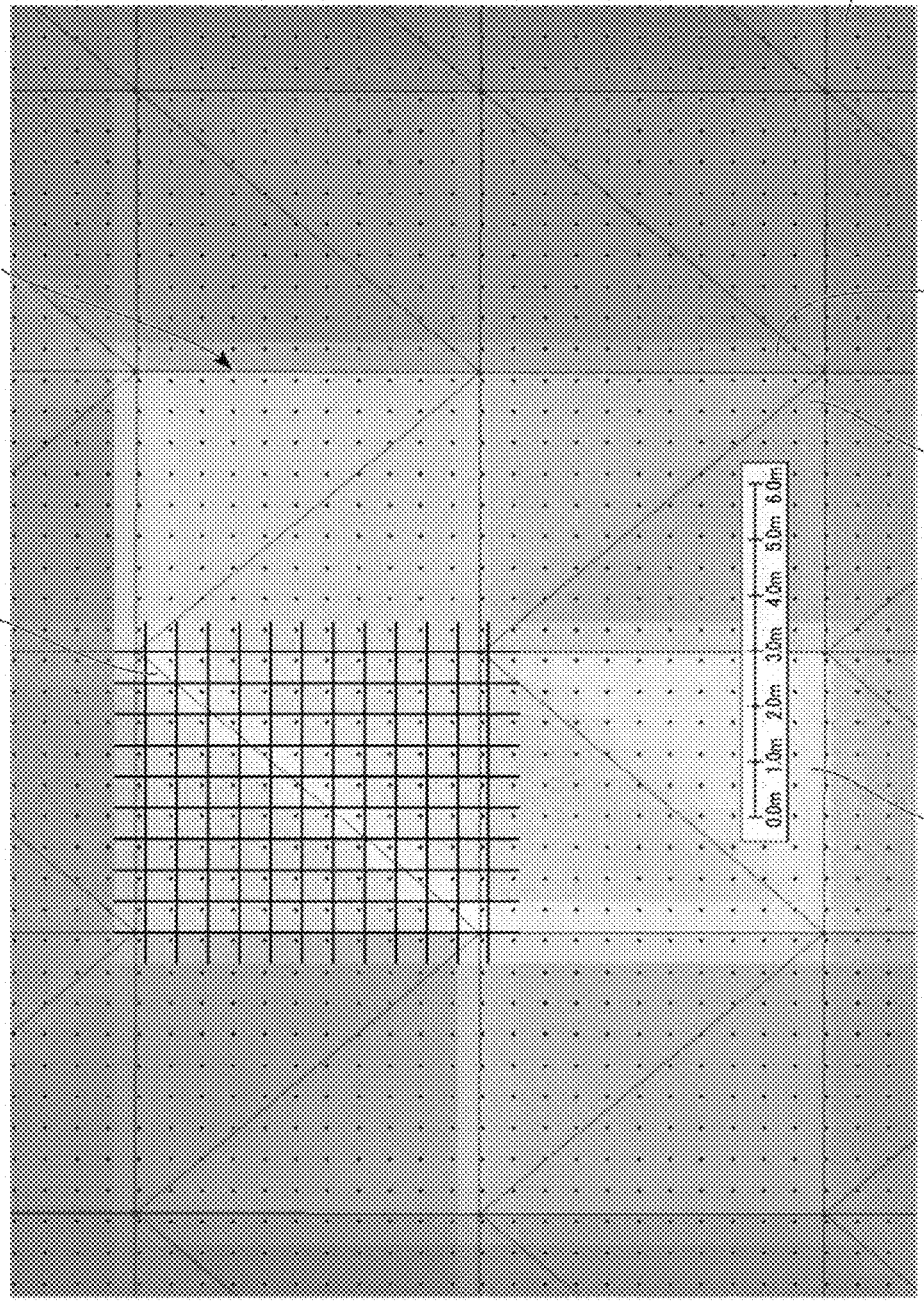
FIG. 23 is a diagram illustrating an example of red stereoscopic imaging for the bilinear-interpolated elevation-value zri before smoothing.

FIG. 23 illustrates an example in which the red stereoscopic image generation processing is executed on the bilinear-interpolated elevation-values zri (zr1, zr2, ... : for example, 0.559 meter) in the fine grid-cell memory (layer file) 142 before the smoothing processing. Note that FIG. 23 illustrates the super-resolution red stereoscopic-visualization image Gai' in which the red-color is reduced by about 50 percent. The fine grid-cells mi (m1, m2, m3, ... ) in the plane-rectangular 5 m-mesh Mbi is an example in the case where the fine grid-cell mi is obtained by approximately 9×11 division. However, misalignments of the dots in the fine grid-cells mi in FIG. 23 occur merely in the display, and the dots are actually located at the centers of the fine grid-cells mi as illustrated in FIG. 24.

Figure 24:
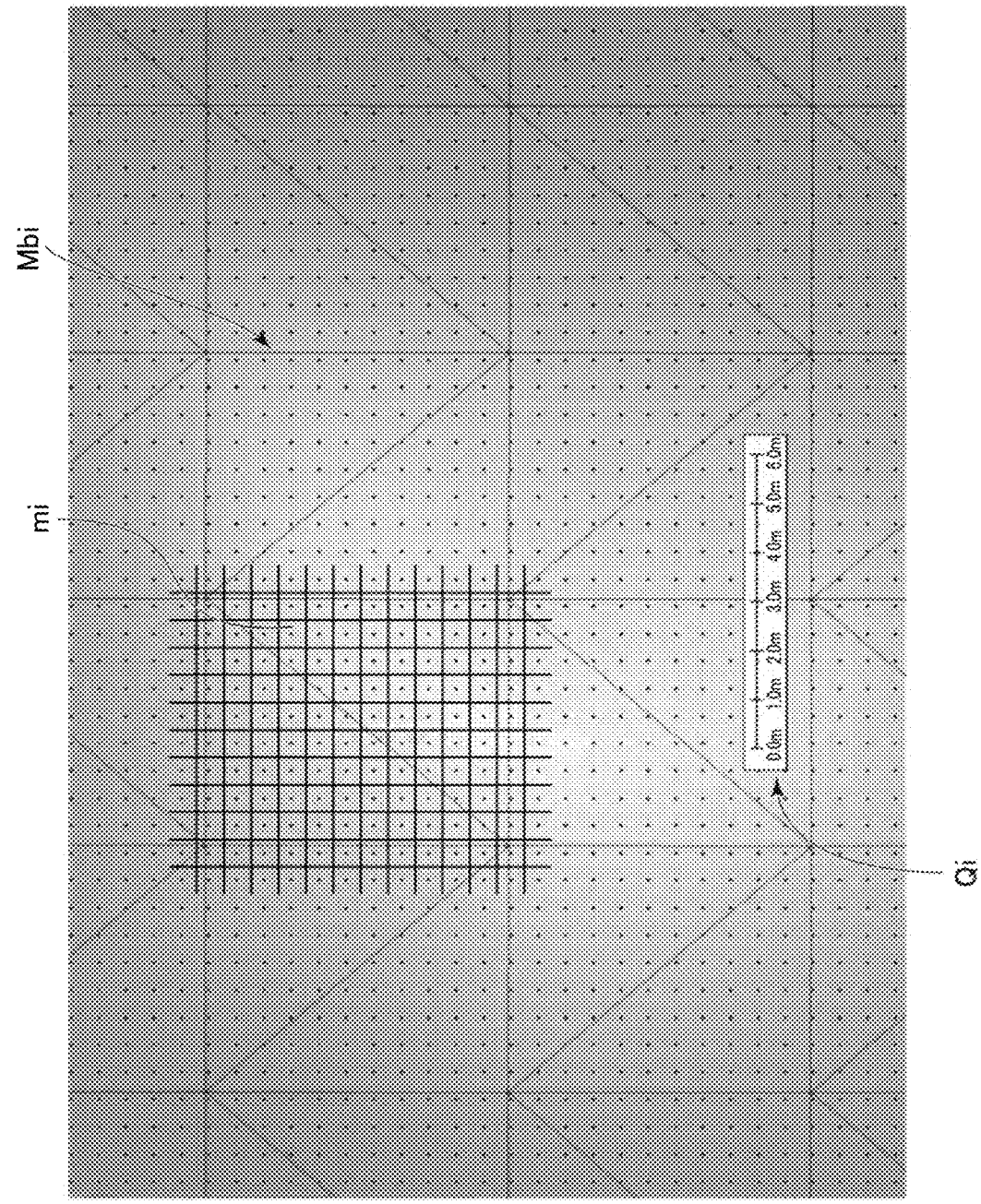
FIG. 24 is a diagram illustrating an example of super-resolution red stereoscopic imaging for the smoothing elevation-value zfi after smoothing.

FIG. 24 illustrates an example in which the super-resolution red stereoscopic image generation processing is executed on the smoothing elevation-value zfi after the smoothing processing. The generation of the super-resolution red stereoscopic-visualization image Gai and the super-resolution red stereoscopic-visualization image Gai' (reduced by 50 percent) will be described later in detail.

Comparing the images of FIGS. 23 and 24, the smoothed image of FIG. 24 generally gives an impression of soft red hue. The display processor 150 displays the super-resolution red stereoscopic-visualization image Gai' stored in the red stereoscopic-visualization image memory (layer file) 149 on the screen (see FIG. 2(b)). As illustrated in FIG. 2(b), compared with FIG. 2(a), there is no jaggies and no artifacts.

Further, the super-resolution red stereoscopic-visualization image generation processing is executed based on, for example, the respective smoothing elevation-values zfi of the fine grid-cells mi divided by the units of 0.559 meter from the plane-rectangular 5 m-mesh Mbi, and thus, compared with the red color in the plane-rectangular 5 m-mesh Mbi, the stereoscopic effect (hue) is not spoiled and the color tone is changed according to the elevation value of the interval of the fine grid-cells mi. Thus, the red color can be finely added to the elevation.

In other words, even in the case of the 5 m-DEM, the unevenness can be finely expressed in the interval in the 5 m-DEM.

Second Embodiment

In a second embodiment, description will be given by illustrating contours Ci, a standard map Gki of the Geospatial Information Authority and the like.

Figure 25:
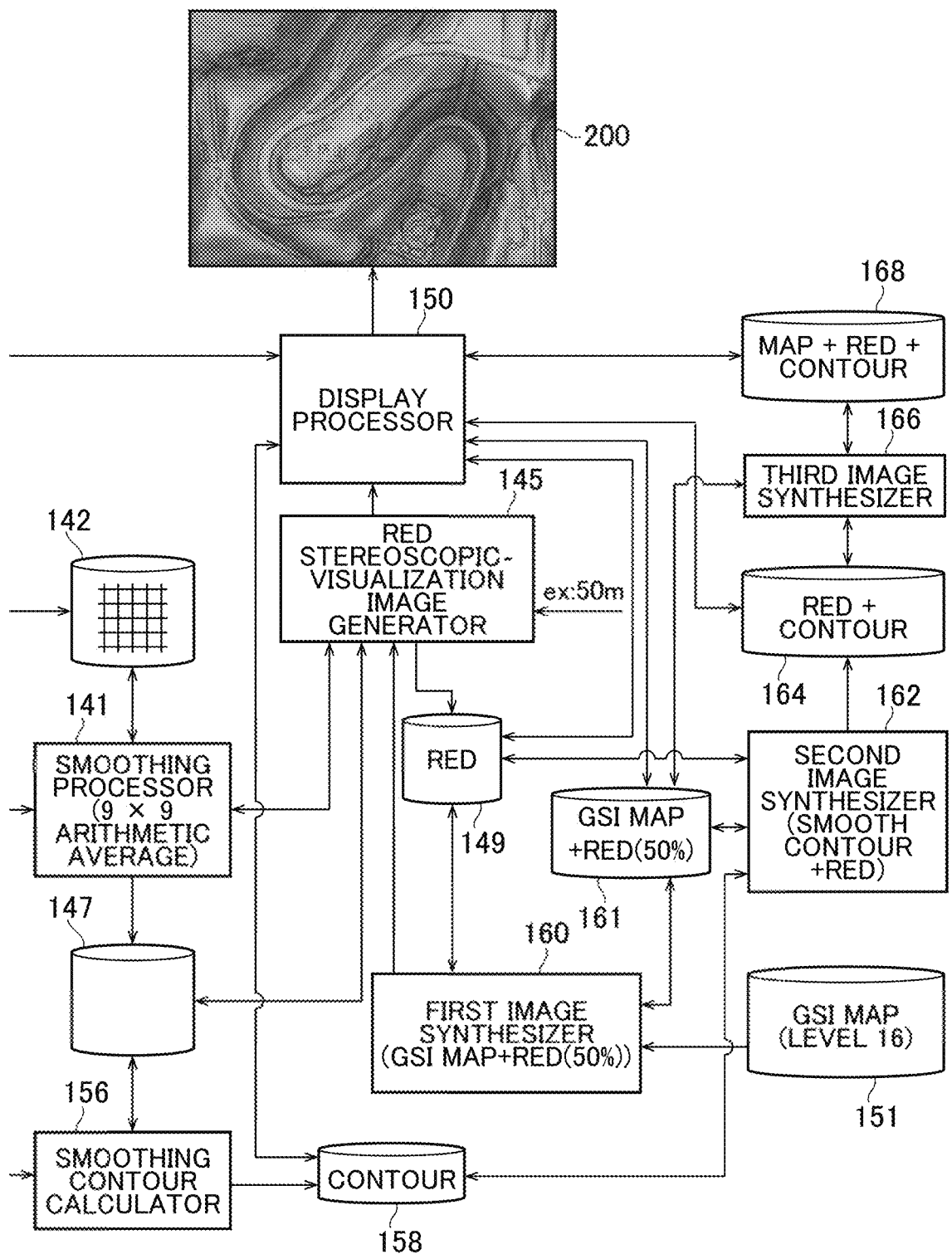
FIG. 25 is a schematic diagram illustrating an example of a super-resolution stereoscopic-visualization system according to a second embodiment.
Figure 26:
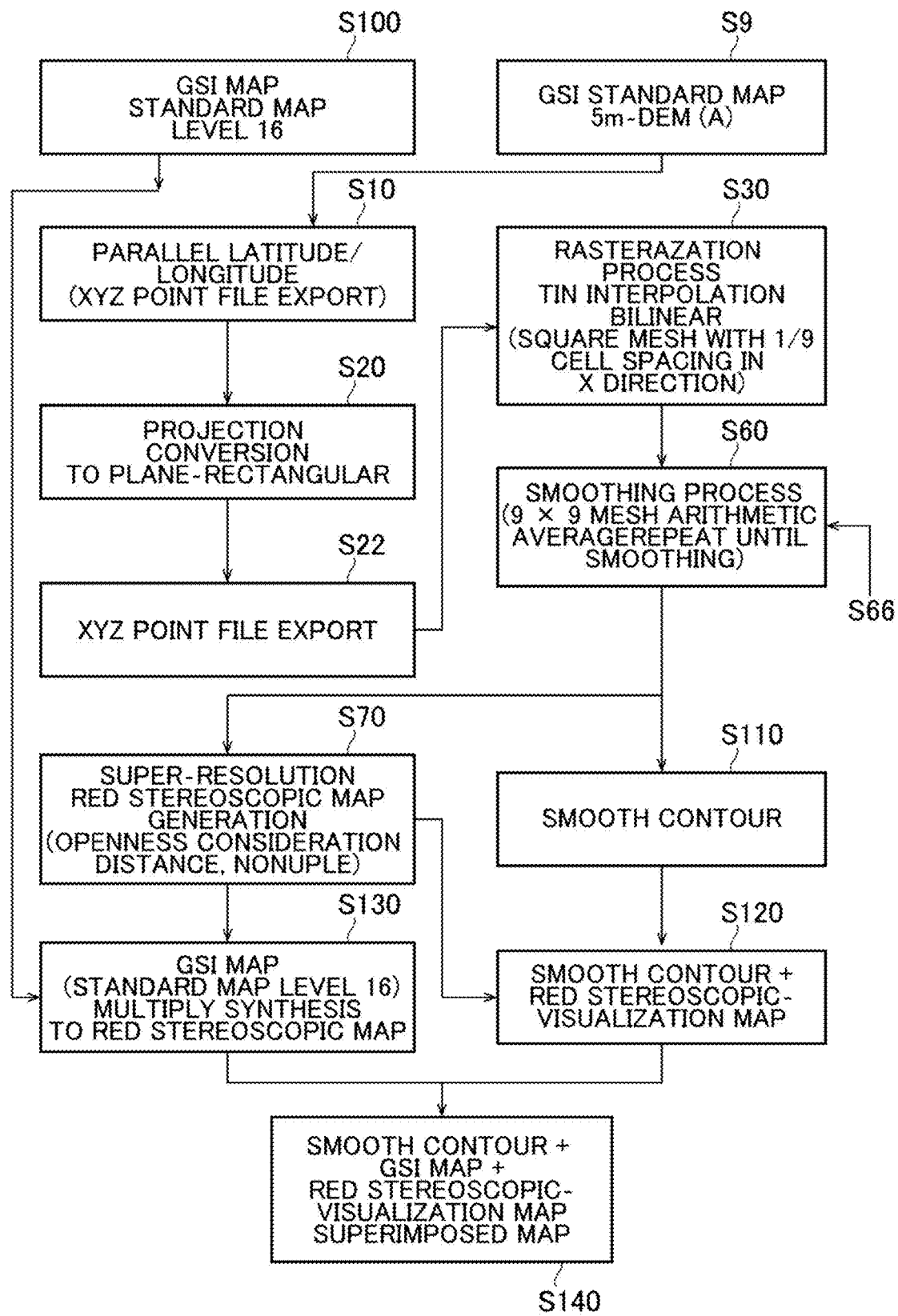
FIG. 26 is a flowchart illustrating an outline of a processing system of super-resolution stereoscopic-visualization according to the second embodiment.

FIG. 25 is a schematic block diagram of a super-resolution stereoscopic-visualization system according to the second embodiment. FIG. 26 is a flowchart illustrating an outline of a processing system of super-resolution stereoscopic visualization according to the second embodiment.

In FIG. 25, the base map database 110 storing the 5 m-DEM base map, the 5 m-DEM mesh reading unit 112, the geographic-coordinate XYZ-point file 114, the plane-rectangular-coordinate converter 115, the plane-rectangular XYZ-point file 118, the rasterization processor 135, and the consideration-distance grid-number calculator 148 are not illustrated.

As illustrated in FIG. 25, the description will be given by using the fine grid-cell memory (layer file) 142, the smoothing processor 141, the smoothing image memory (layer file) 147, the red stereoscopic-visualization image generator 145, and the red stereoscopic-visualization image memory (layer file) 149.

Further, in the second embodiment, illustrated are a smoothing-contour calculator 156, a smoothing-contour data memory 158, a Geospatial-Information-Authority map memory 151, a first image synthesizer (Geospatial-Information-Authority map+red) 160, a first synthetic image memory (Geospatial-Information-Authority map+red) 161, a second image synthesizer (smoothing-contour+red) 162, a second synthetic image memory (smoothing-contour+red) 164, a third image synthesizer (contour+Geospatial-Information-Authority map+red) 166, a third synthetic image memory (contour+Geospatial-Information-Authority map+red) 168, and the display processor 150.

Figure 27:
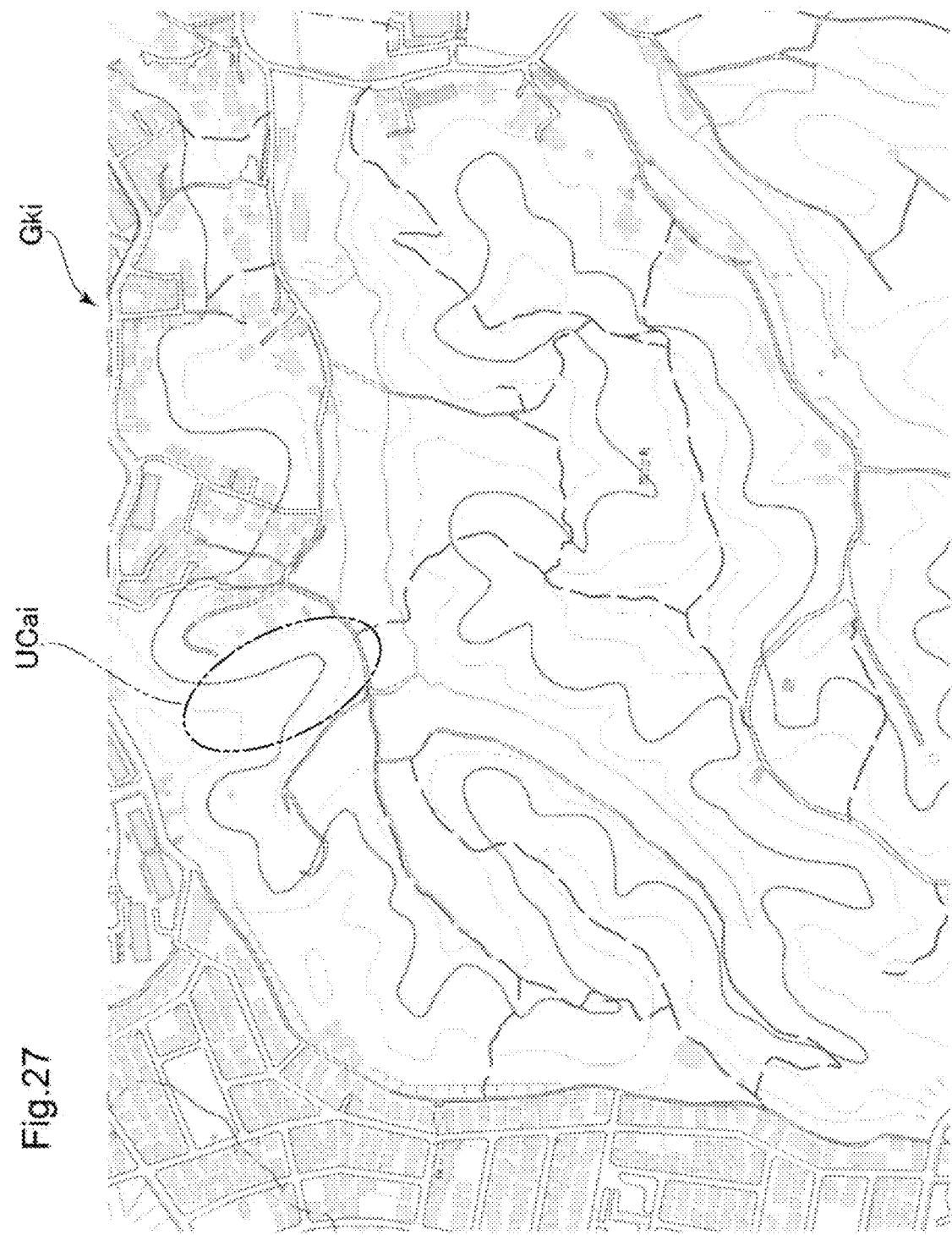
FIG. 27 is a diagram illustrating a 1/25000 standard map Gki (level 16)
Figure 28:
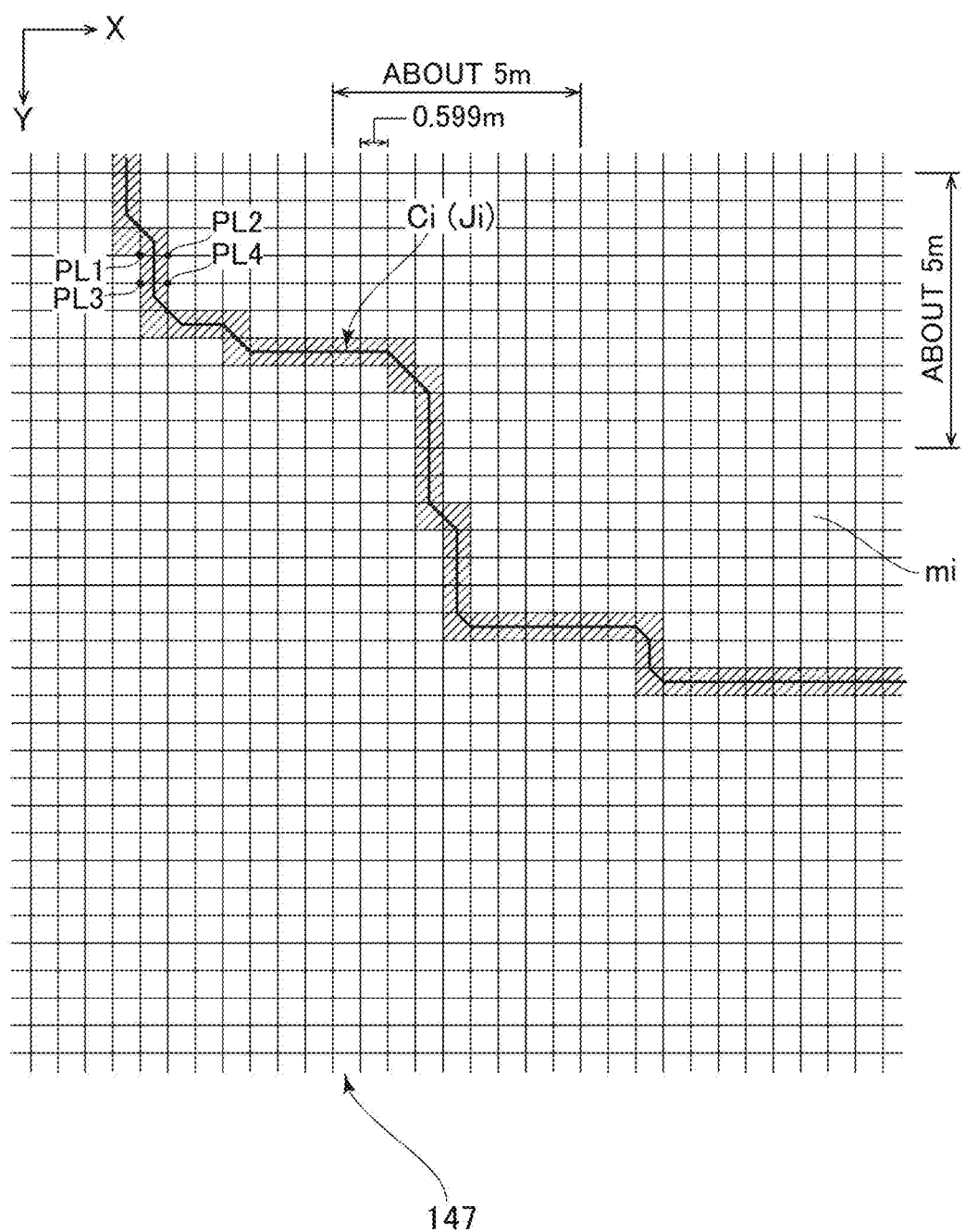
FIG. 28 is a diagram illustrating an example of creation of a smooth contour information Ji.

The Geospatial-Information-Authority map memory 151 stores vector data of a 1/25000 standard map Gki (level 16) (see FIG. 27). FIG. 28 illustrates the vector data as an image.

The system of FIG. 25 will be described with reference to the flowchart of FIG. 26. However, duplicate explanations are omitted for the parts denoted by the same reference numerals as in FIGS. 1 and 3.

The 5 m-DEM mesh reading unit 112 reads the 5 m-DEM latitude/longitude-point data Pai corresponding to the area Ei (for example, 50 meters to 1500 meters in length and width) fed (designated) by an operator from the base map database 110 of the 5 m-DEM (S9) and the 5 m-DEM latitude-longitude-point data Pai are exported to the geographic-coordinate XYZ-point file (memory) 114 (S10). Then, the 5 m-DEM latitude/longitude-point data Pai are read from the base map database 110 of the 5 m-DEM to export to the geographic-coordinate XYZ-point file 114 (S10), and the plane-rectangular-coordinate converter 116 projects and converts the 5 m-DEM latitude/longitude-point data Pai of the geographic-coordinate XYZ-point file 114 to the plane-rectangular coordinate (S20) to export as the 5 m-DEM plane-rectangular point data Pbi to the plane-rectangular XYZ-point file 118 (S22), and the rasterization processing is executed (S30).

In other words, the fine grid-cells mi each having a size of, for example, 0.559 meter are generated in the fine grid-cell memory (layer file) 142, and the bilinear-interpolated elevation-values zri (zr1, zr2, ...) are assigned to the fine grid-cells mi, respectively (see FIG. 14). Then, the smoothing processor 141 carries out the smoothing process S60, and assigns the smoothing elevation-values zfi (zf1, zf2, ...) to the fine grid-cells mi of 0.559-meter sizes in the smoothing image memory (layer file) 147—the smoothing fine elevation-value raster-image data RGi, see FIG. 21—.

Then, the red stereoscopic-visualization image generation unit 145 carries out the red stereoscopic image generation processing using the smoothing fine elevation-value raster-image data RGi in the smoothing image memory (layer file) 147 to generate the super-resolution red stereoscopic-visualization image Gai in the red stereoscopic-visualization image memory (layer file) 149. The smoothing-contour calculator 156 designates the fine grid-cells mi of 0.559-meter sizes in the smoothing image memory (layer file) 147.

Then, a fixed range (for example, five meters, ten meters, 20 meters, ...) is defined for each of the designated fine grid-cells mi (0.559-meter size), and a neighboring fine grid-cell mi (the smoothing fine elevation-value raster-image data RGi) having the same elevation value as the smoothing elevation-value zfi of the designated fine grid-cell mi (the smoothing fine elevation-value raster-image data RGi) are retrieved.

Then, the fine grid-cells mi (the smoothing fine elevation-value raster-image data RGi) to be connected are determined by processing of the standard deviation calculation and the like for the fine grid-cells mi (the smoothing fine elevation-value raster-image data RGi) to delineate a closed curve. In such case, among the coordinates of quadruple corners of the fine grid-cell mi, for example, PL1, PL2, PL3, PL4, by adopting a line connecting PL1 and PL2 is employed as an entrance line and a line connecting PL3 and PL4 is employed as an exit line. And, a line (y=ax+b) which connects points having substantially the same elevation is generated and connected by interpolating elevation values between PL1 and PL2 and interpolating elevation values between PL3 and PL4 (see FIG. 28).

Then, a set of straight lines of the fine grid-cells mi (the smoothing fine elevation-value raster-image data RGi) to be the closed curve is vectorized—defined as vectorized function—, and the vectorized set of straight lines is stored in the smoothing-contour data memory 158 as smoothing-contour information Ji. When the smoothing-contour information Ji is converted into an image, it is referred to as a smoothing contour Ci.

In the vectorization, when the adjacent fine mesh mi to be connected to the designated fine grid-cells mi exists in the X-direction or the Y-direction, each of the center coordinates (x, y) are connected by a straight line. And when the adjacent fine grid-cell mi to be connected to the designated fine grid-cells mi exists in the oblique direction, a center coordinate defined between the starting point and the end point in an output line of the designated fine grid-cell mi and a center coordinate defined between the starting point and the end point in an input line of the fine grid-cell mi in the oblique direction to be connected are connected to delineate a straight line.

And, these straight lines generated associated with the designated fine grid-cells mi are connected to provide a line, and the connected line is defined by a function (or an approximate function). By the way, an assemble of the straight lines generated around the designated fine grid-cells mi is referred as "a set of lines" in the third embodiment. In other words, the smoothing-contour information Ji implements the contours, which are delineated by connecting the straight lines passing through the fine grid-cells mi (0.559 meter), without performing curvature maximization processing, such as a spline curve, a Bezier curve and the like, known in the conventional manner.

Simultaneously, a color value is assigned. In other words, the smoothing-contour information Ji includes the area Ei, the fine grid-cell mi, the size (0.559 meter), the smoothing fine elevation-value Ri, the color value, the connection direction—up (or down) in the X-direction, up (or down) in the Y-direction, obliquely to the right or obliquely to the left—, and the like.

The interval of the smoothing contours Ci may be one meter, two meters, three meters, .... Next, with reference to FIGS. 29 to 32, the difference in the smoothing contour image GJi when the smoothing processing is not executed will be described.

Third Embodiment

Figure 29:
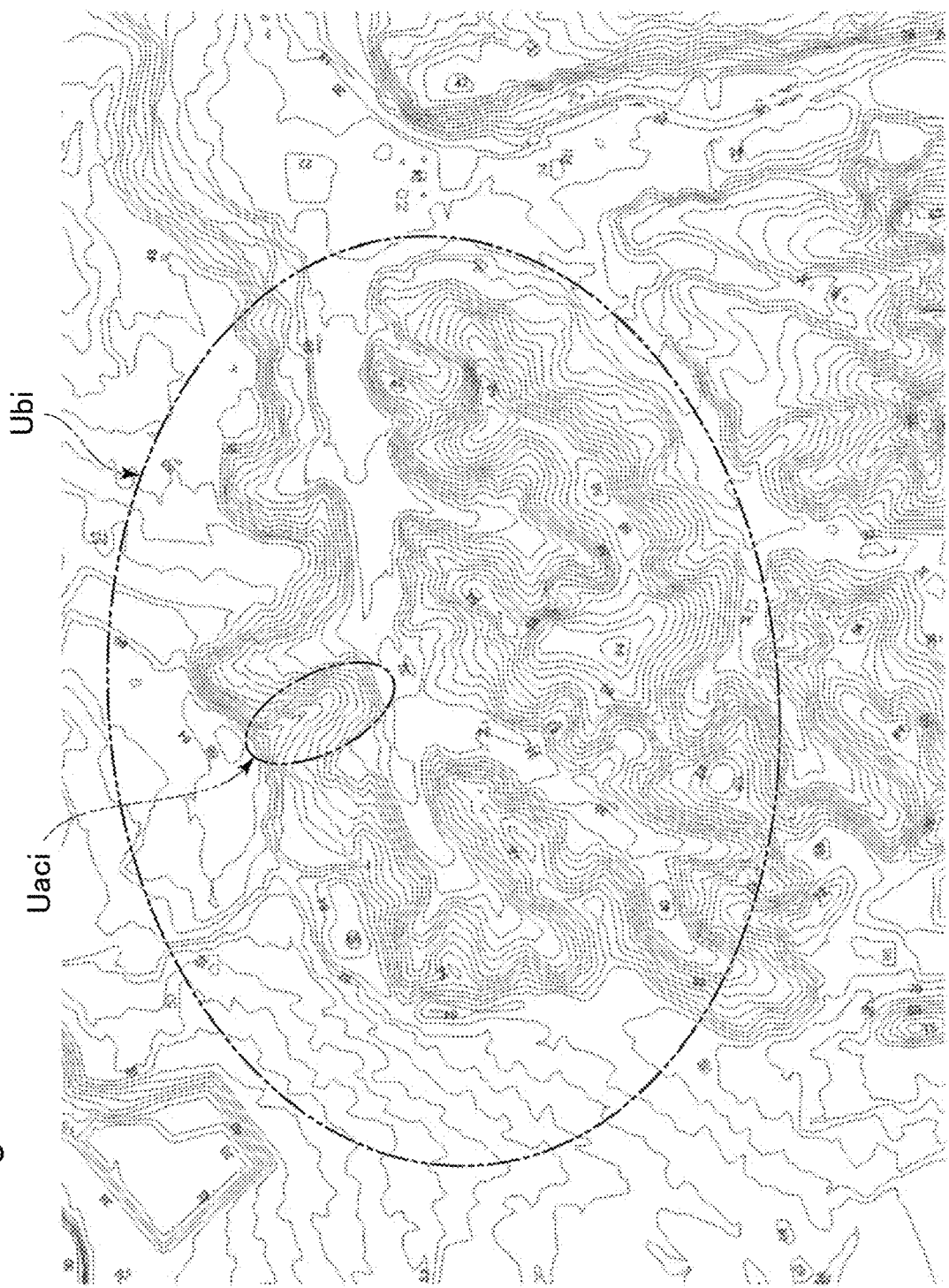
FIG. 29 is a diagram illustrating an interpolated contour image GJoi after TIN biliner-interpolation.
Figure 30:
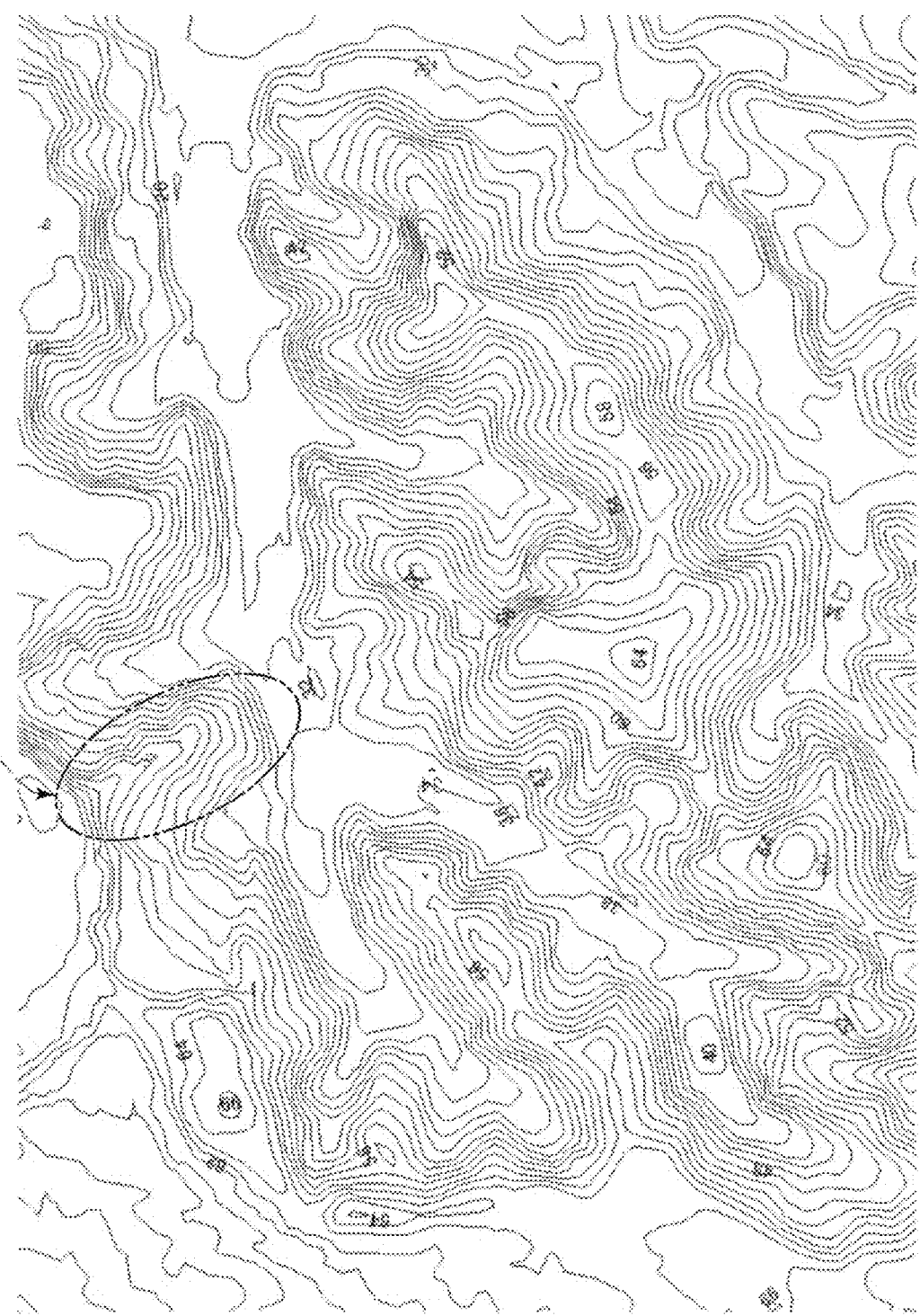
FIG. 30 is an enlarged diagram of the range Ubi in FIG. 29.
Figure 31:
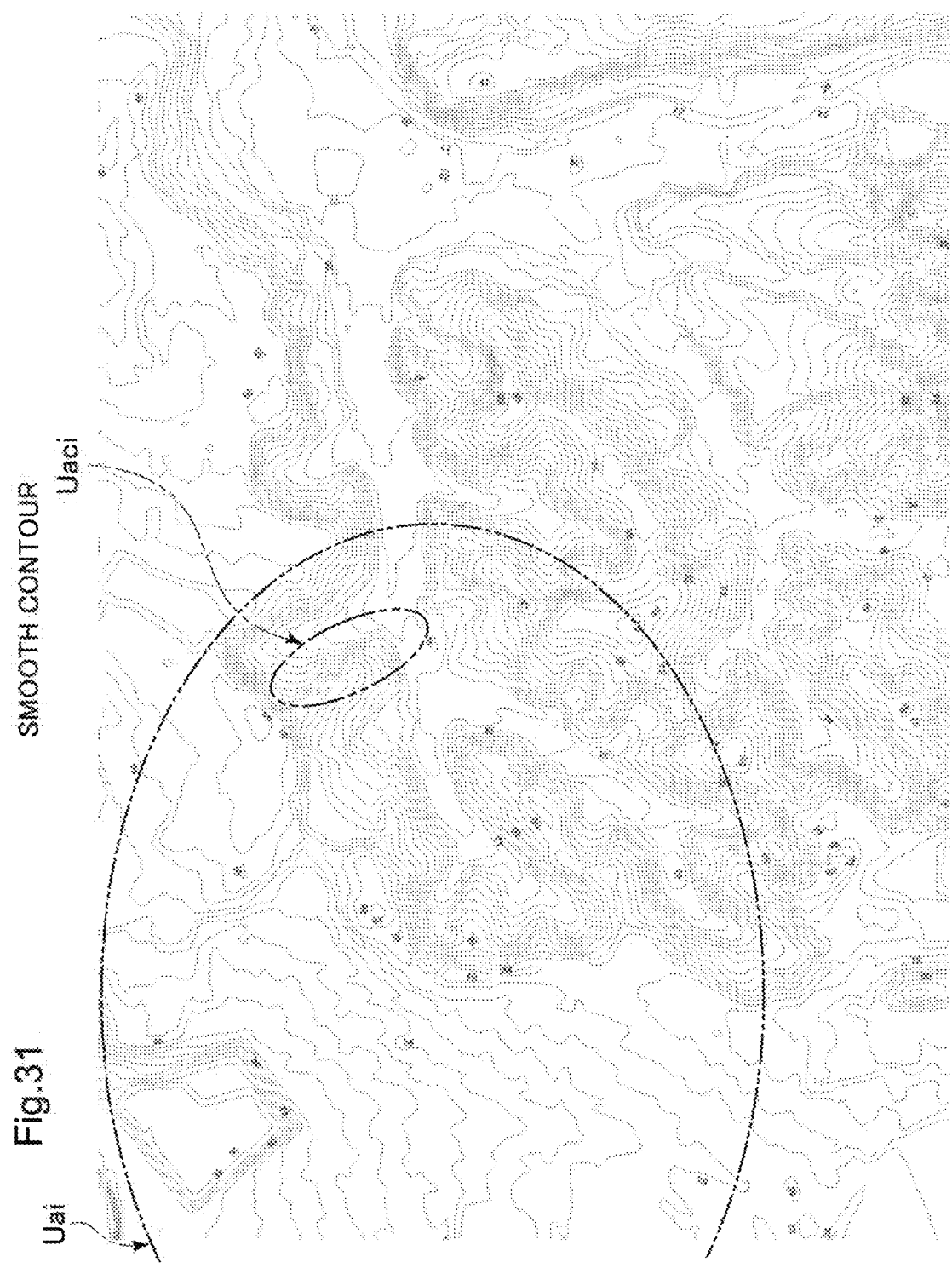
FIG. 31 is a diagram illustrating a smooth contour image GJi after smoothing.
Figure 32:
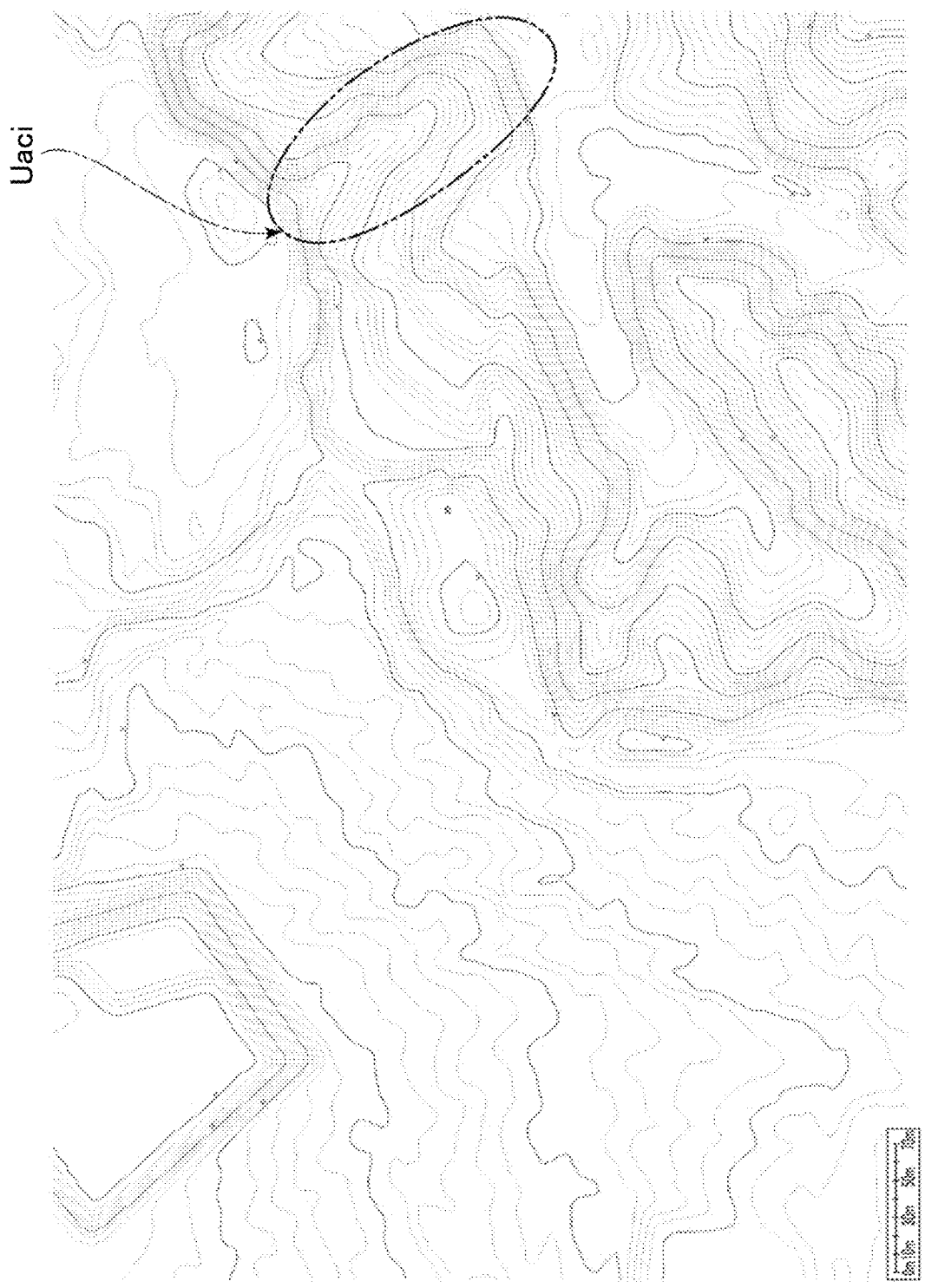
FIG. 32 is an enlarged diagram of a vicinity of area Uai in FIG. 31.

FIG. 29 is an example of displaying an interpolated contour image GJoi after the TIN biliner-interpolation, and FIG. 30 is an enlarged view around the range Ubi of FIG. 29. FIG. 31 is an example of displaying the smoothing contour image GJi after smoothing processing where the area is similar as to FIG. 29. FIG. 32 is an enlarged view around the site Uai illustrated in FIG. 31.

As illustrated in FIG. 30, the contours of the smoothing contour image GJi after the TIN biliner-interpolation are jagged, but when smoothing processing is executed, the contours are smoothly curved in the site Uaci as illustrated in FIG. 32.

In other words, the contours according to the third embodiment can be applied to a 1/10,000 contour map. The first image synthesizer (Geospatial-Information-Authority map+red) 160 generates the "Geospatial-Information-Authority map+red synthetic" image Gfi, which is synthesized by multiplying the image data of vector data generated from the standard map Gki (level 16) in the Geospatial-Information-Authority map memory 151 to the super-resolution red stereoscopic-visualization image Gai' obtained by reducing the red-color of the super-resolution red stereoscopic-visualization image Gai of the red stereoscopic-visualization image memory (layer file) 149 by about 50 percent, and stores the generated smoothing image GFi in the first synthetic image memory (Geospatial-Information-Authority map+red) 161 (see FIG. 34). However, in FIG. 34, also the contours are illustrated.

In that regard, the first image synthesizer (Geospatial-Information-Authority map+red) 160 reduces the color value of the super-resolution red stereoscopic-visualization image Gai in the red stereoscopic-visualization image memory (layer file) 149 by 50 percent so as to be different from the color (for example, orange) when the vector data of the standard map (city map of buildings, roads, etc.) is imaged.

For example, a subdued red color provided with a hue of zero degree, a chroma saturation of 50 percent, and a brightness of 80 percent. When each color value of RGB is specified in the range of 0~255, RED is set to "204", GREEN is set to "102", and BLUE is set to "102". The HEX value (WEB color in hexadecimal/HTML color code) is set to #CC 6666. Alternatively, the CMYK values used for color printing are approximately set to cyan "C 20 percent", magenta "M 70 percent", yellow "Y 50 percent" and black "K zero percent".

Figure 33:
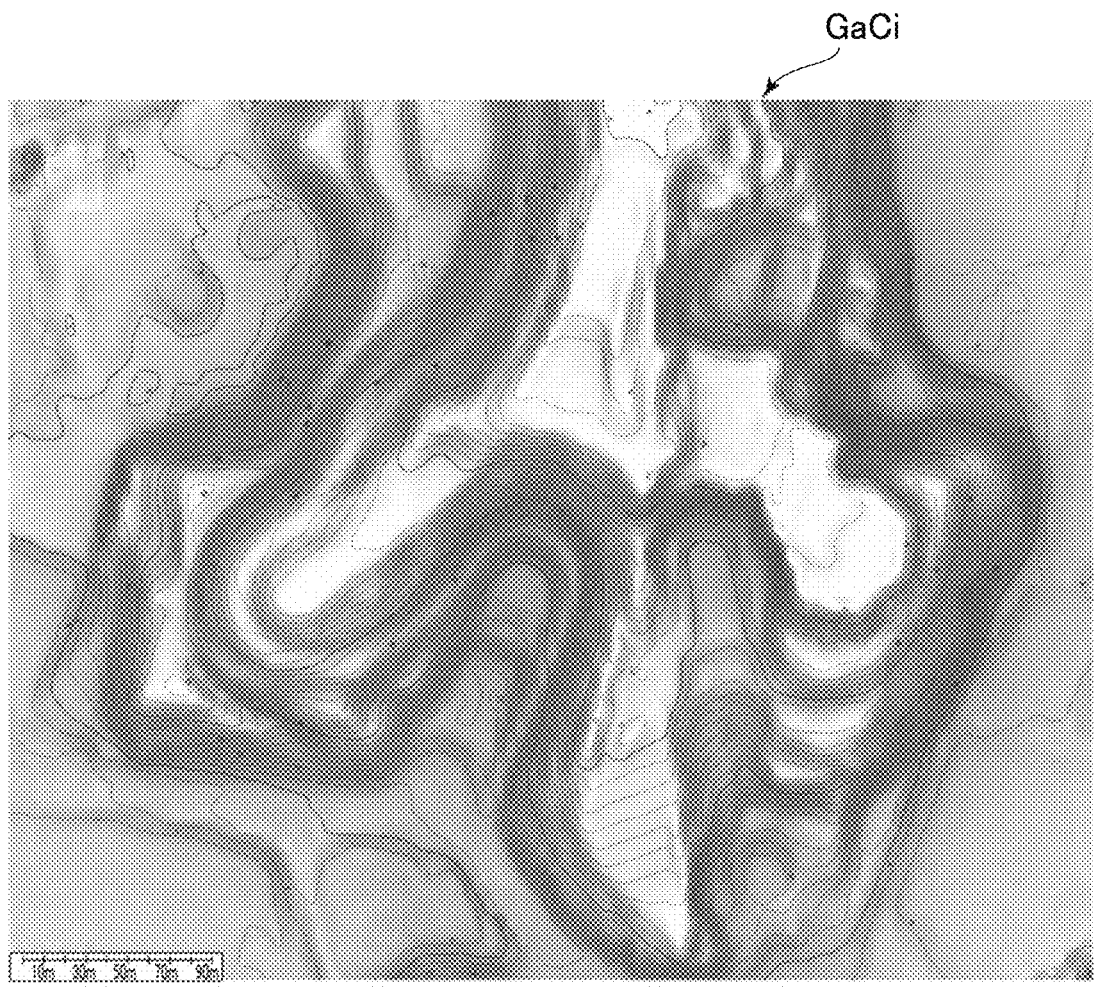
FIG. 33 is a diagram illustrating an image GaCi of "smooth contour+red"

The super-resolution red stereoscopic-visualization image Gai in which the color value is reduced by 50 percent is referred to as "the super-resolution red stereoscopic-visualization image Gai'". The second image synthesizer (smoothing contour+red) 162 generates a "smoothing contour+red" image GaCi synthesized by multiplying the super-resolution red stereoscopic-visualization image Gai' (reduced by 50 percent) in the first synthetic image memory (Geospatial-Information-Authority map+red) 161 and data obtained by imaging a smoothing contour information CJi in the smoothing contour data memory 158, and stores the generated image GaCi in the second synthetic image memory (smooth contour+red) 164 (see FIG. 33).

Figure 34:
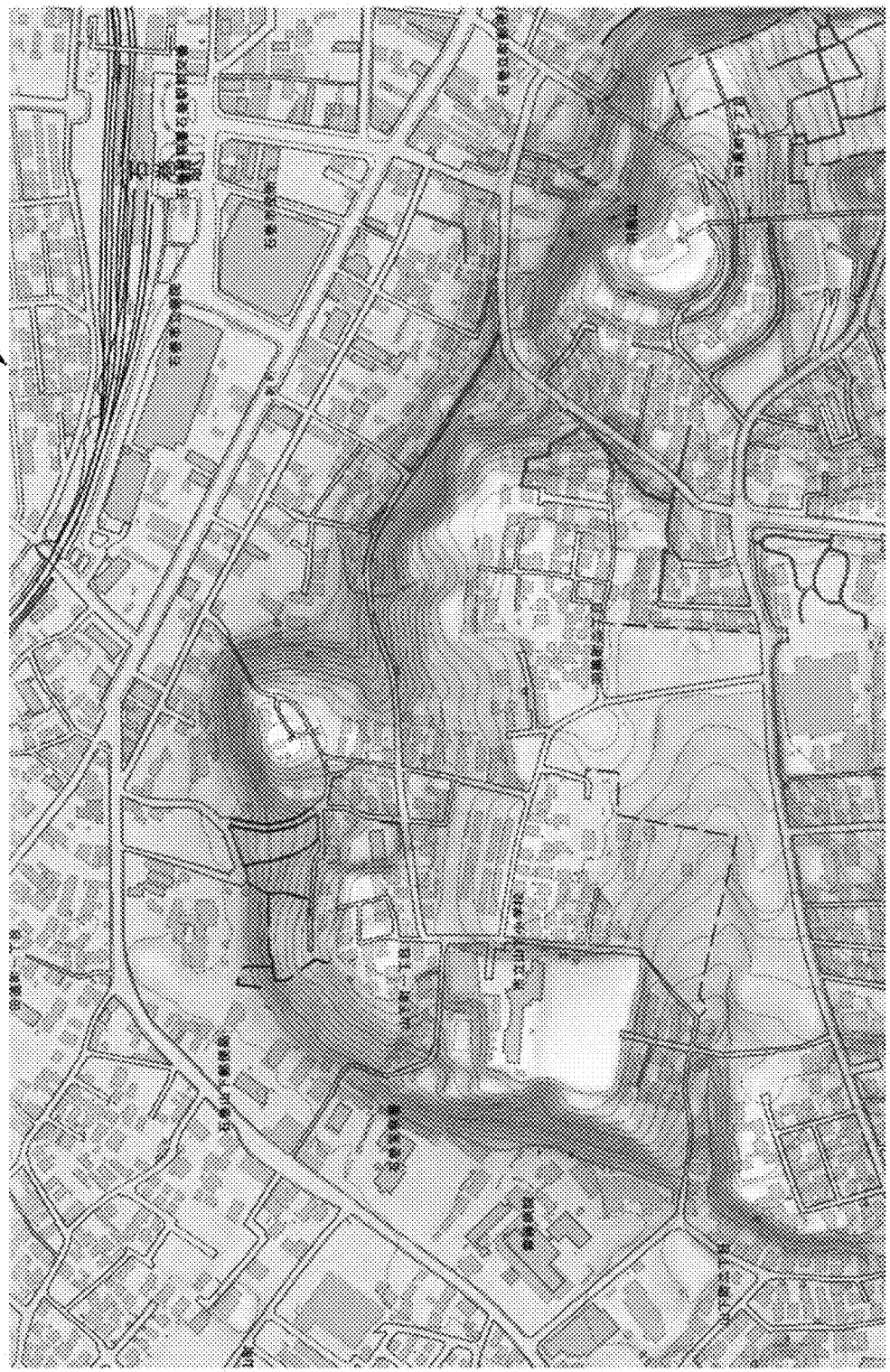
FIG. 34 is a diagram illustrating an image Gami of "standard map+red+smooth contour"
Figure 35:
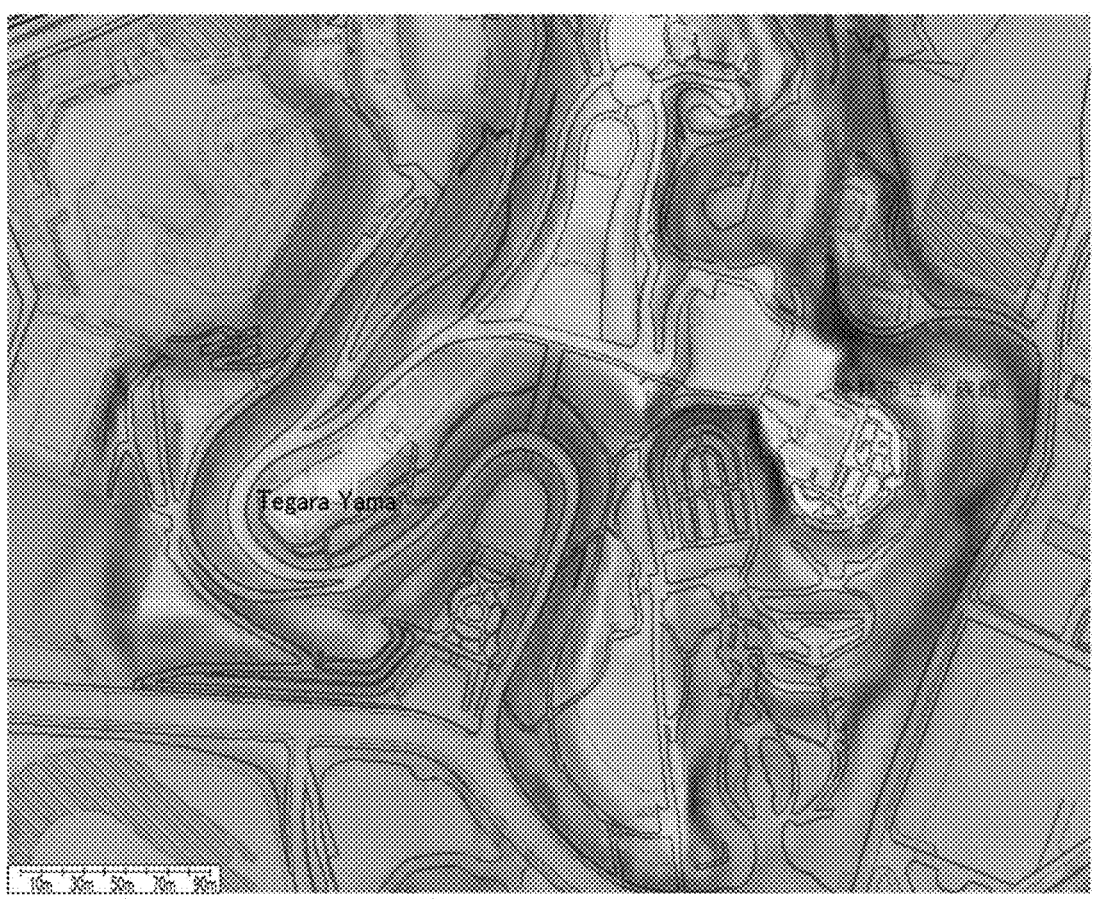
FIG. 35 is an enlarged diagram of the image Gami of "standard map+red+smooth contour"

The third image synthesizer (contour+Geospatial-Information-Authority map+red) 166 stores a "standard map+red+smooth contour" image Gami synthesized by multiplying the "Geospatial-Information-Authority map+red synthesis" image GFi in the first synthetic image memory (Geospatial-Information-Authority+red) 161 and the "smooth contour+red" image GaCi of the second synthetic image memory (smooth contour+red) 164 in the third synthetic image memory 168 (See FIGS. 34 and 35). In addition, in the multiply synthesis, it is preferable to read and synthesize one of the super-resolution red stereoscopic-visualization image Gai' (reduced by 50 percent) in each memory.

Figure 36:
FIG. 36 is a further enlarged diagram of FIG. 35.

FIG. 35 is an enlarged view of the "standard map+red+smoothing contour" image Gami. However, a location illustrated in FIG. 35 is different from the location in FIG. 34. FIG. 36 is an enlarged view of FIG. 35.

As illustrated in FIG. 36, there is no jagged appearance even when displaying the vector data of buildings, roads, and the like, of the Geospatial-Information-Authority base map read from the displaying memory. In other words, the resolution is matched with the complex linear road outlines and the building outlines of the 1/25000 standard map Gki (level 16).

Further, there is no jagged appearance even when enlarging the image as illustrated in FIG. 36. Therefore, a situation of the cliff, a situation of the plane, a slope of the road, and the like can be confirmed in detail.

Therefore, it can be said that a map almost similar to the map with a scale of 1/10,000 that the Geospatial Information Authority has been abandoned is generated.

Fourth Embodiment: Red Stereoscopic Image

A technique disclosed in JP 3670274 B is used to generate a red stereoscopic image. The outline will be described with reference to FIG. 37.

Figure 37:
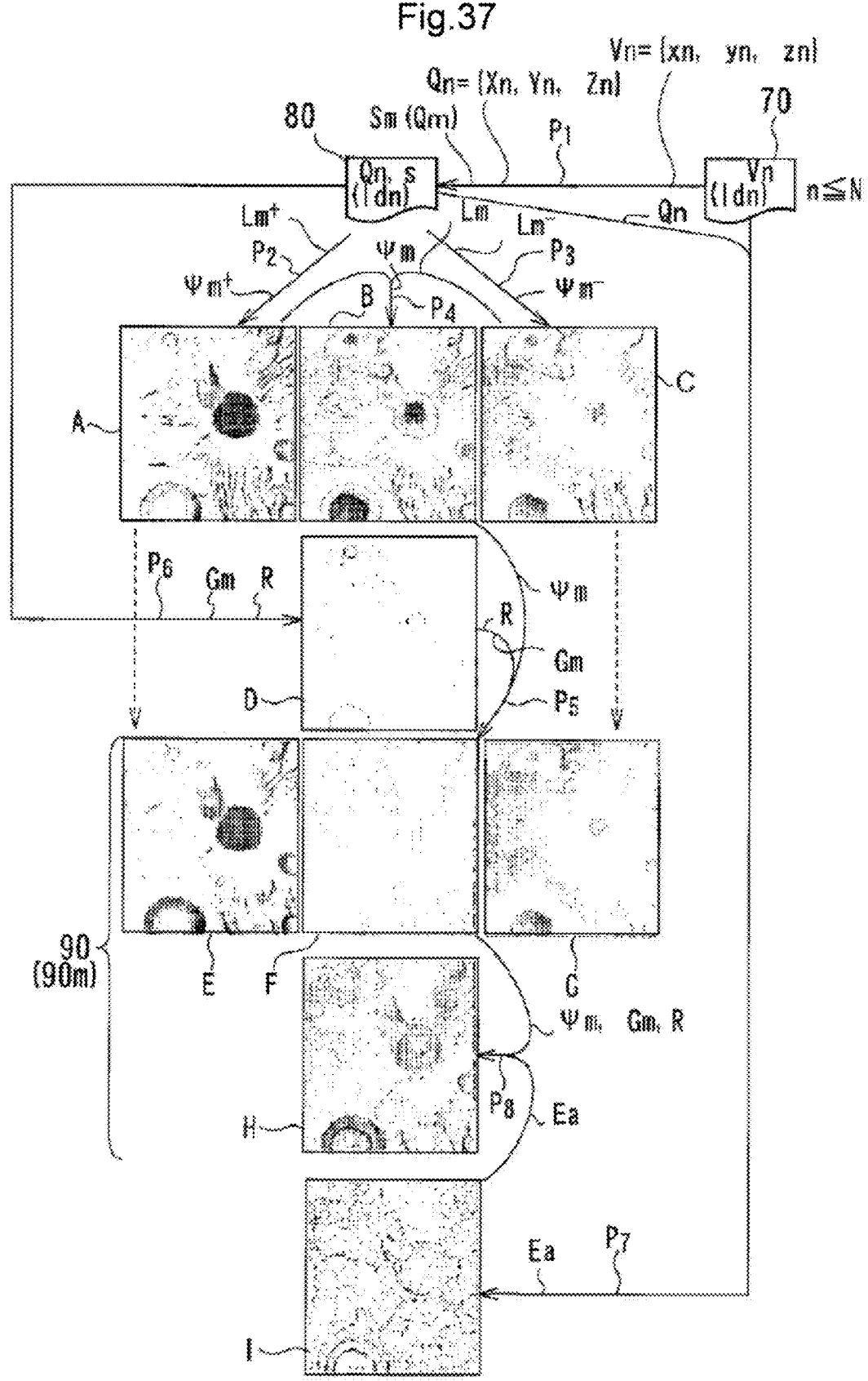
FIG. 37 is a diagram illustrating a generation flow of the red stereoscopic image.

As illustrated in FIG. 37, with n=1 to N, a longitude xn, a latitude yn and an elevation zn are calculated from an identification number Idn and an elevation difference. The identification number Idn is assigned to the n-th processed two-component vector Vn, which is stored in the smoothing image memory 147. And the values of the longitude xn, the latitude yn and the elevation zn are associated with a corresponding coordinate point Qn={Xn=xn, Yn=yn, Zn=zn} in a three-dimensional coordinate space 80 (corresponding to the plane-rectangular-coordinate converter 115). The three-dimensional coordinate space 80 is a virtual three-dimensional (3D) X-Y-Z orthogonal space, stored in a memory (not shown).

In other words, by storing the identification number Idn of the vector Vn in a storage area corresponding to the coordinate point Qn in the memory, mapping of the vector Vn to the three-dimensional coordinate space 80 is executed. And by executing such mapping on total number N vectors, mapping of a vector field 70 is executed to the three-dimensional coordinate space 80 (process P1 in FIG. 37).

Further, a curved surface S for connecting a sequence of the total number N or less than N of the coordinate points with Id {Qn: n≤N} in the three-dimensional coordinate space 80 with a required smoothness is obtained by least-square method and the like. And the curved surface S is divided into minute surface areas {Sm: m≤n of a total number M≤N}, respective subject sampling-points Qm (For example, 0.559 meter) are determined in the divided surface areas, and related information is stored in a memory.

Then, with respect to each surface area Sm, a local area Lm$^+$ on an Over-side (Z+ side) of the curved surface S located within a predetermined radius from the subject sampling-point Qm is determined, and an openness—that is, a line-of-sight solid angle with respect to the sky side or a twice derivative value equivalent to the line-of-sight solid angle—around the subject sampling-point Qm defined by the local area Lm$^+$ is obtained (process P2 in FIG. 37). And the obtained openness is stored as an elevation degree Ψm$^+$ of the surface region Sm.

A resulted image, which represents the elevation degree Ψm$^+$ in a gradation over the entire curved surface S, is defined as "a process-result A" "ascribable to a result of the above processing. The image A clearly represents a ridge side of the terrain, that is, a convex portion (of the curved surface S) so as to look like a convexity. Then, with respect to the surface area Sm, a local region Lm$^-$ on an under-side (Z− side) of the curved surface S located within the predetermined radius from the subject sampling-point Qm is determined, and an openness—that is, a line-of-sight solid angle with respect to the ground side or a twice derivative value equivalent to the line-of-sight solid angle—around the subject sampling-point Qm defined by the local area Lm⁻ is obtained (process P3 in FIG. 37). And the obtained openness is stored as a depression degree $\Psi m^-$ of the surface region Sm. A resulted image, which represents the depression degree $\Psi m^-$ in a gradation over the entire curved surface S, is defined as "a process-result C" ascribable to a result of the above processing.

The image C clearly represents a valley side of the terrain, that is, a concave portion (of the curved surface S) so as to look like a concavity. It should be noted that the image C does not result in a simple inversion of the image A.

Then, with respect to the surface area Sm, the elevation degree $\Psi m^+$ and the depression degree $\Psi m^-$ are synthesized by weighting using a distribution ratio $w^+$ vs. $w^-$, where $$w^+ + w^- = 0, \quad (1)$$

as $$(w^+\Psi m^+ + w^-\Psi m^-), \quad (2)$$

which is appropriately determined (in other words, according to whether to focus on the ridge or the valley). Then, a stereoscopic effect that the local area Lm (Lm⁺, Lm⁻) on the over-side and the under-side of the curved surface S located within the predetermined radius brings around the subject sampling-point Qm is determined (process P4 of FIG. 37), and the stereoscopic effect is stored as an elevation-depression degree $\Psi m$ of the surface area Sm.

A resulted image, which represents the elevation-depression degree $\Psi m$ in a gradation over the entire curved surface S, is defined as "a process-result B" ascribable to a result of the above processing. The image B clearly represents the convexity portion (of the curved surface S) as a convexity and the concave portion as a concavity, whereby the ridges and valleys of the terrain are accentuated to enhance the visual stereoscopic effect. In the image B, the weight of the composition is $w^+ = -w^- = 1$.

Then, regarding the surface region Sm, a maximum slope gradient (or a single derivative value equivalent to the maximum slope) is obtained directly or indirectly through the least-square method (process P6 in FIG. 37), and stored as a slope gradient Gm of the surface area Sm.

An achromatic color image, which represents the slope gradient Gm in color tone with a reddish color R over the entire curved surface S, is defined as "a process-result D" ascribable to a result of the above processing. The image D also has an effectiveness of visually developing a stereoscopic effect on the terrain (that is, the curved surface S).

Then, by mapping the three-dimensional coordinate space 80 together with the related information ($\Psi m$, Gm, R) onto a two-dimensional plane 90 (process P5 in FIG. 37), the R-color tone display of the slope gradient Gm is executed in an area 90 m on the two-dimensional plane 90 corresponding to the divided area Sm of the curved surface S connecting the sequence of the coordinate points Qm, and the brightness of the R-color tone is displayed in a gradation corresponding to the elevation-depression degree $\Psi m$. The displayed image (of an achromatic color display) is defined as "a process-result F" ascribable to a result of the above processing. The image F imparts the visual stereoscopic effect to the terrain (that is, the curved surface S).

A resulted image E represents a result of mapping process (process P5) of the information of the image D (that is, the R-color tone indicating the slope gradient Gm) and the information of the elevation-depression degree (that is, the elevation degree $\Psi m^+$) corresponding to the image A onto the two-dimensional plane 90, and the ridge portion is emphasized. A resulted image G represents a result of mapping process (process P5) of the information of the image D (the R-color tone indicating the slope gradient Gm) and the information of the elevation-depression degree (that is, the depression degree $\Psi m^-$), which corresponds to the image C, onto the two-dimensional plane 90, and then, the valley portion is emphasized.

In the sequences of the coordinate points Qn, an attribute isoline Ea (contour and outline of the terrain in the fourth embodiment) obtained by connecting the coordinate points Qn having an equivalent value in the attribute (elevation zn in the fourth embodiment) extracted from the component of the vector Vn of the vector field 70 is determined. The attribute isoline Ea is stored to read out or display as necessary (process P7 in FIG. 37).

A process-result I ascribable to the above processing result also contributes to understanding the three-dimensional shape of the terrain (or the curved surface S). Then, on the two-dimensional plane 90, the three-dimensional coordinate space 80 is mapped or displayed together with the relevant information ($\Psi m$, Gm, R), and the attribute isoline Ea is mapped or displayed (process P8 in FIG. 37). The displayed image (of the achromatic display image) is defined as "a process-result H" ascribable to a result of the above processing. The image H also imparts a visual stereoscopic effect to the terrain (or the curved surface S).

Accordingly, the generation scheme of the red stereoscopic image includes a second step (62), after executing a first step (61) of mapping a vector field (70) into a three-dimensional coordinate space (80) to obtain a corresponding coordinate point sequence (mfi). The second step (62) determines an openness around a subject sampling-point defined by an over-side of an area located within a predetermined radius of the subject sampling-point in a local area of a surface connecting the coordinate point sequence as an elevation degree (elevation-depression degree) (A) of the local area.

The generation scheme further includes a third step (63) of determining an openness around the subject sampling-point defined by an under-side of the area located within the predetermined radius of the subject sampling-point in the local area of the surface connecting the coordinate point sequence as a depression degree (C) of the local area, and a fourth step (64) of synthesizing the elevation degree (A) and the depression degree (C) by weighting to determine an openness that the areas of the over-side and the under-side in the predetermined radius bring around the subject sampling-point in the local area of the surface connecting the coordinate point sequence as an elevation-depression degree (B) of the local area.

The generation scheme still further includes a fifth step (65) of mapping the three-dimensional coordinate space (80) onto a two-dimensional plane (90), and executing a gradation display (F) corresponding to the elevation-depression degree of the local area on an area on the two-dimensional plane (90) corresponding to the local area of the surface connecting the coordinate point sequence.

Next, a more specific description will be given below. On the basis of Digital Elevation Model (DEM) data (mri), triple parameters of a slope gradient corresponding to the slope gradient Gm, an over-ground openness corresponding to the elevation degree $\Psi m^+$ of the first embodiment, and an under-ground openness corresponding to the depression degree $\Psi m^-$ of the first embodiment are obtained, and distributions of the triple parameters in a plane are stored as gray scale images.

Portions of the ridge and the crest are rendered as white-like, portions of the valley and the hollow are rendered as black-like, and the portions of slopes are rendered more redder, as the slope becomes steeper and steeper, by creating a pseudo-color image. The pseudo-color image is created by putting the difference image of the over-ground openness and the under-ground openness into a gray channel, and by putting the slope into a red channel. Therefore, even a single sheet of image facilitates the stereoscopic effect, by combining such expressions of rendering white, black, and red.

In other words, in a stereoscopic representation method of a stereoscopic map according to the fourth embodiment, because the meshes are provided between the contours, the difference or the inclination between the adjacent meshes can be represented by a red color tone, and furthermore, the difference of the elevation compared to the surrounding can be represented by a tone of gray scale. The difference of the elevation corresponds to the elevation-depression degree $\Psi m$ of the first embodiment and is provided with the ridge-valley value in the fourth embodiment. The difference of the elevation is suggested in that the brighter one is higher than the surrounding (ridge-like) and the darker one is lower than the surrounding (valley-like), and therefore, the stereoscopic effect is generated by multiply synthesis of the contrasting.

Figure 38:
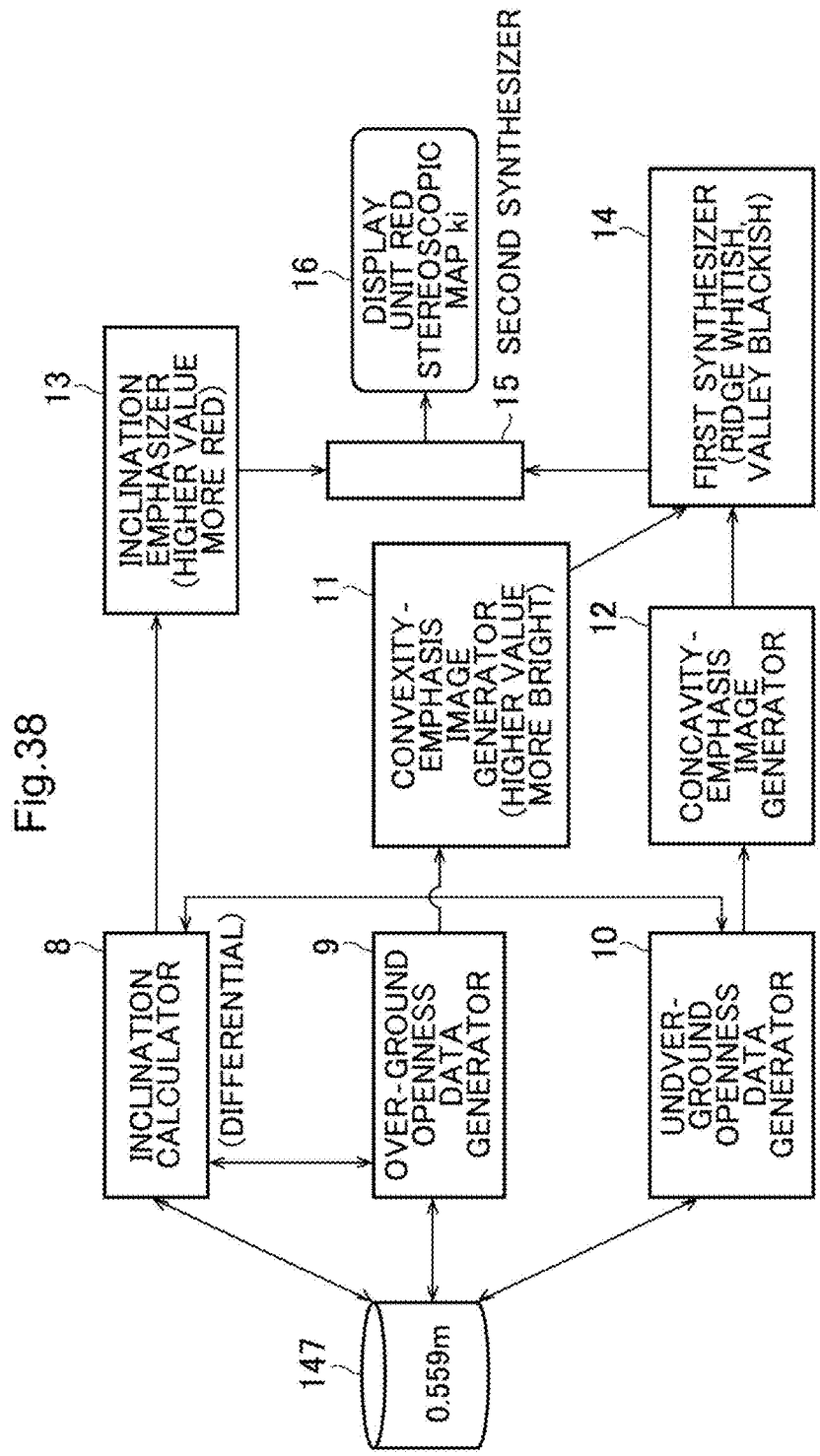
FIG. 38 is a schematic diagram of a red stereoscopic-visualization image generator 145.

As illustrated in FIG. 38, the red stereoscopic image generation unit includes an over-ground openness data generator 9 for reading the smoothing elevation-values zfi, which are stored in the smoothing fine elevation-value raster-image data RGi of the smoothing image memory (layer file) 147, an under-ground openness data generator 10, and an inclination calculator 8. The red stereoscopic image generation unit further includes a convexity-emphasis image generator 11, a concavity-emphasis image generator 12, an inclination emphasizer 13, a first synthesizer 14, and a second synthesizer 15.

Figure 39:
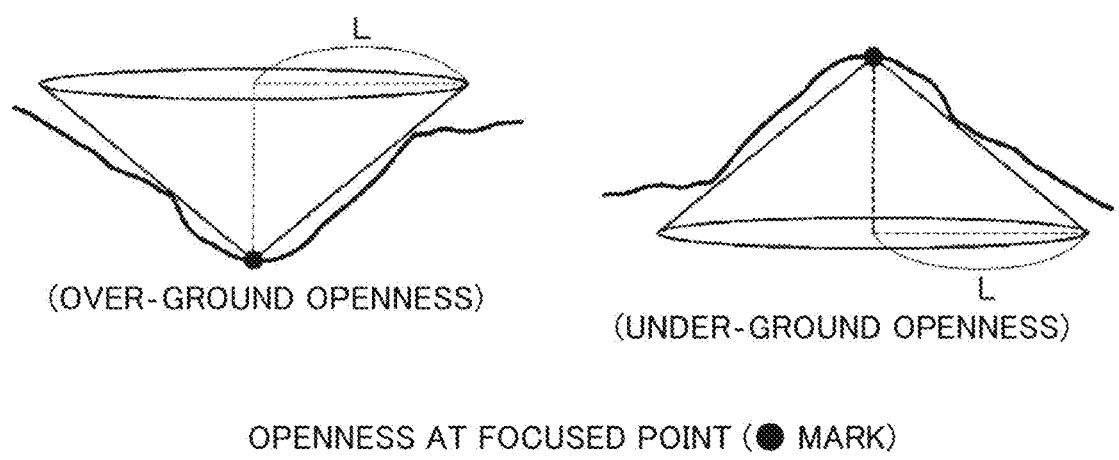
FIG. 39 is a diagram illustrating an under-ground openness and an over-ground openness.

In the fourth embodiment, the concept of openness is used. The openness manifests a quantified degree of the extent to which the relevant spot protrudes over the ground and penetrates under the ground compared to the surrounding area. That is, as illustrated in FIG. 39, the over-ground openness represents an extent of the sky to be seen, within a range of a consideration distance L from a subject sampling-point. And the under-ground openness represents an extent of the under-ground, within a range of the consideration distance L from the subject sampling-point, when taking a survey in the soil in a handstand position.

FIG. 39 illustrates an example when a consideration distance of 50 meters is entered in the system according to the fourth embodiment. In a case of the mesh is 5 m-DEM, the cell number of the fine grid-cells obtained by the consideration-distance grid-number calculator 148 shall be the converted number corresponding to a length of $\{0.5844 [meter] \times 9 \times (50 [meter]/9)\}$, for the size of the fine grid-cell mi is "0.5844 [meter]". By the way, the openness depends on the consideration distance L and the surrounding terrain. In general, the over-ground openness increases as the point protrudes higher from the surrounding and has larger values at the crest and ridge, and has smaller values at the hollow and the bottom of valley. On the other hand, the under-ground openness increases as the point penetrates under the ground and has larger values at the hollow and the bottom of valley, and has smaller values at the crest and the ridge.

That is, the over-ground openness data generator 9 generates terrain cross sections for each of octuple directions on the fine grid-cell mi included in a range of a certain distance (consideration distance L) from the subject sampling-point.

And the over-ground openness data generator 9 determines a maximum value (when viewed from the vertical direction) among inclinations of the lines connecting respective terrain points and the subject sampling-point. Such processing of generating terrain cross sections and determining the maximum value is executed in each of the octuple directions.

In addition, the under-ground opening data generator 10 generates the terrain cross sections in each of octuple directions within a range from the subject sampling-point of the smoothing elevation-value zfi of the inverted fine grid-cell mi to the certain distance. And the under-ground opening data generator 10 determines a maximum value—a minimum value when L2 (not shown) is viewed from the vertical direction in a three-dimensional view of the ground surface—among inclinations of the lines connecting respective terrain points and the subject sampling-point.

Figure 40:
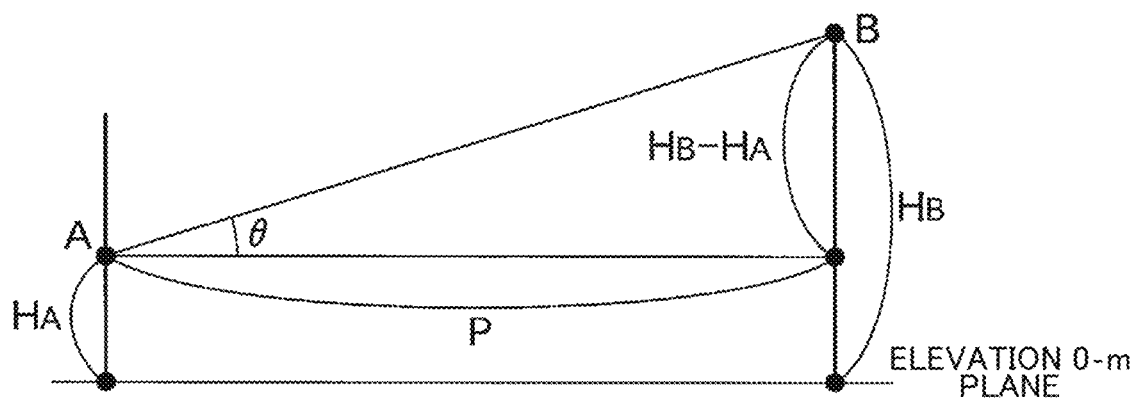
FIG. 40 a diagram illustrating a relationship between sampling points A and B based on an elevation of zero meter.

Such processing of generating terrain cross sections and determining the maximum value is executed in each of the octuple directions. In other words, as illustrated in FIG. 40, in the over-ground openness and the under-ground openness, two sampling points A (iA, jA, HA) and B (iB, jB, HB) are supposed. Because the sample interval is approximately 60 centimeters, the distance between A and B is given by $$P = [(iA-iB)2 + (jA-jB)2] \times \frac{1}{2} \tag{3}$$

FIG. 40 illustrates the relationship between the sampling point A and the sampling point B with respect to the elevation of zero meter. The elevation angle $\theta$ at the sampling point A with respect to the sampling point B is given by $$\theta = \tan^{-1}\{(HB-HA)/P\} \tag{4}$$

The sign of $\theta$ is:
(1) positive in the case of HA<HB and
(2) negative in the case of HA>HB.

Hereinafter, a set of sampling points residing in an azimuth D within a range of the consideration distance L from a subject sampling-point will be described as "a DSL". And, furthermore, the DSL will be referred to as "a D-L set of the subject sampling-points". Here, $D\beta L$ and $D\delta L$ are provided as below:

$D\beta L$: a maximum value among the elevation angles for respective elements of the DSL pertaining to the subject sampling-point, and $D\delta L$: a minimum value among the elevation angles for respective elements of the DSL pertaining to the subject sampling-point (see FIG. 40).

Then, the following definition is given.

Definition I: an over-ground angle and an under-ground angle for the D-L set pertaining to the subject sampling-point shall denote respectively as:

$$D_\varphi L = 90 - D\beta L, \tag{5}$$

and $$D_\psi L = 90 + D\delta L, \tag{6}$$

$D_\varphi L$ means a maximum value of a zenith angle in which the sky in the azimuth D can be seen within the distance L from the subject sampling-point. The generally referred horizon angle corresponds to the ground angle, when the distance L is infinity. Further, $D_\psi L$ means a maximum value of the nadir angle in which the soil in the azimuth D can be seen within the consideration distance L from the subject sampling-point. As the distance L increases, the number of sampling points belonging to the DSL increases, and thus, $D\beta L$ has a non-decreasing property and DSL has a non-increasing property.

Therefore, both $D_\varphi L$ and $D_\psi L$ have non-increasing properties for L. "A high angle" in academical term of land surveying is a concept defined with reference to a horizontal plane passing through the subject sampling-point, and not strictly coincident with θ. In addition, for strict discussion of the over-ground angle and the under-ground angle, the curvature of the Earth should also be considered. And therefore, Definition I is not necessarily an accurate description. Definition I is a concept defined doggedly on the premise of carrying out topographic analysis using DEM scheme.

The over-ground angle and the under-ground angle are the concepts of the specified azimuth D, but a following definition is introduced as an extension of the above-mentioned concept.

Definition II: the over-ground openness and the under-ground openness for the distance L pertaining to the subject sampling-point are respectively defined as:

$$\Phi L = (0_\varphi L + 45_\varphi L + 90_\varphi L + 135_\varphi L + 180_\varphi L + 225_\varphi L + 270_\varphi L + 315_\varphi)/8, \quad (7a)$$

and $$\psi L = (0_\psi L + 45_\psi L + 90_\psi L + 135_\psi L + 180_\psi L + 225_\psi L + 270_\psi L + 315_\psi L)/8 \quad (7b)$$

Figure 41:
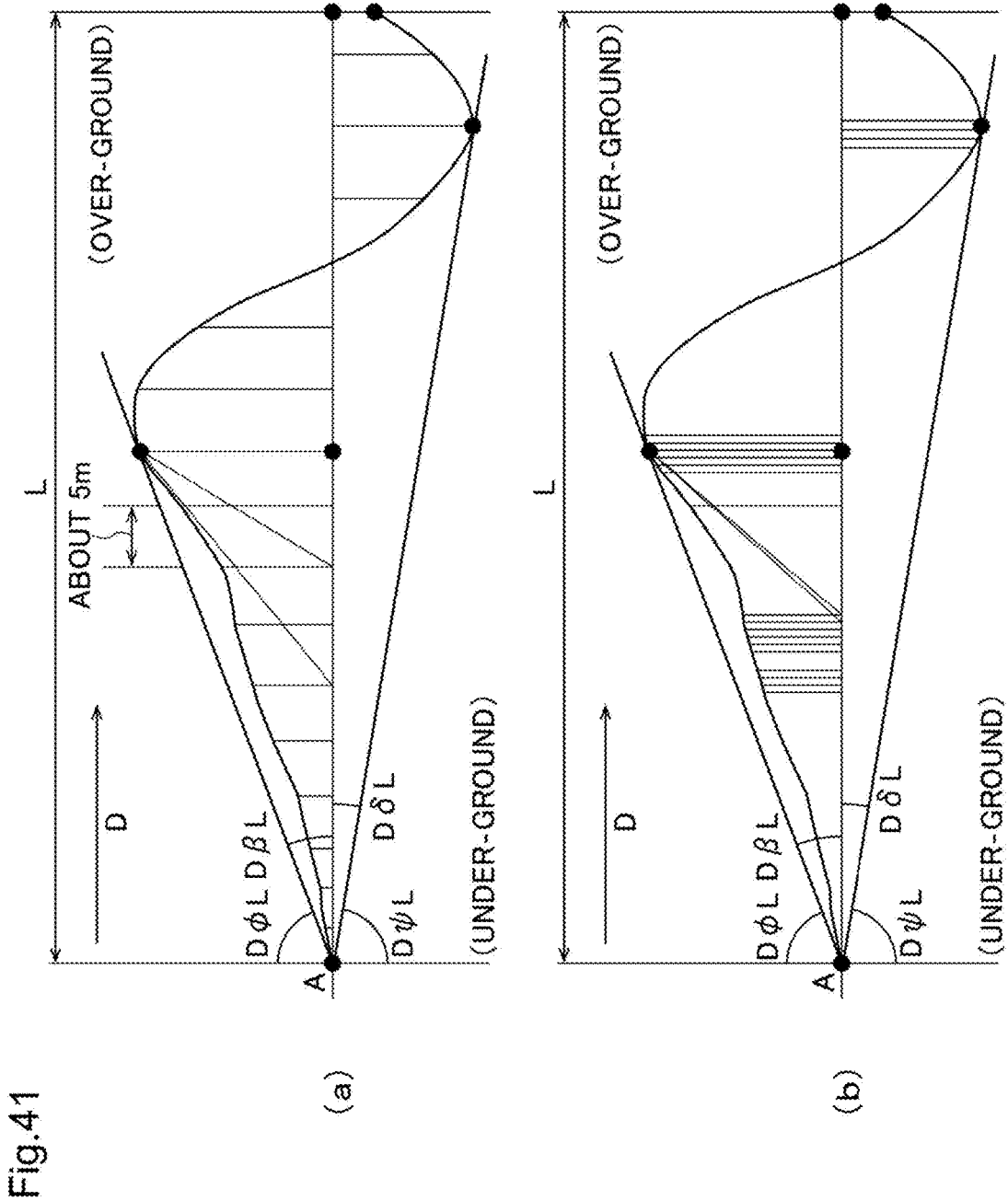
FIG. 41 is a diagram illustrating the sampling points and the distances for the under-ground openness and the over-ground openness.

In other words, as illustrated in FIG. 41(a), in the 5 m-mesh, the subject points Qm (sampling points) are defined at about five meters interval to obtain the elevation angle, whereas in the fourth embodiment, as illustrated in FIG. 41(b), the subject points Qm (sampling points) are defined at interval of about 0.559 meter to obtain the elevation angle.

Figure 45:
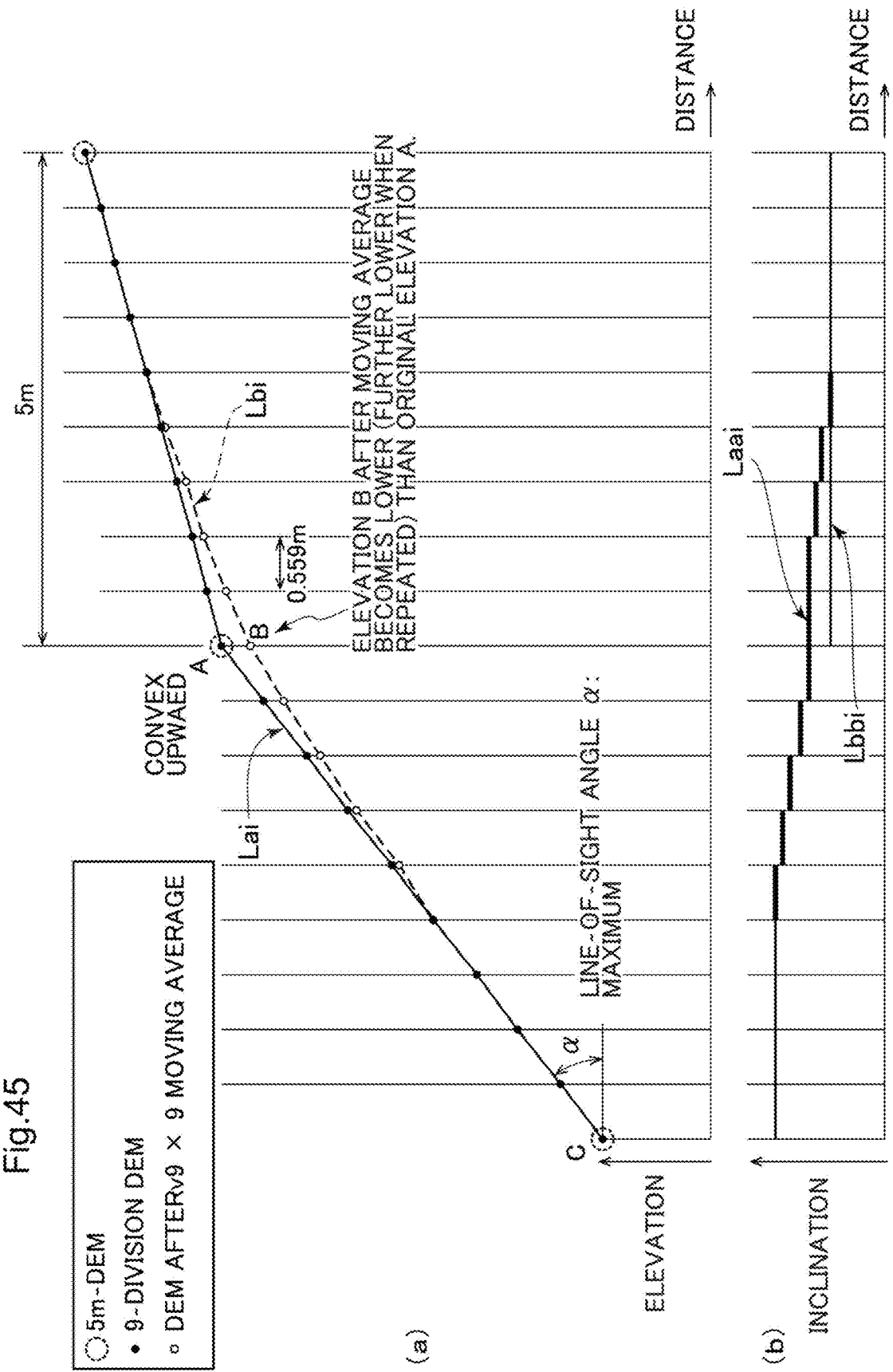
FIG. 45 is a diagram illustrating how a slope angle and a line-of-sight angle (an elevation angle) change with the mesh size and the process of moving average in the case of an upward convexity.
Figure 46:
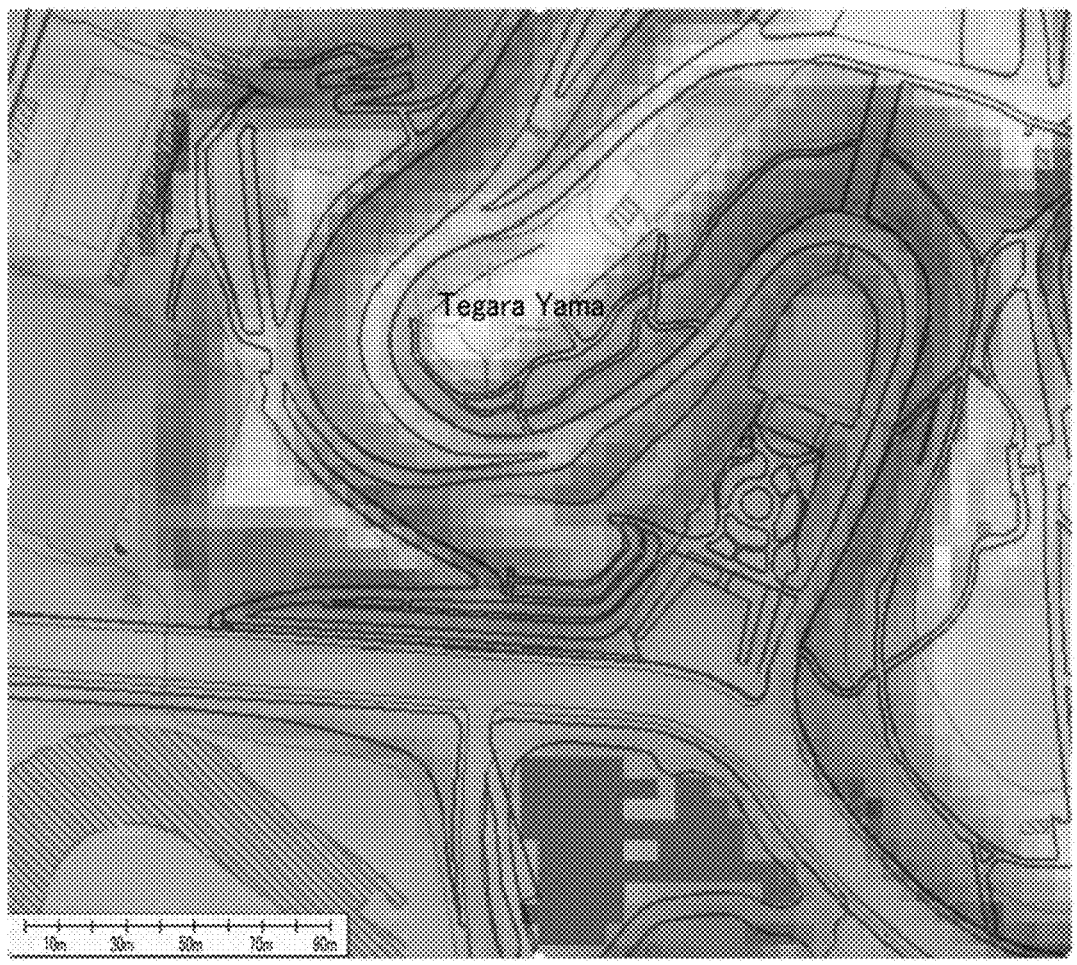
FIG. 46 is a diagram illustrating a conventional red relief image using the 5 m-DEM.

FIGS. 45(a) and 45(b) illustrate how the inclination angles and the line-of-sight angles (elevation angles) change with the mesh sizes and the process of moving averages in a case of upward-convex topology. FIG. 45(a) illustrates the elevation value (also called altitude) on the vertical axis and the distance on the horizontal axis, and FIG. 45(b) illustrates the inclination (slope gradient) on the vertical axis and the distance on the horizontal axis.

That is, according to the fourth embodiment, since the smoothing processor 141 is provided, as illustrated in FIG. 45(a), a line (broken line) Lai having an elevation value A of 5 m-DEM becomes a smooth line (solid line) Lbi having a lower height B (elevation value), after the process of moving average (further lowered when the smoothing processes are repeated).

Further, FIG. 45(b) illustrates a line Laai of an inclination value (a slope gradient) in the case of the mesh of 5 m-DEM and a line Lbbi of an inclination value (a slope gradient) in the case of the grid-cell of 0.559-meter size. A color value (255: reddish color) of a color scale (not shown) is assigned to the inclination value (the slope gradient) in the case of the grid-cell of 0.559-meter size. Therefore, the slope gradient can be expressed by the color value more finely than the mesh of 5 m-DEM.

The inclination calculator 8 obtains an average inclination of each plane of squares adjacent to the subject point (fine grid-cell mi). There are quadruple adjacent squares, any one of which is regarded as a subject square to be focused. And heights at quadruple corners of the subject square and a mean inclination are obtained. The mean inclination is an inclination of a surface approximated from quadruple points using the least-square method.

As illustrated in FIGS. 42(a) and 42(b), the convexity-emphasis image generator 11 has a first gray scale for expressing the ridge and the bottom of valley by brightness.

And the convexity-emphasis image generator 11 calculates brightness (luminance) corresponding to a value of the over-ground openness θi every time the over-ground openness data generator 9 obtains the over-ground openness θi (an average angle when viewing the range of the distance L from the subject point in octuple directions: an index for determining whether the residing point is at a high position).

For example, when a value of the over-ground openness falls within a range of about 40 degrees to 120 degrees, the first gray scale is associated with a range of 50 degrees to 110 degrees, which is assigned to 255 gradations (See FIGS. 42(a), 42(b) and 42(c)). In other words, the greater the value of the over-ground openness as the portion of the ridge (convex portion), the whiter the color.

Figure 43:
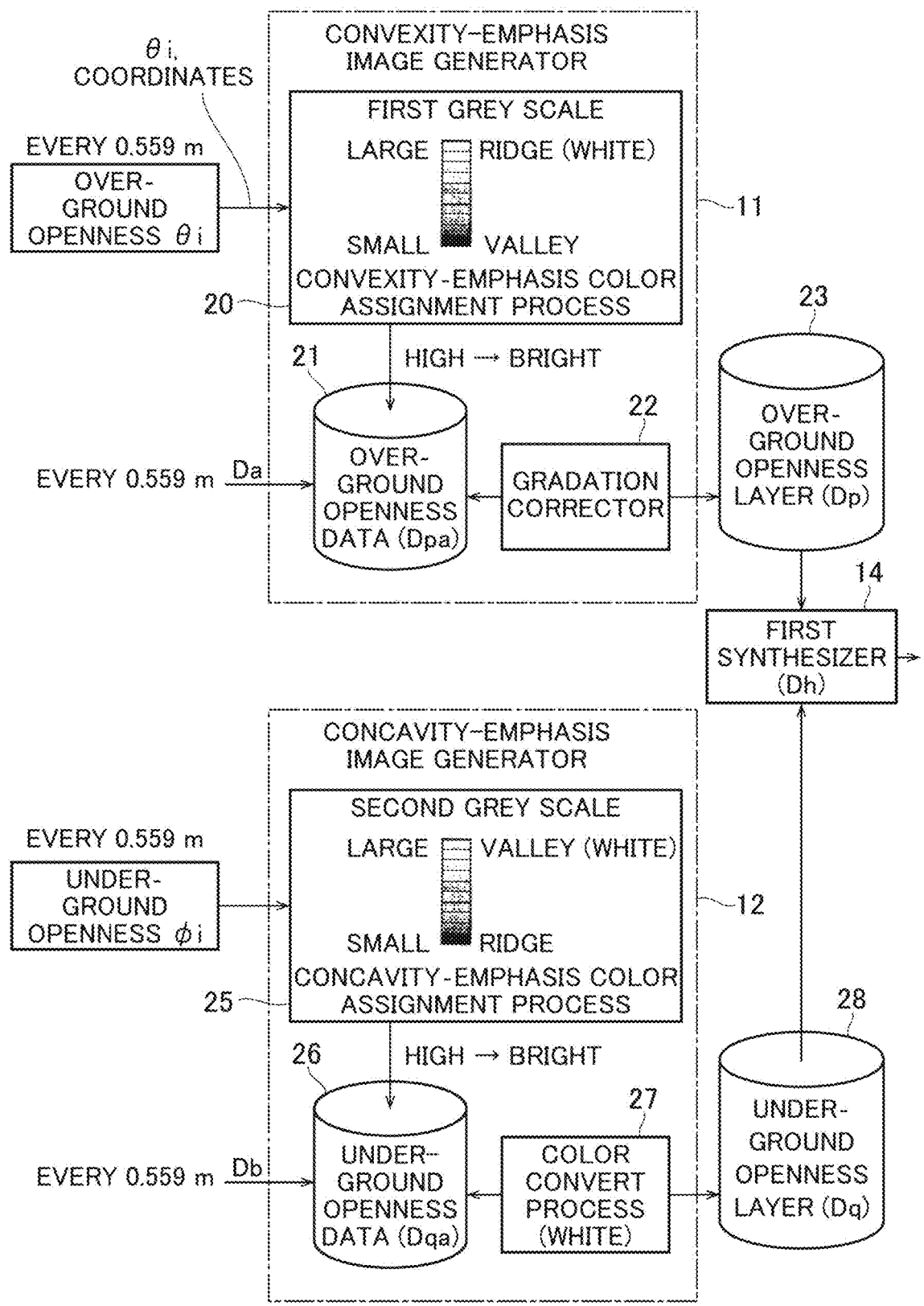
FIG. 43 is a block diagram illustrating a convexity-emphasis image generator and a concavity-emphasis image generator.

Then, as illustrated in FIG. 43, a convexity-emphasis color assignment processor 20 of the convexity-emphasis image generator 11 reads over-ground openness image data Da, and assigns color data based on the first gray scale to a specific fine grid-cell mi having the same Z value as the fine grid-cell mi having the subject point (coordinate) (see FIGS. 42(a) and 42(b)). And the over-ground openness image data Da in which the color data are assigned to the specific fine grid-cell mi are stored in an over-ground openness file (over-ground openness image data Dpa) 21.

Next, the gradation corrector 22 stores the over-ground openness layer Dp in which the color gradation of the over-ground openness image data Dpa are inverted. That is, the over-ground openness layer Dp adjusted the ridge to be whiter is obtained.

As illustrated in FIG. 43, the concavity extractor 12 (also referred to as "the concavity-emphasis image generator") has a second gray scale for expressing the bottom of valley and the ridge by brightness, and calculates brightness corresponding to the value of the under-ground openness θi, every time the under-ground openness data generator 10 obtains the under-ground openness θi (an average of octuple directions from the subject point).

For example, when a value of the under-ground openness falls within a range of about 40 degrees to 120 degrees, the second gray scale is associated with a range of 50 degrees to 110 degrees (see FIG. 42(b)), which is assigned to 255 gradations. That is, since the value of the under-ground openness has the larger value in the portion of the bottom of valley (concavity), the color becomes darker.

Then, as illustrated in FIG. 43, a concavity-emphasis color assignment processor 25 of the concavity-emphasis image generator 12 reads under-ground openness image data db, and assigns color data based on the second gray scale to a specific fine grid-cell mi (for example, size of 0.559 meter) having the same Z value as the subject point (coordinate or coordinate of the fine grid-cell mi). And the under-ground openness image data db in which the color data are assigned to the specific fine grid-cell mi are stored in the under-ground openness file 26. Next, a color inversion processor 27 corrects the color of the under-ground openness image data db to white and stores the data in a layer (memory) 28. When the color becomes too dark, the color is set to the degree of correction of the tone curve. The layer is preserved as an under-ground openness layer Dq.

Figure 44:
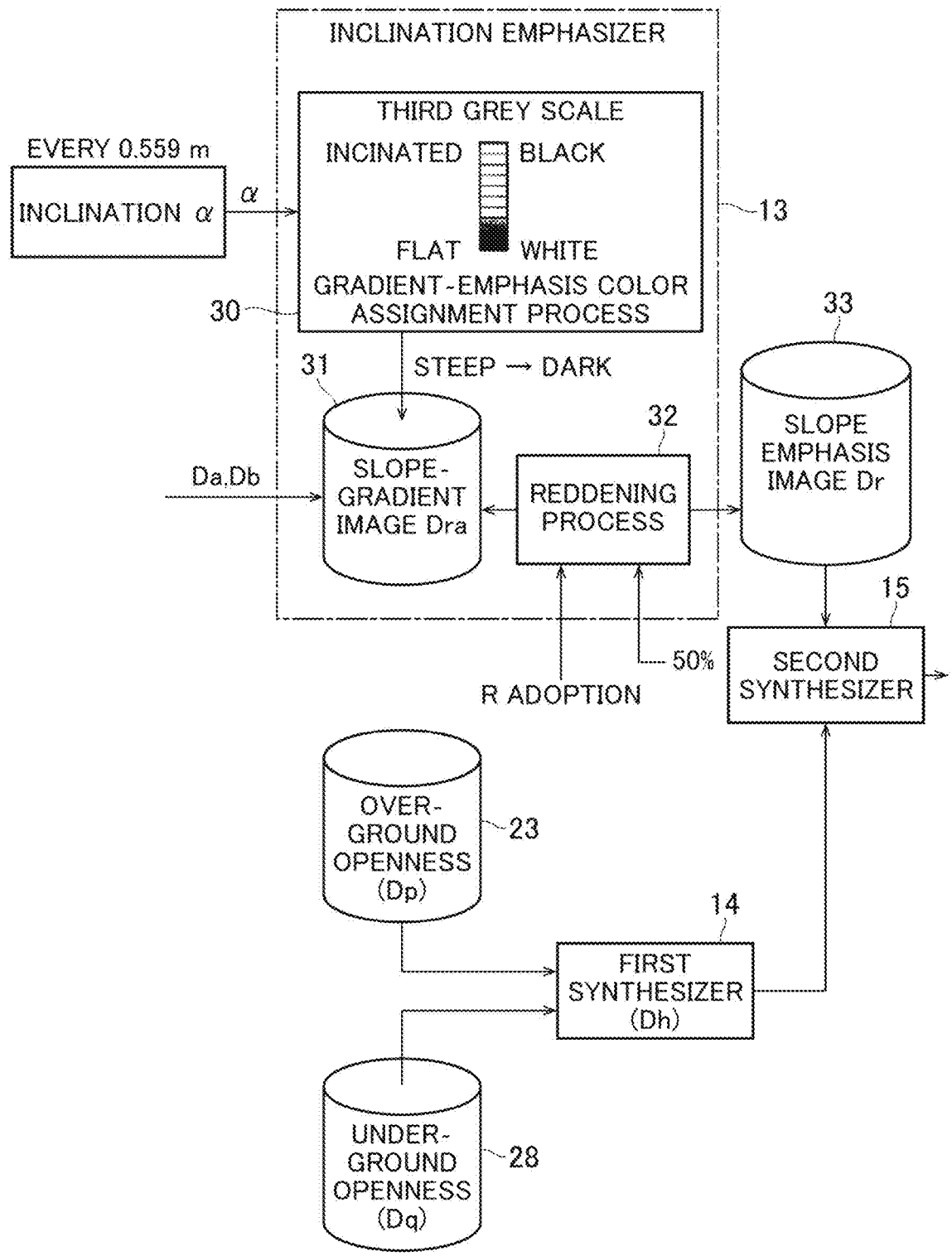
FIG. 44 is a block diagram illustrating a slope-emphasis image and a second synthesizer.

As illustrated in FIG. 44, the inclination emphasizer 13 includes a third gray scale for expressing the degree of inclination in accordance with the degree of brightness (see FIG. 42(c)), and every time the inclination calculator 8 obtains the slope gradient (average in quadruple directions from the subject point), the brightness (luminance) of the third gray scale corresponding to the value of the gradient is calculated.

For example, when the value of the slope gradient αi falls within a range of about 0 degree to 70 degrees, the third gray scale is associated with a range of 0 degree to 50 degrees, which is assigned to 255 gradations (see FIG. 42(c)). That is, 0 degree is white, and equal to or more than 50 degrees is black. The larger the slope a, the darker the color.

As illustrated in FIG. 44, the gradient-emphasis color assignment processer 30 of the inclination emphasizer 13 stores a difference image between the under-ground openness image data db and the over-ground openness image data Da as a slope-gradient image Dra in a memory 31. At the same time, the color data based on the third gray scale is assigned to the fine grid-cell (for example, 0.559-meter size) having the same Z value as the subject point (coordinate).

Next, a reddening processor 32 emphasizes the adopted R-color by the RGB color mode function (however, sometimes 50 percent emphasis may be used). That is, a slope emphasis image Dr in which the steeper the slope, the more the red is emphasized is stored in a memory (layer) 33 (see FIG. 44). A first synthesizer 14 obtains a synthesized image Dh (Dh=Dp+Dq) synthesized by multiplying the over-ground openness layer Dp and the under-ground openness layer Dq. At the same time, the balance of both the layers Dp and Dq is adjusted so as to avoid collapsing the valley part.

The "multiply" described above is an OR operation in numerical processing. In the balance adjustment, for allocations of values between the over-ground openness and the under-ground openness at a certain point, the ground surface is cut out by a certain radius (L/2) around the certain point. When the entire sky is uniform in brightness, the extent of the sky looking up from the ground surface gives the brightness of the ground. That is, the over-ground openness provides the brightness. However, the value of under-ground openness should also be taken into account, when considering the fact that light travels around to spill.

Depending on how the ratio of the over-ground openness and the under-ground openness should be made, arbitrary modification may be achieved, such as for emphasis at the ridge portion of the terrain. The value of Dq may be increased, when the terrain in the valley is emphasized. On the other hand, the second synthesizer 15 obtains a stereoscopic reddened image Ki emphasized at the ridge in red color, by synthesizing the slope-gradient emphasis image Dr in the file and the synthesized image Dh obtained by synthesis in the first synthesizer 14, and displays the stereoscopic reddened image Ki on the display unit 200.

In other words, the synthesized image Dh of the gray gradation expression synthesized by multiplying the over-ground openness layer Dp (white emphasized on the ridge) and the under-ground openness layer Dq (dark emphasized on the bottom) is obtained, and together, the slope-gradient emphasis image Dr in which the red is emphasized as the slope gradient increases with respect to the slope-gradient image Dra is obtained. The gradient emphasis image Dr and the synthesized image Dh are synthesized.

It should be noted that a resolution setting unit (not shown) may be provided, and the resolution setting unit may set the resolution of the display memory (not shown) by using the 5 m-mesh X-direction dividing average-distance da (5 meter/9≈0.5844 meter or 0.559 meter).

What is claimed is:

1. A system of super-resolution stereoscopic visualization processing, comprising:
   (A) a logic circuit configured to define a cluster of meshes in a plane-rectangular coordinate to store in a plane-rectangular coordinate memory, after reading out the meshes, which are represented by latitude and longitude of a predetermined area in a digital elevation model, stored in a digital elevation model memory;
   (B) a logic circuit configured to calculate a divide-distance, to evenly divide a side along an X direction of each of the cluster of the meshes defined in the plane-rectangular coordinate, which is stored in the plane-rectangular coordinate memory, into an odd number other than one;
   (C) a logic circuit configured to define a two-dimensional plane (X-Y) of an area corresponding to the predetermined area to store in a memory, to define a plurality of fine grid-cells, each having a cell size of the divide-distance in the two-dimensional plane (X-Y), by dividing the two-dimensional plane (X-Y) with the divide-distance;
   (D) a logic circuit configured to determine interpolated elevation-values obtained by interpolating elevation-values of the fine grid-cells, by defining the cluster of the meshes in the plane-rectangular coordinate on the two-dimensional plane (X-Y);
   (E1) a logic circuit configured to generate smoothing meshes implemented by a cluster of smoothing grid-cells, which are two-dimensionally arranged by the odd number, by defining grid-cells each having a cell size of the divide-distance as the smoothing grid-cells;
   (E2) a logic circuit configured to sequentially designate the fine grid-cells defined in the two-dimensional plane (X-Y), defining the smoothing mesh in the two-dimensional plane (X-Y) by allocating a central smoothing grid-cell in the smoothing mesh to each of the designated fine grid-cells, and to assign smoothing elevation-values to the designated fine grid-cells, each of the smoothing elevation-values is obtained by smoothing based on interpolated elevation-values of each of the fine grid-cells in the smoothing mesh; and
   (F) a logic circuit configured to specify one of the fine grid-cells as a subject point, for each time the smoothing elevation-values are assigned to the respective fine grid-cells in the two-dimensional plane (X-Y), and to display elevation-depression degrees in gradation, after defining consideration distances from the subject point by a cell number of the fine grid-cells divided by the divide-distance to determine the elevation-depression degrees assigned to each of the subject point.

2. The system of claim 1, further comprising (G) a logic circuit configured to display an image of color tones assigned to each of slope gradients, superimposing on an image of the elevation-depression degrees, after determining the slope gradients of each of the fine grid-cells, within the cell number of the fine grid-cells, pertaining to each of the subject points.

3. The system of claim 2, wherein the color tone of the slope gradient is displayed in a reddish color.

4. The system of claim 2, further comprising:
   (H) a map memory for storing roads, buildings, rivers, swamps, trees, or any combination thereof, or all vector data as a standard map;
   (I) a logic circuit configured to reduce the color tone of the slope gradient by 30 percent to 60 percent; and
   (J) a logic circuit configured to generate an image of the vector data, configured to display the image of the vector data, further superimposing on the superimposed image of the color tones.

5. The system of claim 4, wherein the standard map is a map on a scale of 1/25000.

6. The system of claim 4, further comprising:
(K) a logic circuit configured to generate vector data of contours for each of fixed ranges, by searching for a fine grid-cell assigned to a same smoothing elevation-value as a specific smoothing elevation-value, which is defined to a specific fine grid-cell within the fixed range, after sequentially defining fixed ranges for the fine grid-cells in the two-dimensional plane (X-Y); and
(L) a logic circuit configured to generate an image of the vector data of the contours, configured to display image of the vector data of the contours, further superimposing on the superimposed image of the vector data.

7. The system of claim 1, wherein the digital elevation model has a mesh size of 5 m-DEM (five meters interval Digital Elevation Model) or 10 m-DEM (ten meters interval Digital Elevation Model).

8. The system of claim 1, wherein the odd number is nine.

9. A non-transitory computer readable storage medium storing a control program of a computer, the control program causes the computer to execute a sequence of tasks for performing operations of a super-resolution stereoscopic visualization processing system, the sequence of tasks comprising:
(A) a task configured to define a cluster of meshes in a plane-rectangular coordinate to store in a plane-rectangular coordinate memory, after reading out the meshes, which are represented by latitude and longitude of a predetermined area in a digital elevation model, stored in a digital elevation model memory;
(B) a task configured to calculate a divide-distance, to evenly divide a side along an X direction of each of the cluster of the meshes defined in the plane-rectangular coordinate, which is stored in the plane-rectangular coordinate memory, into an odd number other than one;
(C) a task configured to define a two-dimensional plane (X-Y) of an area corresponding to the predetermined area to store in a memory, to define a plurality of fine grid-cells, each having a cell size of the divide-distance in the two-dimensional plane (X-Y), by dividing the two-dimensional plane (X-Y) with the divide-distance;
(D) a task configured to determine interpolated elevation-values obtained by interpolating elevation-values of the fine grid-cells, by defining the cluster of the meshes in the plane-rectangular coordinate on the two-dimensional plane (X-Y);
(E1) a task configured to generate smoothing meshes implemented by a cluster of smoothing grid-cells, which are two-dimensionally arranged by the odd number, by defining grid-cells each having a cell size of the divide-distance as the smoothing grid-cells;
(E2) a task configured to sequentially designate the fine grid-cells defined in the two-dimensional plane (X-Y), to define the smoothing mesh in the two-dimensional plane (X-Y) by allocating a central smoothing grid-cell in the smoothing mesh to each of the designated fine grid-cells, and to assign smoothing elevation-values to the designated fine grid-cells, each of the smoothing elevation-values is obtained by smoothing based on interpolated elevation-values of each of the fine grid-cells in the smoothing mesh; and
(F) a task configured to specify one of the fine grid-cells as a subject point, for each time the smoothing elevation-values are assigned to the respective fine grid-cells in the two-dimensional plane (X-Y), and to display elevation-depression degrees in gradation, after defining consideration distances from the subject point by a cell number of the fine grid-cells divided by the divide-distance to determine the elevation-depression degrees assigned to each of the subject point.

10. The non-transitory computer readable storage medium of claim 9, wherein the sequence of tasks further comprises (G) a task configured to display an image of color tones assigned to each of slope gradients, superimposing on an image of the elevation-depression degrees, after determining the slope gradients of each of the fine grid-cells, within the cell number of the fine grid-cells, pertaining to each of the subject points.

11. The non-transitory computer readable storage medium of claim 10, wherein the color tone of the slope gradient is displayed in a reddish color.

12. The non-transitory computer readable storage medium of claim 10, wherein the sequence of tasks further comprises:
(H) a task configured to store roads, buildings, rivers, swamps, trees, or any combination thereof, or all vector data as a standard map in a map memory;
(I) a task configured to reduce the color tone of the slope gradient by 30 percent to 60 percent; and
(J) a task configured to generate an image of the vector data, configured to display the image of the vector data, further superimposing on the superimposed image of the color tones.

13. The non-transitory computer readable storage medium of claim 9, wherein the digital elevation model has a mesh size of 5 m-DEM (five meters interval Digital Elevation Model) or 10 m-DEM (ten meters interval Digital Elevation Model).

14. The non-transitory computer readable storage medium of claim 9, wherein the odd number is nine.

* * * * *